(12) United States Patent
Hashimoto et al.

(10) Patent No.: US 7,879,416 B2
(45) Date of Patent: Feb. 1, 2011

(54) INK RECEPTIVE PARTICLES, MARKING MATERIALS SYSTEM, INK RECEIVING METHOD, RECORDING METHOD, RECORDING APPARATUS, AND INK RECEPTIVE PARTICLE STORAGE CARTRIDGE

(75) Inventors: Ken Hashimoto, Ebina (JP); Takatsugu Doi, Ebina (JP); Takeshi Mikami, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 966 days.

(21) Appl. No.: 11/442,207

(22) Filed: May 26, 2006

(65) Prior Publication Data

US 2006/0286315 A1    Dec. 21, 2006

(30) Foreign Application Priority Data

| Jun. 17, 2005 | (JP) | ............................ 2005-178437 |
| Dec. 27, 2005 | (JP) | ............................ 2005-375631 |
| Dec. 27, 2005 | (JP) | ............................ 2005-376230 |
| Jan. 6, 2006 | (JP) | ............................ 2006-001250 |

(51) Int. Cl.
  *B41M 5/50* (2006.01)
  *B41M 5/52* (2006.01)

(52) U.S. Cl. .............. 428/32.34; 526/317.1; 347/100; 347/103; 347/213; 106/31.13; 523/160; 523/161

(58) Field of Classification Search ................ 347/100, 347/103, 213; 428/32.34; 106/31.13; 523/160, 523/161; 526/317.1
See application file for complete search history.

(56) References Cited

U.S. PATENT DOCUMENTS

| 5,196,264 A | 3/1993 | Tsuchiya et al. |
| 6,001,466 A | 12/1999 | Noguchi et al. |
| 6,257,716 B1 | 7/2001 | Yanagawa et al. |
| 6,333,131 B1 | 12/2001 | Ishiyama et al. |
| 6,638,604 B1 | 10/2003 | Bamberg et al. |
| 6,716,562 B2 | 4/2004 | Uehara et al. |
| 2003/0050190 A1 | 3/2003 | Mochizuki et al. |
| 2003/0068571 A1 | 4/2003 | Uehara et al. |
| 2003/0104173 A1* | 6/2003 | Merkel et al. ............... 428/195 |

FOREIGN PATENT DOCUMENTS

| CN | 1026869 | 12/1994 |
| EP | 1396526 | 3/2004 |
| JP | 03-295682 | 12/1991 |
| JP | 05-096720 | 4/1993 |
| JP | 07-137432 | 5/1995 |

(Continued)

OTHER PUBLICATIONS

Machine Translation of JP 2002-321443 A.*

*Primary Examiner*—David Wu
*Assistant Examiner*—Vu A Nguyen
(74) *Attorney, Agent, or Firm*—Fildes & Outland, P.C.

(57) ABSTRACT

The present invention provides ink receptive particles, for receiving an ink containing a recording material, the ink receptive particles comprising trap structures for trapping at least a liquid component of the ink, and a liquid absorbing resin. Using the ink receptive particles, the invention also provides a marking materials system, an ink receiving method, a recording method, a recording apparatus, and an ink receptive particle storage cartridge.

28 Claims, 15 Drawing Sheets

FOREIGN PATENT DOCUMENTS

| | | |
|---|---|---|
| JP | 08-176486 | 7/1996 |
| JP | 09-058107 | 3/1997 |
| JP | 2003-57967 | 2/2000 |
| JP | 2000-94654 | 4/2000 |
| JP | 2000-335106 | 12/2000 |
| JP | 2000-343808 | 12/2000 |
| JP | 2001-010114 | 1/2001 |
| JP | 2001-150792 | 6/2001 |
| JP | 2001-246839 | 9/2001 |
| JP | 2002-226758 | 8/2002 |
| JP | 2002-321443 | 11/2002 |
| JP | 2002-370347 | 12/2002 |
| JP | 2003-080746 | 3/2003 |
| JP | 2003-84578 | 3/2003 |
| JP | 2005-103898 | 4/2005 |
| JP | 2005-189423 | 7/2005 |
| JP | 2005-343108 | 12/2005 |

\* cited by examiner

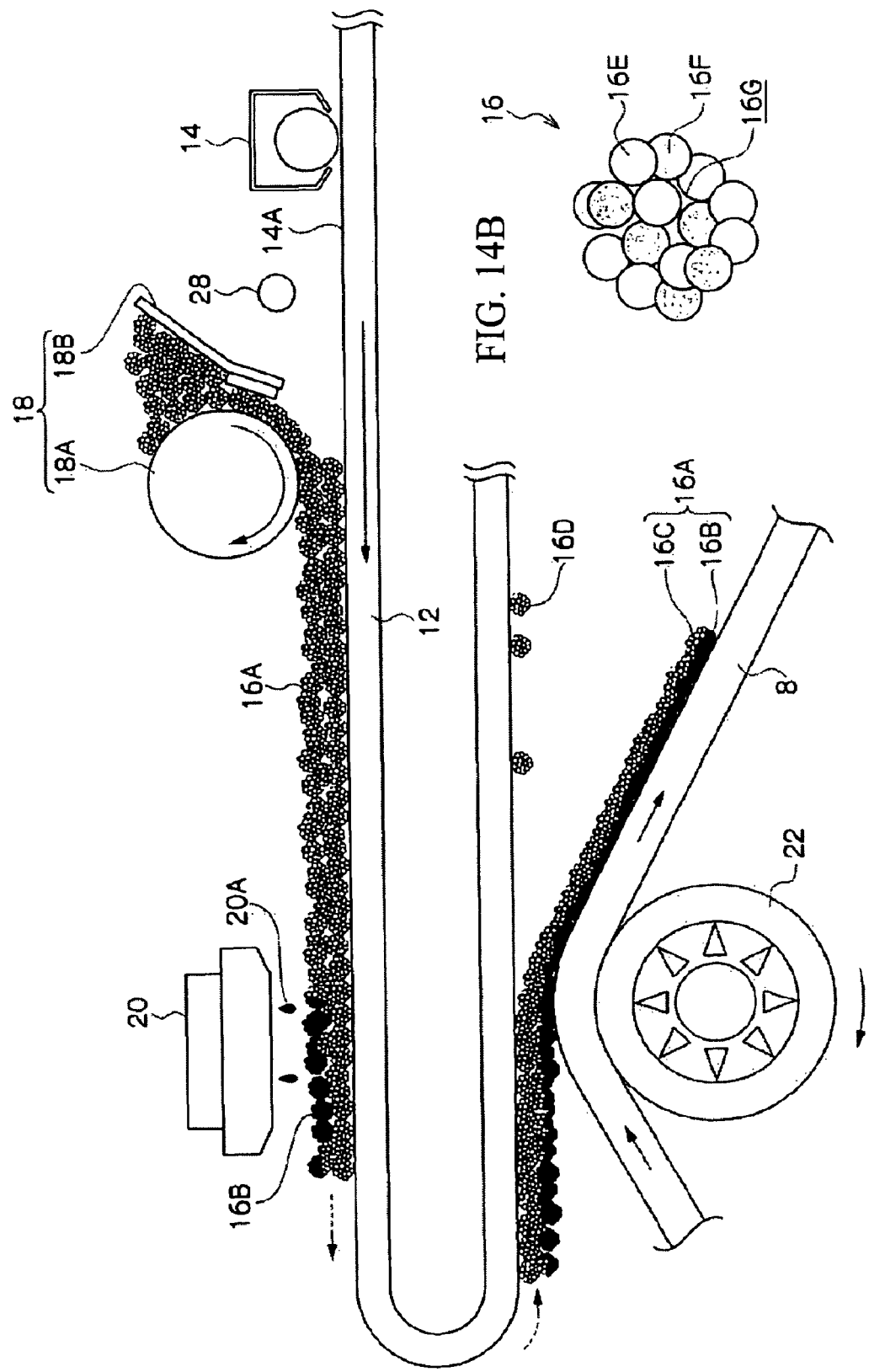

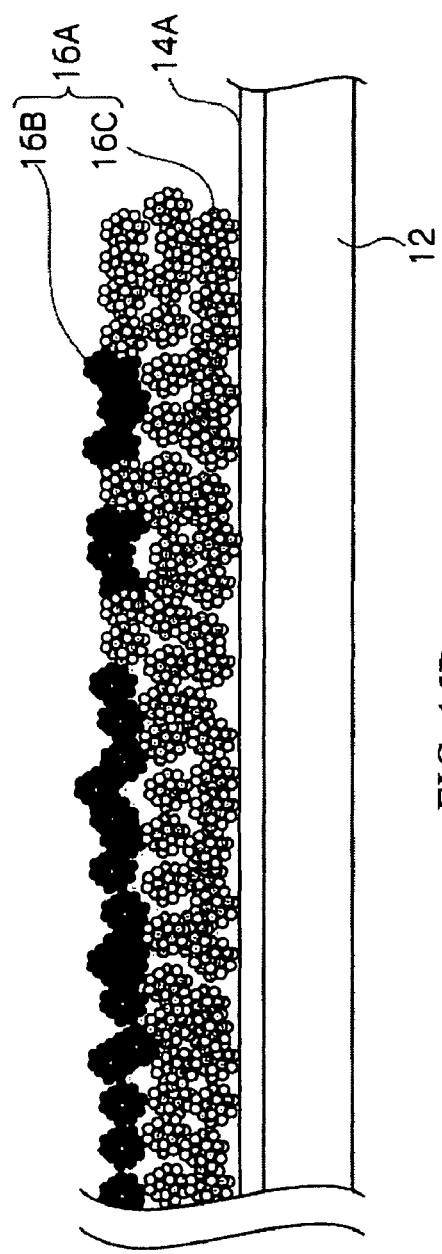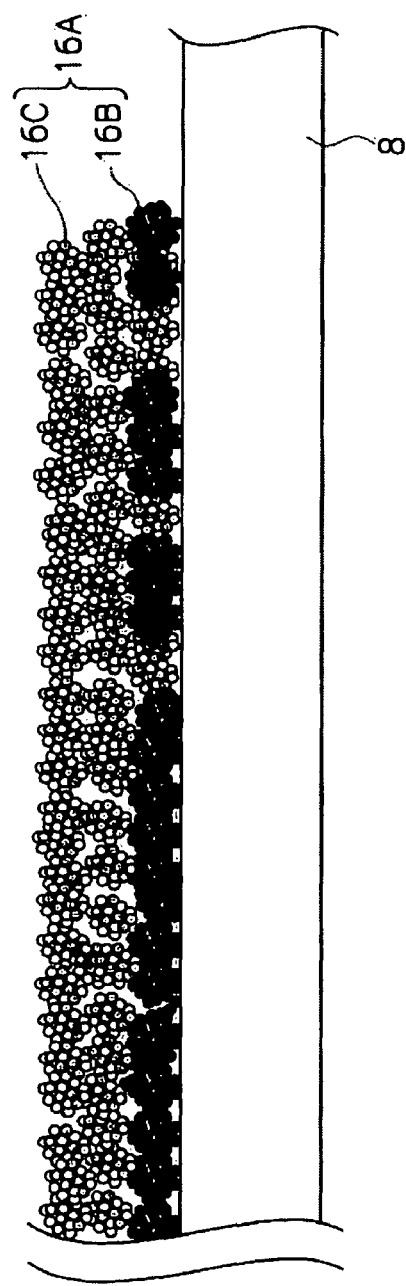
FIG. 15A
FIG. 15B

INK RECEPTIVE PARTICLES, MARKING MATERIALS SYSTEM, INK RECEIVING METHOD, RECORDING METHOD, RECORDING APPARATUS, AND INK RECEPTIVE PARTICLE STORAGE CARTRIDGE

CROSS-REFERENCE TO RELATED APPLICATION

This application claims priority under 35 USC 119 from Japanese Patent Application Nos. 2005-178437, 2005-375631, 2005-376230 and 2006-001250, the disclosures of which are incorporated by reference herein.

BACKGROUND

1. Technical Field

The present invention relates to ink receptive particles for receiving ink, transferring on recording medium, and recording, for example, images or data. The invention also relates to the following which use such ink receptive particles: a marking materials system; an ink receiving method; a recording method; a recording apparatus; and an ink receptive particle storage cartridge.

2. Related Art

The ink jet recording method is known as one of the methods of recording image and data by using ink. The principle of the ink jet recording method is to record on paper, cloth, film or the like by ejecting liquid or melted solid ink from a nozzle, slit, porous film or the like. Ink ejecting methods include a charge control method of ejecting ink by making use of electrostatic attraction forces, drop on-demand method (pressure pulse method) of ejecting ink by making use of the oscillation pressure of piezo elements, thermal ink jet method of ejecting ink by making use of pressure caused by forming and growing foams by intense heat, and others, and images or data of extremely high definition can be recorded by these methods.

Among recording methods using ink, including this ink jet recording method, methods of first recording on an intermediate body and then transferring to a recording medium are proposed, in order to record at high image quality on various forms of recording medium such as permeable medium and impermeable medium.

For example, Japanese Patent Application Laid-Open (JP-A) No. 2000-343808 discloses a method of recording while supplying plural types of powder mixture, such as polymers different in water absorbing property, water absorbing polymers different in size, and water absorbing polymers difference in degree of crosslinking, onto an intermediate body.

JP-A No. 2000-94654 discloses a method of recording while supplying solid particles (particles such as polysaccharide polymer, arginic acid, carrageenan) onto an intermediate body, for thickening the ink by contact with the ink.

JP-A No. 2003-57967 discloses a method of forming a hydrophobic resin particle layer on an intermediate body, holding ink (for example, slow dry type dye ink) in voids in the hydrophobic resin particle layer, and transferring the layer onto a recording medium.

JP-A No. 2002-370347 discloses a method of providing a void type ink absorbing layer coated with inorganic particles or hydrophilic polymer and the like by coating with a wet method, on an intermediate body (sheet), jetting dye ink, and transferring the layer onto a recording medium.

JP-A No. 2002-321443 discloses an ink jet intermediate transfer medium containing thermoplastic resin particles and non-thermoplastic particles, and having a porous ink absorbing layer formed by drying at a temperature not higher than MFT of the thermoplastic resin particles.

SUMMARY

By these proposals, images can be recorded at high image quality on various recording media, but high image quality is difficult with pigment inks, or the methods are insufficient for high speed recording, and there are many points requiring improvement.

The present invention has been made in the light of the above, and the invention provides ink receptive particles. Using such ink receptive particles, the invention also provides a marking materials system, an ink receiving method, a recording method, a recording apparatus, and an ink receptive particle storage cartridge.

According to an aspect of the invention, there is provided ink receptive particles for receiving ink containing a recording material, the ink receptive particles comprising a trap structure for trapping at least a liquid component of the ink, and a liquid absorbing resin.

According to another aspect of the invention, there is provided a marking materials system comprising an ink containing a recording material, and ink receptive particles for receiving the ink containing the recording material, wherein the ink receptive particles have a trap structure for trapping at least a liquid component of the ink, and contain a liquid absorbing resin.

According to another aspect of the invention, there is provided an ink receiving method of receiving in ink receptive particles, the ink receiving method comprising trapping at least an ink liquid component in a trap structure, and absorbing the ink liquid component trapped in the trap structure in a liquid absorbing resin, wherein the ink receptive particles have the trap structure for trapping at least the ink liquid component, and contain the liquid absorbing resin.

According to another aspect of the invention, there is provided a recording method comprising receiving an ink containing a recording material at ink receptive particles, and transferring the ink receptive particles having received the ink onto a recording medium, wherein the ink receptive particles have a trap structure for trapping at least an ink liquid component, and contain a liquid absorbing resin.

According to another aspect of the invention, there is provided a recording apparatus comprising a discharge unit that ejects an ink containing a recording material, to be received at ink receiving particles, and a transfer unit that transfers the ink receptive particles having received the ink onto a recording medium, wherein the ink receptive particles have a trap structure for trapping at least a liquid component of the ink, and contain a liquid absorbing resin.

According to another aspect of the invention, there is provided an ink receptive particle storage cartridge that holds ink receptive particles, which is detachably disposed in a recording apparatus, wherein the ink receptive particles have a trap structure for trapping at least an ink liquid component, and contain a liquid absorbing resin.

BRIEF DESCRIPTION OF THE DRAWINGS

Embodiments of the present invention will be described in detail based on the following figures, wherein:

FIG. 14A and FIG. 14B are respectively diagrams of an example of recording apparatus in the first embodiment of the invention and ink receptive particles;

FIG. 15A and FIG. 15B are respectively diagrams of an example of ink receptive particle layer of the invention on an intermediate transfer body and on a recording medium;

DETAILED DESCRIPTION

Figure 1:
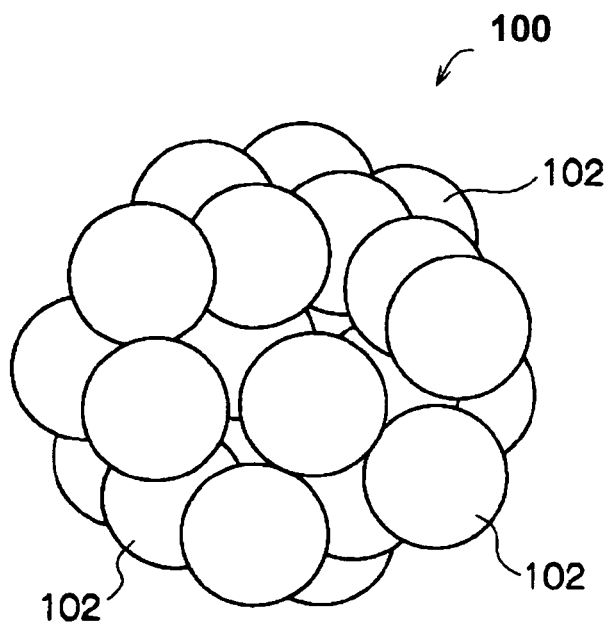
FIG. 1 is a conceptual diagram of an example of ink receptive particles of the invention.

The present invention is specifically described below.

(Ink Receptive Particles)

Ink receptive particles of the invention receive the ink. By, the property "ink receptive" it is meant the ability to retain at least part of the ink components (at least a liquid component). The ink receptive particles of the invention have a trap structure for trapping at least a liquid component of the ink, and contain a liquid absorbing resin.

Ink receptive particles in an exemplary embodiment of the invention contain organic resin particles having a rough surface and/or voids (embodiment A).

Ink receptive particles in another exemplary embodiment of the invention are composite particles in which at least organic resin particles are aggregated, and the bulk density of the composite particles is 50 to 1000 kg/m³ (embodiment B).

Ink receptive particles in another exemplary embodiment of the invention contain hybrid organic-inorganic particles including at least organic material and inorganic material (embodiment C).

When the ink receptive particles of the invention receive the ink (ink receiving method), first the ink adheres to the ink receptive particles, and at least a liquid component of the ink is trapped by the trap structure. At this time, the recording material, whether it is a pigment or dye of the ink components, is adhered to the ink receptive particle surface or is trapped by the trap structure. Then the trapped liquid components of the ink are absorbed by the liquid absorbing resin. Thus, the ink receptive particles receive the ink. The ink receptive particles receiving the ink are transferred onto the recording medium, and recording is carried out.

Trapping of ink liquid components by this trap structure is physical capturing by a particle wall structure, and it is very fast as compared with absorbing of liquid by liquid absorbing resin, and the ink receptive particles receiving the ink can be transferred to various recording media in a short time, whether the medium is permeable or impermeable. Moreover, the trapped liquid components of the ink are absorbed by the liquid absorbing resin, and the retention stability improves, and so at the time of transfer the ink receptive particles which have received the ink do not allow liquid components to leak out or bleed even if physical force is applied.

Therefore, even when using various types of ink, recording is possible with various recording media at high speed and with high image quality.

Moreover, since ink receptive particles are transferred onto the recording medium with the ink liquid components completely trapped, curling or cockling of the recording medium, or lowering of the strength of the recording medium, due to liquid absorption can be prevented.

After transfer of ink receptive particles, the liquid absorbing resin functions as a binder resin or coating resin for the recording material, and the fixing property and the fixing property (rubbing resistance) of the recorded matter can be enhanced, and the gloss of the recorded matter can be controlled. Further, not depending on whether the recording material is pigment or dye, high color formation can be obtained.

Conventionally, in order to improve the fixing property (rubbing resistance) of ink (for example, pigment ink) containing dispersed particles or insoluble components such as pigment as a recording material, a large amount of polymer must be added to the ink. However, when a large amount of polymer is added to the ink (including treatment liquids), the nozzle of the ink ejecting unit may clog and reliability is decreased. In embodiments of the invention, by contrast, since the liquid absorbing resin functions as such a polymer, high image quality, high fixing property, and high reliability of the system can all be satisfied.

Herein, the "trap structure" is a physical particle wall structure for retaining at least liquid, and examples thereof include a void structure, recess structure or capillary structure. Accordingly, as mentioned above, trapping of ink liquid components by the trap structure is much faster than liquid absorption by a liquid absorbing resin. The maximum diameter of openings (apertures) in these structures is preferred to be 30 nm to 5 µm, or more preferably 300 nm to 1 µm. In particular, the maximum opening size is preferred to be large enough to trap the pigment of volume average particle diameter of 100 nm, for example. However, together with these, fine pores of less than 50 nm in maximum opening size may also be provided. From the viewpoint of improvement of liquid absorbing property, voids, capillary, or the like preferably may communicate with each other inside the particles. The trap structure may be physically a structure between the walls of particles.

The aperture size can be determined by reading in a scanning electron microscope (SEM) image of the particle surface by an image analyzer, detecting the gap by binary coding process, and analyzing the size and distribution of gaps.

It is desirable that the trap structure traps not only the liquid components from the ink components but also the recording material. Together with the ink liquid components, when recording material, in particular, pigments are trapped in the trap structure, the recording material is retained and fixed within the ink receptive particles without being unevenly distributed, to achieve both high speed recording and high image quality at the same time. Ink liquid components are mainly ink solvents (dispersion media: vehicle liquids).

Figure 2:
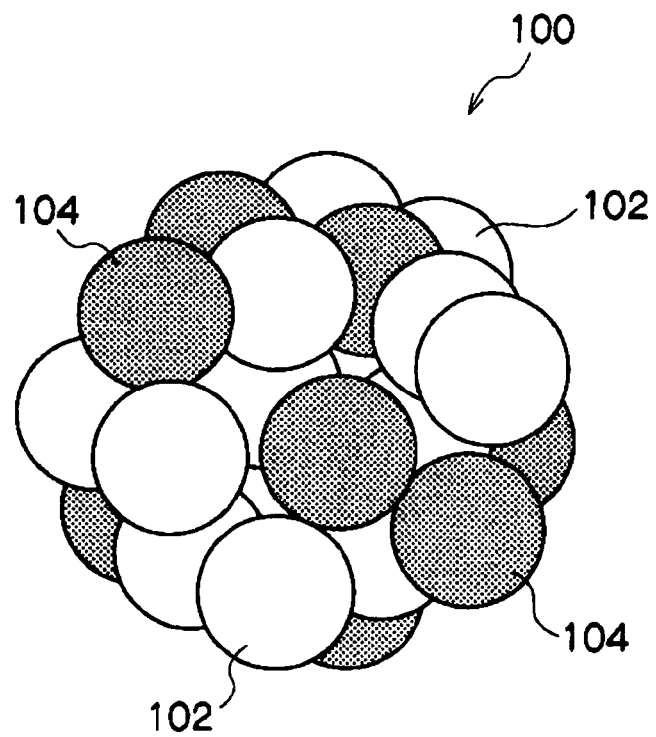
FIG. 2 is a conceptual diagram of another example of ink receptive particles of the invention.

Ink receptive particles of the invention may preferably be, for example, composite particles 100, in which particles 102 of liquid absorbing resin are aggregated as shown in FIG. 1, in order to provide the trap structure as mentioned above. Further, to improve the liquid absorbing property of ink liquid components, ink receptive particles of the invention are particularly preferred to be composite particles 100 in which inorganic particles 104, in addition to particles 102 of liquid absorbing resin, are aggregated as shown in FIG. 2, because water absorbing property, charging and conductive properties and other functions can be conferred. In these composite particles, a void structure can be formed by gaps between particles.

The volume average particle size of liquid absorbing resin particles is preferred to be 50 nm to 10 μm, more preferably 0.1 μm to 5 μm, and still more preferably 0.2 μm to 2 μm. The volume average particle size of inorganic particles is preferred to be 10 nm to 30 μm, more preferably 50 nm to 10 μm, and still more preferably 0.1 μm to 5 μm. The particles of liquid absorbing resin and the inorganic particles may be either primary particles or aggregates by granulating from primary particles.

These composite particles are obtained, for example, by granulating from particles in a semi-sintered state. A semi-sintered state is a state in which some of the granule shape remains and voids are retained between particles. When an ink liquid component is trapped in the trap structure, part of the composite particles may be dissociated, that is, composite particles may be broken up, and particles composing the composite particles may be scattered.

Figure 3:
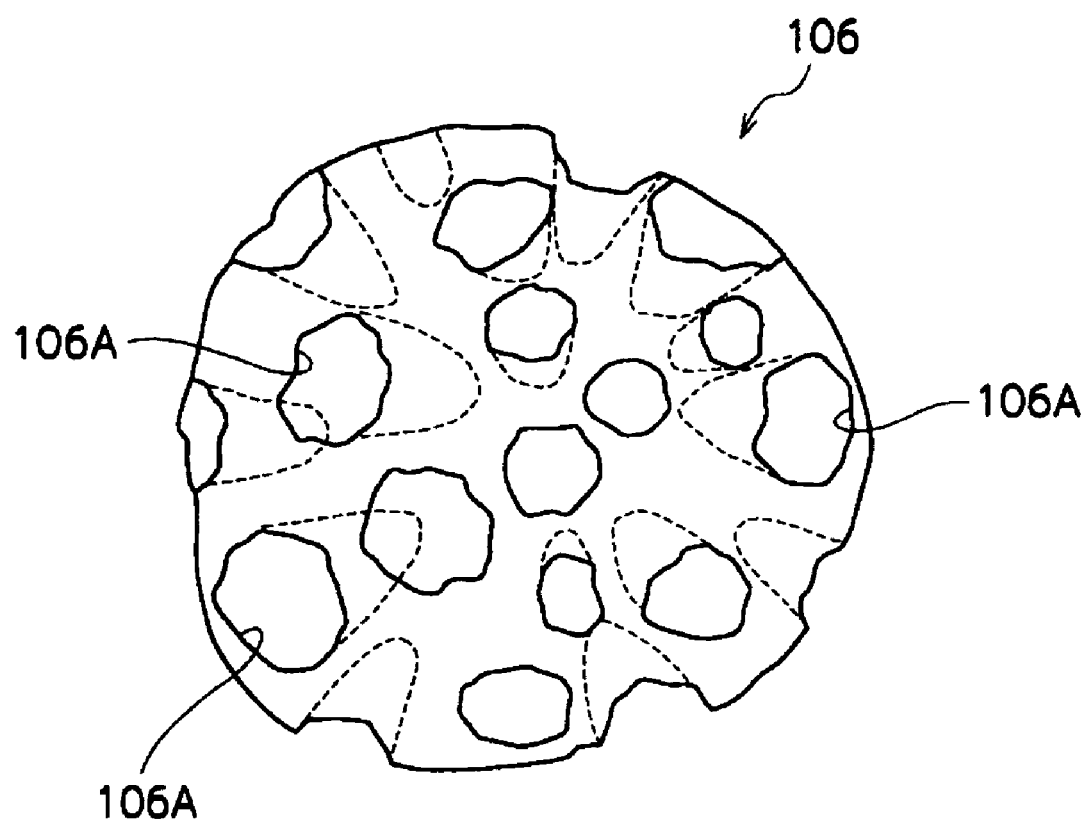
FIG. 3 is a conceptual diagram of another example of ink receptive particles of the invention.

Ink receptive particles of the invention, if having a trap structure such as a void structure, recess structure or capillary structure, may be composed of particles 106 of liquid absorbing resin having a recesses 106A (for example, with a maximum opening size of 100 nm or more, preferably 200 nm to 2000 nm) on the surface as shown in FIG. 3 obtained, for example, by a lost wax method, or obtained by solidifying and crushing molten resin or dissolved resin containing bubbles inside by injection of gas or incorporation of a foaming agent. However, the most preferred example is composite particles obtained by the above granulation method. The liquid absorbing resin and inorganic particles will be described later.

The particle size of ink receptive particles of the invention is preferred to be 0.1 μm to 60 μm, more preferably 1 μm to 30 μm, and still more preferably 3 μm to 15 μm, in average spherical equivalent diameter. The average spherical equivalent diameter is determined as follows. The optimum method depends on particle size, however, for example, a method in which the particle size is determined by applying the principle of light scattering to a dispersion of the particles in a liquid, or a method in which the particle size is determined by image processing of a projected image of the particles, or other methods may be method. Examples which can be given of generally used methods include a Microtrack UPA method (trade name) or a Coulter counter method.

Ink receptive particles in embodiment A of the invention contain organic resin particles having voids and/or a rough surface. Ink receptive particles in embodiment A are described below.

Ink receptive particles in embodiment A of the invention may be either single organic resin particles (primary particles) having voids and/or a rough surface or composite particles in which at least organic resin particles having voids and/or a rough surface are aggregated, but composite particles are preferred from the viewpoint of liquid absorbing property.

If the ink receptive particles in embodiment A of the invention are single organic resin particles having voids and/or a rough surface, when the ink receptive particles receive the ink (ink receiving method), the ink adheres to the ink receptive particles, and at least the liquid component of the ink is captured (trapped) by the voids of the organic resin particles having voids and/or a rough surface. As a result, the liquid absorbing speed and the liquid component retaining performance to retain liquid component of absorbed ink can be improved.

On the other hand, if the ink receptive particles in embodiment A of the invention are composite particles including at least single organic resin particles having voids and/or a rough surface, when the ink receptive particles receive the ink (ink receiving method), the ink adheres to the ink receptive particles, and at least the liquid component of the ink is trapped also by the gaps (voids) between particles composing composite particles (at least organic resin particles having voids and/or a rough surface).

As a result, in addition to capturing (trapping) by gaps between particles composing composite particles (physical particle wall structure), the ink liquid component is also captured (trapped) by the voids in organic resin particles having voids and/or a rough surface, and therefore the liquid absorbing speed and the liquid component retaining performance to retain the liquid component of absorbed ink can be improved.

In the ink receptive particles in embodiment A of the invention, when porous matter is used as the component particles, the liquid component of trapped ink is also absorbed and retained by the porous matter. As a result, retention stability is enhanced, and if physical force is applied to ink receptive particles receiving the ink at the time of transfer, the liquid component will not leak out, and bleeding does not occur.

After transfer of ink receptive particles, the organic resin component of the ink receptive particles functions as a binder resin or covering resin of recording material contained in the ink, and hence the fixing property or fixing property (rubbing resistance) of recording material can be enhanced, and the gloss of the recording material can be also controlled. Further, in the case of composite particles used as ink receptive particles, since the recording material is trapped in the gaps between particles, which are a trap structure, a high coloring performance is obtained whether the recording material is a dye or a pigment. In particular, a high coloring performance is obtained by applying a transparent resin as an organic resin component of the ink receptive particles.

To improve the fixing property (rubbing resistance) of ink (for example, a pigment ink) using an insoluble component or dispersion granular matter such as a pigment as the recording material, a large amount of polymer must be added to the ink, but when a large amount of polymer is added to the ink (including its processing liquid), the nozzle of the ink discharger may be clogged and the reliability may be lowered. By contrast, the organic resin component of the ink receptive particles functions as the polymer, and hence high image quality, fixing property, and high reliability of system can be established.

Herein, "gaps between particles composing composite particles" are trap structures, and the size of gaps is preferred to be 0.1 to 5 μm in the maximum opening size, more preferably 0.3 to 1 μm. In particular, the size of gaps is preferably large enough for trapping the pigment of volume-average diameter of 100 nm. Fine pores of maximum opening size of less than 50 nm may be present at the same time. From the viewpoint of improvement of liquid absorbing property, voids, capillary, or the like preferably may communicate with each other inside the particles.

The gap size can be determined by reading a scanning electron microscope (SEM) image of the particle surface by an image analyzer, detecting the gap by binary coding process, and analyzing the size and distribution of gaps.

It is desirable that the trap structure traps not only liquid component of the ink.

The organic resin particles having voids and/or a rough surface have undulations on the surface, and a void structure on the particle surface is provided by undulations. Organic resin particles having voids and/or a rough surface are preferably porous particles.

The maximum opening size of the organic resin particles having voids and/or a rough surface is preferred to be 30 to 1000 nm, more preferably 50 to 750 nm, and still more preferably 100 to 600 nm.

The maximum opening size can be determined by a method of using an image of scanning electron microscope (SEM) mentioned above.

The organic resin particles having voids and/or a rough surface (porous particles, etc.) can be obtained by known techniques. For example, they can be obtained by methods conforming to phase separation method (microphase separation, crosslinking copolymerization (crosslinking polymerization simultaneously with phase separation), crosslinking copolymerization (styrene-divinyl benzene)), extraction method (polymer addition (polyvinyl acetate), polymer addition (polystyrene)), chemical treatment (macronet method, post-crosslinking), fusion method (particle fusion), compound method (emulsion technology, multi-stage polymerization), and other techniques (conductive polymer method, electron emission method, radiation emission method) or the like. These manufacturing methods are specifically described in the Internet home page of Patent Office of Japan (http://wwwjpo.go.jp/shiryou/s_sonota/hyoujun_gijutsu/organ-icpolymer/mokuji.htm).

For example, they can be prepared by referring to the publication, "Porous material in new age and its application—New material made by nano science (ed. Susumu Kitagawa, CMC Publications, section 3 of chapter 1, etc.).

Figure 4:
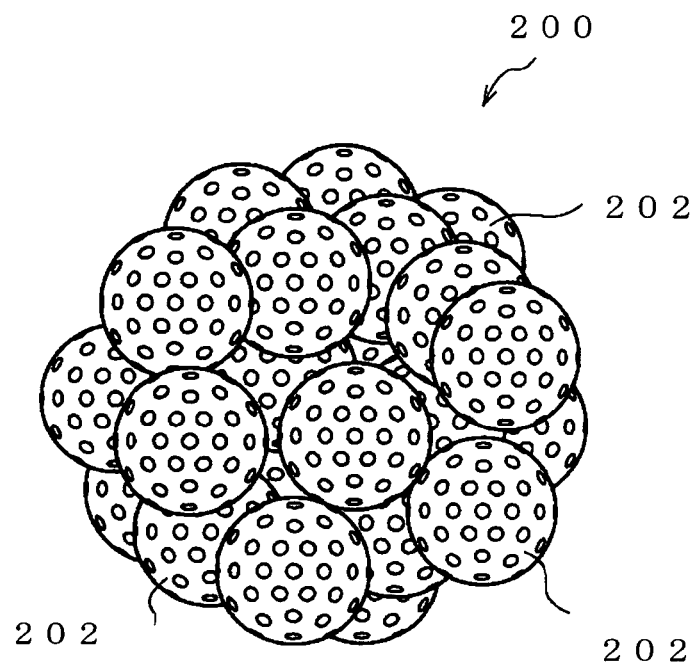
FIG. 4 is a conceptual diagram of an example of ink receptive particles in embodiment A.
Figure 5:
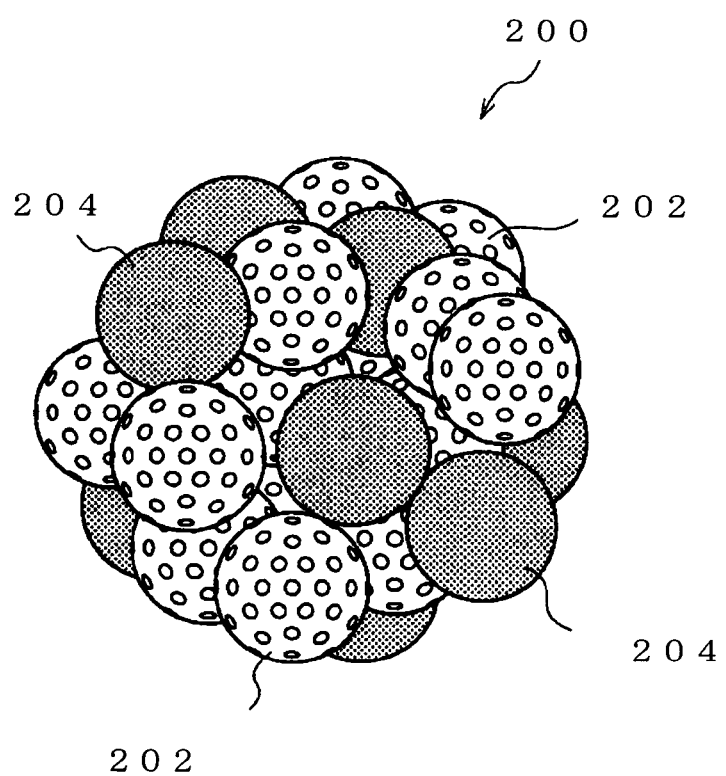
FIG. 5 is a conceptual diagram of another example of ink receptive particles in embodiment A.

Ink receptive particles in embodiment A of the invention are either single organic resin particles having voids and/or a rough surface not being compounded (that is, primary particles), or composite particles being compounded. When ink receptive particles are composed of composite particles, from the viewpoint of trap structure, for example as shown in FIG. 4, it is preferred to form composite particles 200 in which organic resin porous particles 202 (organic resin particles having voids and/or a rough surface) are aggregated. Ink receptive particles in embodiment A of the invention are also preferred to be composite particles 200 in which nonporous particles 204, in addition to the organic resin porous particles 202, are aggregated, as shown in FIG. 5. In these composite particles, the void structure is also formed by gaps between particles.

Nonporous particles may be either organic resin particles or inorganic particles. When organic resin particles are used as nonporous particles, a higher fixing property is given, and further when liquid absorbing resin particles are used as nonporous organic resin particles, a higher liquid absorbing property is given. On the other hand, when inorganic particles are used as nonporous particles, in addition of liquid absorbing property, various functions can be applied such as charging and conductive properties.

The ratio by weight of organic resin particles having voids and/or a rough surface (organic resin porous particles) and nonporous particles (organic resin porous particles: nonporous particles) is preferably, in the case of inorganic nonporous particles, 5:1 to 1:10, more preferably 3:1 to 1:5, and still more preferably 2:1 to 1:3. By defining in this range, both high speed drying and fixing properties are satisfied. This is because high speed drying performance is considered to be achieved when liquid permeates into voids in porous resin particles and voids between particles. On the other hand, fixing property depends on the ratio of organic resin, and the fixing property tends to be higher when the organic resin ratio is larger.

On the other hand, in the case of organic nonporous particles, the ratio is preferably 10:1 to 1:5, more preferably 5:1 to 1:3, and still more preferably 3:1 to 1:2. By defining in this range, both high speed drying and fixing properties are satisfied. This is because high speed drying performance is considered to be achieved when liquid permeates into voids in porous resin particles and voids between particles. On the other hand, fixing property depends on the ratio of organic resin, and the fixing property tends to be higher when the organic resin ratio is larger.

The volume-average particle size of organic resin particles (porous, nonporous particles) in composite particle is preferred to be 50 nm to 10 µm, more preferably 0.1 µm to 5 µm, and still more preferably 0.2 µm to 2 µm. The volume-average particle size of inorganic resin particles (porous, nonporous particles) in composite particle is preferred to be 10 nm to 30 µm, more preferably 50 nm to 10 µm, and most preferably 0.1 µm to 5 µm. The organic resin particles and porous particles may be either primary particles or aggregates granulated from primary particles.

These composite particles are obtained by granulating particles in semisintered state. Semisintered state is a state in which granular shapes are somewhat left over and voids are held between particles. Composite particles may be dissociated somewhat when the ink liquid component is trapped on the trap structures, and the composite particles may be broken up and component particles may be scattered about.

In embodiment A, the composite particles are not limited to such composition, but may be any composite particles containing organic resin particles having voids and/or a rough surface, and may be, for example, composite particles containing organic resin particles having voids and/or a rough surface (for example, organic resin porous particles) and inorganic particles having voids and/or a rough surface (for example, inorganic porous particles).

The particle size of ink receptive particles in embodiment A of the invention is preferred to be 0.1 to 50 µm in average spherical equivalent diameter, more preferably 0.5 µm too 25 µm, and sill more preferably 1 µm to 10 µm. In this range, a high image quality can be easily achieved. That is, when the average particle size is too large, a step difference occurs in the height direction, between the particle existing portion and non-existing portion on the image, and smoothness of image may be inferior. On the other hand, when the average particle size is too small, powder handling property is inferior, and it tends to be hard to supply powder at desired position on a transfer body. As a result, a liquid absorbing particle absent portion occurs on the image, and high speed recording and high image quality may not be achieved. When the ink receptive particles are composed of primary particles, it is preferred to define the volume-average particle size in this range.

The average spherical equivalent diameter can be determined in the method shown above.

The BET specific surface area ($N_2$) of ink receptive particles in embodiment A of the invention is preferred to be 1 to 750 $m^2/g$, more preferably 5 to 600 $m^2/g$, and still more preferably 10 to 400 $m^2/g$. In this range, it tends to be excellent in high speed drying performance. It is estimated because the particles defined in this range have sufficient voids in particles and between particles, so that the liquid can be trapped at high speed in these voids.

The BET specific surface area ($CO_2$)/BET specific surface area ($N_2$) of ink receptive particles in embodiment A of the invention is preferred to be 1 to 50, more preferably 1 to 40, and still more preferably 5 to 30. In this range, it tends to be excellent in high speed drying performance. It is estimated that since the particles in this range are hydrophilic on the particle surface, the liquid trap speed can be increased from the viewpoint of wettability of particle surface.

Herein, the BET specific surface area ($N_2$) and the BET specific surface area ($CO_2$) can be measured by using Betathorp automatic surface area meter (MODEL 4200 of Nikkiso Co., Ltd.).

If the ink receptive particles contain a liquid absorbing resin, in embodiment A, organic resin porous particles may contain either a non-liquid absorbing resin or a liquid absorbing resin, and organic resin nonporous particles may contain either a non-liquid absorbing resin or a liquid absorbing resin.

The ink receptive particles in embodiment B of the invention are composite particles in which at least organic resin particles are aggregated, and the bulk specific gravity of the composite particles is 50 to 1000 $kg/m^3$. Ink receptive particles in embodiment B are described below.

The ink receptive particles in embodiment B of the invention receive the ink (ink receiving method), and the ink adheres to the ink receptive particles, and at least the liquid component of the ink is trapped by the gaps (voids) between the particles composing composite particles (gaps of organic resin particles). At this time, the recording material in the ink component, whether a dye or a pigment, is adhered to the surface of the ink receptive particles or trapped by the gaps between particles, which are a trap structure.

In embodiment B, by using composite particles having a bulk specific gravity in the specified range, particles are captured (trapped) in gaps between particles composing the composite particles (physical particle wall structure), and hence the liquid absorbing speed and the liquid component retaining performance to retain liquid component of absorbed ink can be improved.

Moreover, when porous matter is used as particles for composing composite particles, the liquid component of trapped ink is also absorbed and retained by the porous matter. As a result, the retention stability is improved, and if physical force is applied to ink receptive particles receiving the ink at the time of transfer, the liquid component will not leak out, and bleeding does not occur.

After transfer of ink receptive particles, the organic resin component composing ink receptive particles functions as a binder resin or covering resin of the recording material contained in the ink, and hence the fixing property or fixing property (rubbing resistance) of the recording material can be enhanced, and the gloss of the recording material can be also controlled. Further, since the recording material is trapped in the trap structure of the ink absorptive particles, a high coloring performance is obtained whether the recording material is a dye or a pigment. In particular, a high coloring performance is obtained by applying a transparent resin as an organic resin component for composing the ink receptive particles (composite particles).

To improve the fixing property (rubbing resistance) of ink (for example, a pigment ink) using an insoluble component or dispersed granular matter such as a pigment as the recording material, a large amount of polymer must be added to the ink, but when a large amount of polymer is added to the ink (including its processing solution), the nozzle of ink the discharger may be clogged and the reliability may be lowered. By contrast, the organic resin particles function as the polymer, and hence high image quality, fixing property, and high reliability of system can be established.

Herein, "gaps between particles composing composite particles" are trap structures, and the size of gaps is preferred to be 0.1 to 5 µm in maximum opening size, more preferably 0.3 to 1 µm. In particular, the size of gaps should be large enough for trapping the pigment of volume-average particle size of 100 nm. Fine pores of maximum opening size of less than 50 nm may be present at the same time. From the viewpoint of improvement of liquid absorbing property, voids, capillary or the like may preferably communicate with each other inside the particles.

The gap size can be determined by using a scanning electron microscope (SEM) image of the particle surface.

It is desirable that the trap structure traps not only the liquid component of the ink but also the recording material.

Figure 6:
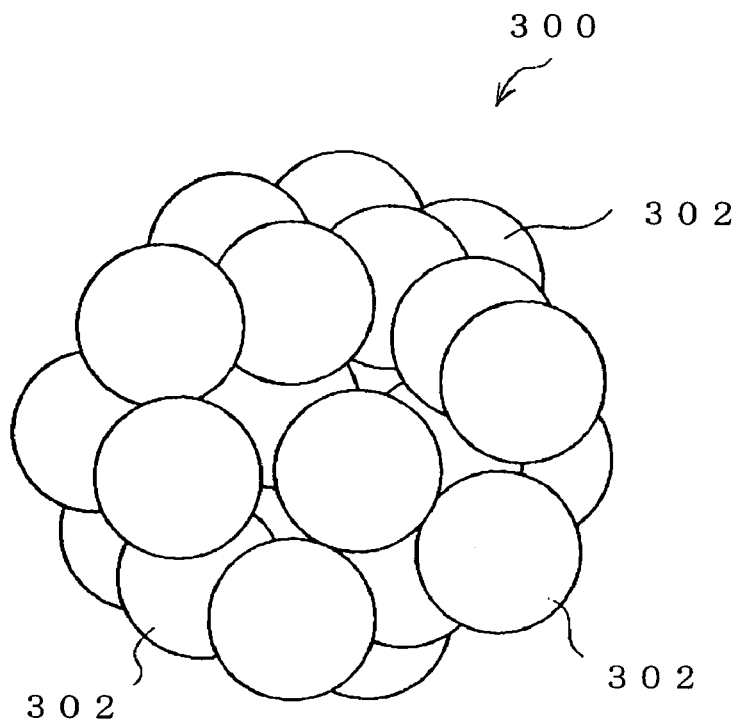
FIG. 6 is a conceptual diagram of an example of ink receptive particles in embodiment B.
Figure 7:
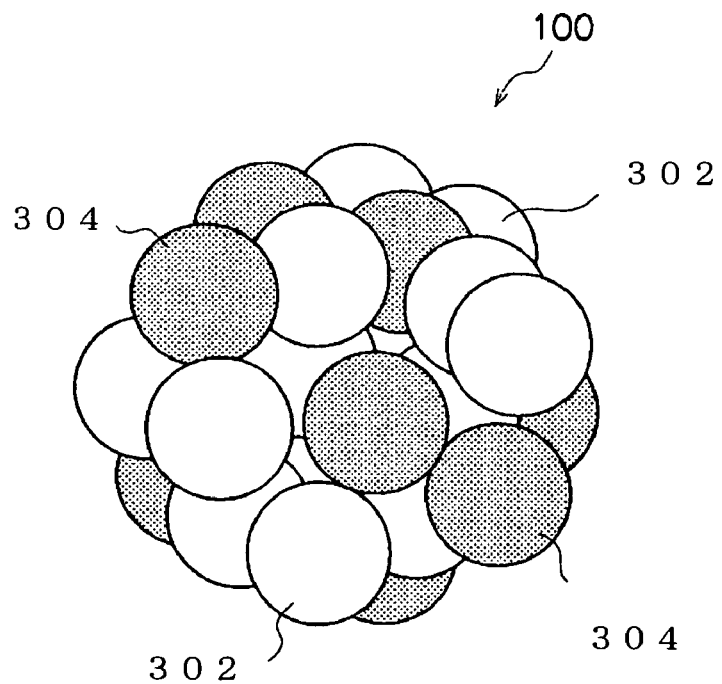
FIG. 7 is a conceptual diagram of another example of ink receptive particles in embodiment B.

The ink receptive particles in embodiment B of the invention, for example, are preferred to be composite particles 300 in which organic resin particles 302 are aggregated as shown in FIG. 6, in order to have the trap structure as mentioned above. Ink receptive particles in embodiment B of the invention are, in order to improve the liquid absorbing property of ink liquid component, preferred to be composite particle 300 in which porous particles 304, in addition to organic resin particles 302, are aggregated, as shown in FIG. 7. Porous particles 304 may be either organic porous particles or inorganic porous particles, and they are particularly preferred for giving various functions such as charging and conductive properties in addition to water absorbing property. In these composite particles, void structures are formed by gaps between particles.

The ink receptive particles in embodiment B of the invention are not limited to such composition, and composite particles containing at least organic resin particles may be used. Examples thereof include composite particles including organic resin particles and inorganic particles. Of course, the organic resin particles may be porous particles.

The volume-average particle size of organic resin particles (including porous particles) is preferred to be 50 nm to 10 µm, more preferably 0.1 µm to 5 µm, and still more preferably 0.2 µm to 2 µm. The volume-average particle size of inorganic particles (including porous particles) is preferred to be 10 nm to 30 µm, more preferably 50 nm to 10 µm, and still more preferably 0.1 µm to 5 µm. The Organic resin particles and porous particles may be either primary particles or aggregates granulated from primary particles.

These composite particles are obtained by granulating particles in semisintered state. Semisintered state is a state in which granular shapes are somewhat left over and voids are held between particles. The composite particles may be dissociated somewhat when the ink liquid component is trapped on the trap structures, and the composite particles may be broken up and component particles may be scattered about.

The bulk specific gravity of ink receptive particles in embodiment B of the invention is preferably 50 to 1000 $kg/m^3$, more preferably 50 to 500 $kg/m^3$, and still more preferably 75 to 250 $kg/m^3$. If the bulk specific gravity is out of this range, high speed drying may not be assured. It is estimated because, if the bulk specific gravity is too low, voids (gaps) between particles are too large, and the liquid absorbing speed of absorbing liquid such as ink becomes slow. If the bulk specific gravity is too high, on the other hand, the volume of voids (gaps) between particles are too small, and the liquid absorbing speed decreases. Hence, if the applied ink amount is increased, it cannot be retained in voids between particles, and high speed printing is not realized.

The bulk specific gravity is determined as follows. Using a tap density method fluidity applying force measuring instrument (KYT-4000, manufactured by SEISHIN ENTERPRISE CO., LTD.), a cylinder is filled with 100 ml of particles, and tapping is repeated 50 times at stroke of 30 mm. The particle volume and weight after tapping are measured, and the bulk specific gravity is calculated.

The bulk specific gravity can be controlled, for example, as follows. The bulk specific gravity can be controlled by the type of polymer (organic resin) to be used, and the type and amount of external additives. By increasing the specific gravity of polymer (organic resin) to be used, the bulk specific gravity of the particles tends to be higher. By adjusting the type and amount of external additives, powder fluidity of particles can be controlled, and when the fluidity is higher, voids between particles decrease, and the bulk specific gravity tends to be higher. Therefore, by combining these parameters, the bulk specific gravity of particles can be adjusted.

The particle size of the ink receptive particles in embodiment B of the invention is preferred to be 0.1 to 50 μm in average spherical equivalent diameter, more preferably 0.5 μm too 50 μm, still more preferably 1 μm to 30 μm, and further preferably 3 μm to 15 μm. In this range, a high image quality is easily achieved. That is, when the average particle size is too large, a step difference occurs in the height direction, between the particle existing portion and non-existing portion on the image, and smoothness of image may be inferior. On the other hand, when the average particle size is too small, powder handling property is inferior, and it tends to be hard to supply powder at desired position on a transfer body. As a result, a liquid absorbing particle absent portion occurs on the image, and high speed recording and high image quality may not be achieved.

The average spherical equivalent diameter can be determined in the method shown above.

The BET specific surface area ($N_2$) of ink receptive particles in embodiment B of the invention is preferred to be 1 to 750 $m^2/g$, more preferably 5 to 600 $m^2/g$, and still more preferably 10 to 400 $m^2/g$. In this range, it tends to be excellent in high speed drying performance. It is estimated because the particles defined in this range have sufficient voids in particles and between particles, so that the liquid can be trapped at high speed in these voids.

The BET specific surface area ($CO_2$)/BET specific surface area ($N_2$) of ink receptive particles in embodiment B of the invention is preferred to be 1 to 50, more preferably 1 to 40, and still more preferably 5 to 30. In this range, it tends to be excellent in high speed drying performance. It is estimated that since the particles in this range are hydrophilic on the particle surface, the liquid trap speed can be increased from the viewpoint of wettability of particle surface.

Herein, the BET specific surface area ($N_2$) and BET specific surface area ($CO_2$) can be measured by using a Betathorp automatic surface area meter (MODEL 4200 of Nikkiso Co., Ltd.).

In embodiment B, the organic resin particles contain a liquid absorbing resin, and may also contain a non-liquid absorbing resin. The organic resin particles may be either porous particles or nonporous particles.

The ink receptive particles in embodiment C of the invention contain organic-inorganic hybrid particles including at least organic material and inorganic material. Ink receptive particles in embodiment C are described below.

The ink receptive particles in embodiment C of the invention may be either single particles of organic-inorganic hybrid particles, or composite particles of organic-inorganic hybrid particles, but the composite particles are preferred from the viewpoint of liquid absorbing property.

In the case of the ink receptive particles in embodiment C of the invention being of single particles of organic-inorganic hybrid particles, when the ink receptive particles receive the ink (ink receiving method), the ink adheres to the ink receptive particles, and at least the liquid component of the ink is captured (trapped) by the interface of organic material and inorganic material in the organic-inorganic hybrid particles. Accordingly, the liquid absorbing speed is improved, and the liquid component retaining performance to retain liquid component of absorbed ink can be enhanced. This is considered because the organic-inorganic hybrid particles have inorganic material exposed in part, and have gaps in the interface of organic material and inorganic material, and thereby the ink liquid component is captured (trapped) in the gaps.

On the other hand, in the case of the ink receptive particles in embodiment C of the invention being of composite particles including at least organic-inorganic hybrid particles, when the ink receptive particles receive the ink (ink receiving method), the ink adheres to the ink receptive particles, and at least the liquid component of the ink is trapped in the gaps (voids) between the particles (at least the organic-inorganic hybrid particles) composing the composite particles.

In addition to capturing (trapping) by the gaps (physical particle wall structure) among the particles composing the composite particles, as mentioned above, since the ink liquid component is also captured (trapped) by the interface of organic material and inorganic material in the organic-inorganic hybrid particles as mentioned above, the liquid absorbing speed can be improved, and the liquid component retaining performance to retain liquid component of absorbed ink can be enhanced.

In the ink receptive particles in embodiment C of the invention, when porous matter is used as particles for the ink receptive particles, the liquid component of trapped ink is also absorbed and retained by the porous matter. As a result, the retention stability is improved, and if physical force is applied to ink receptive particles receiving the ink at the time of transfer, the liquid component will not leak out, and bleeding does not occur.

After transfer of ink receptive particles, the organic resin component of the ink receptive particles functions as binder resin or covering resin of recording material contained in the ink, and hence the fixing property or fixing property (rubbing resistance) of the recording material can be enhanced, and the gloss of the recording material can be also controlled. Further, in the case of ink receptive particles are composite particles, since the recording material is trapped in the gaps between the particles, which is a trap structure, a high coloring performance is obtained whether the recording material is a dye or a pigment. In particular, a high coloring performance is obtained by applying a transparent resin as an organic resin component of the ink receptive particles.

To improve the fixing property (rubbing resistance) of ink (for example, a pigment ink) using an insoluble component or dispersion granular matter such as a pigment as the recording material, a large amount of polymer must be added to the ink, but when a large amount of polymer is added to the ink (including its processing solution), the nozzle of the ink discharge means may be clogged and the reliability may be lowered. By contrast, the organic resin component of the ink receptive particles functions as the polymer, and hence high image quality, fixing property, and high reliability of system can be established.

Herein, "gaps between particles for composing composite particles" are trap structures, and the size of gaps is preferred to be 0.1 to 5 μm in maximum opening size, more preferably 0.3 to 1 μm. In particular, the size of gaps should be large enough for trapping the pigment of volume-average particle size of 100 nm. Fine pores of maximum opening size of less than 50 nm may be present at the same time. From the viewpoint of improvement of liquid absorbing property, voids, capillary or the like may preferably communicate with each other inside the particles.

The gap size can be determined by using a scanning electron microscope (SEM) image of the particle surface.

It is desirable that the trap structure traps not only the liquid component of the ink but also the recording material.

The organic-inorganic hybrid particles are particles containing an organic material and an inorganic material, and specific examples thereof include particles of organic resin containing an inorganic material (inorganic particles for internal addition) in dispersed state. In the organic-inorganic hybrid particles, the organic resin functions as a binder resin of the recording medium and the coloring matter in the ink, while the inorganic particles for internal addition are considered to function of forming small voids at the interface with the organic material, and absorbing the recording liquid (ink) in the organic-inorganic hybrid particles.

In the organic-inorganic hybrid particles, the ratio by mass of the organic resin and the inorganic particles for internal addition is preferred to be 33:67 to 99:1, more preferably 50:50 to 95:5, and still more preferably 67:33 to 95:5. By defining the ratio by mass in this range, both high speed drying performance and fixing performance can be established. High speed drying performance is estimated to be achieved when liquid permeates into the voids in the organic-inorganic hybrid particles, and the voids between the organic-inorganic hybrid particles. The fixing performance depends on the ratio of organic resin in the ink receptive particles, and the fixing performance is advantageous when the ratio of organic resin is higher.

The volume-average particle size of the inorganic particles for internal addition in the organic-inorganic hybrid particles is preferred to be 5 nm to 1 μm, more preferably 10 nm to 750 nm, and still more preferably 10 nm to 500 nm. By defining the particle size in this range, the high speed drying performance can be achieved. The high speed drying performance is estimated to be achieved when liquid permeates into the voids in the organic-inorganic hybrid particles. Therefore, by adjusting the particle size of the inorganic particles to be added in the hybrid particles, gaps to be formed in particles can be adjusted.

The organic-inorganic hybrid particles can be prepared, for example, in the following manner. An organic material—an inorganic material are fused and kneaded by using an extruder or the like, and thus a hybrid material in which the inorganic material is dispersed in the organic material is obtained; This hybrid material is roughly ground by a grinder, and then finely ground by a jet mill or other pulverizer, and desired particles are obtained. Further, by sorting by an air stream sorter or the like, organic-inorganic hybrid particles are obtained. At this time, the particle size of the organic-inorganic hybrid particles can be adjusted by properties of the organic material and the inorganic material (hardness, crystal structure, etc.), grinding conditions, and sorting conditions.

Another method for preparing organic-inorganic hybrid particles includes preparing a dispersion of a organic material and a dispersion of an inorganic material, and mixing these dispersion. The mixed solution is aggregated by adding an aggregating agent, and organic-inorganic hybrid particles having the inorganic material incorporated in the organic material are obtained. At this time, the particle size of the organic-inorganic hybrid particles can be adjusted by properties of the organic material and the inorganic material (acid value, molecular weight, etc.), concentration of the organic material dispersion and inorganic material dispersion, amount of the aggregating agent, and temperature and time of agitation after addition of the aggregating agent.

Figure 8:
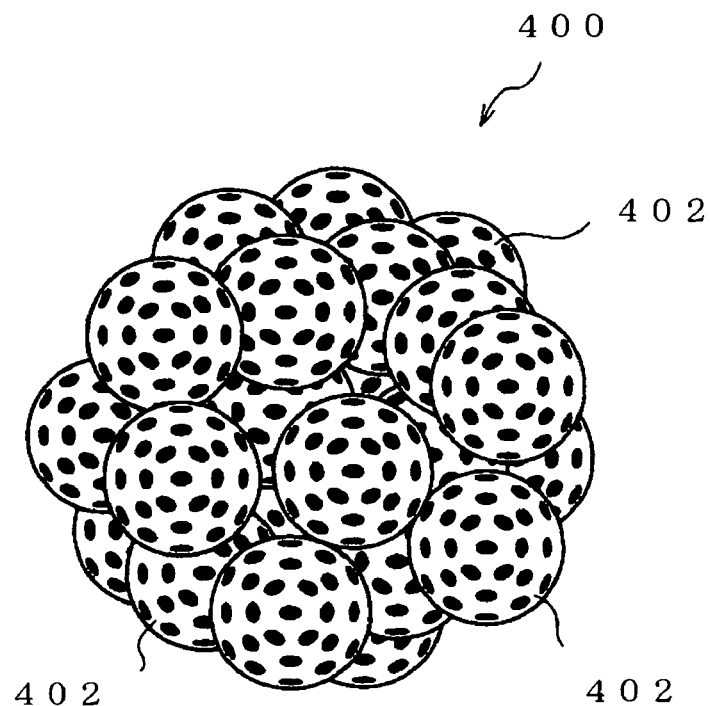
FIG. 8 is a conceptual diagram of an example of ink receptive particles in embodiment C.
Figure 9:
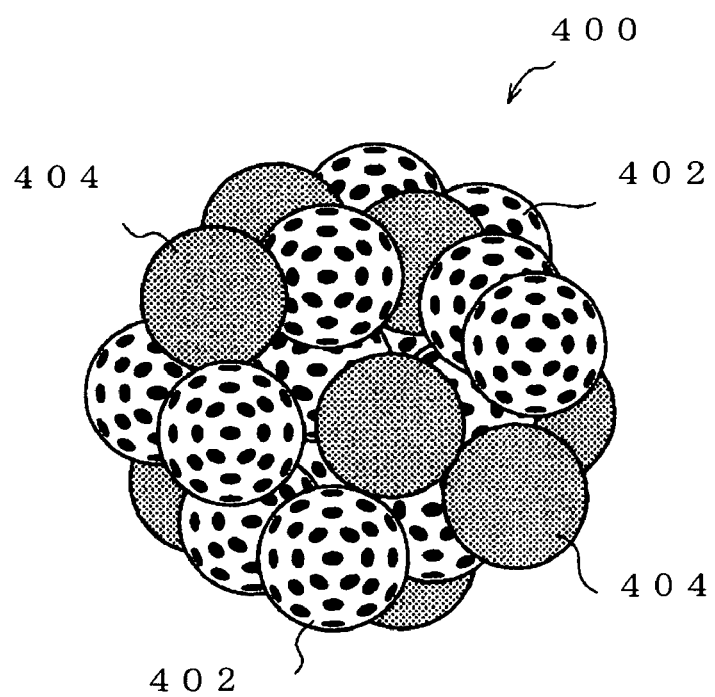
FIG. 9 is a conceptual diagram of another example of ink receptive particles in embodiment C.

The ink receptive particles in embodiment C of the invention may include organic-inorganic hybrid particles not being compounded (that is, primary particles), or as compounded particles. When ink receptive particles include the composite particles, in order to have the trap structure, composite particles 400 in which organic-inorganic hybrid particles 402 are aggregated as shown in FIG. 8, are preferred. The ink receptive particles of embodiment C are, as shown in FIG. 9, preferred to be composite particles 400 in which organic resin particles or inorganic particles 404, in addition to organic-inorganic hybrid particles 402, are aggregated. In these composite particles, the void structure is formed by gaps between particles.

The organic resin particles may be either porous particles or nonporous particles and the inorganic particles may be either porous particles or nonporous particles. When nonporous particles are used, the liquid absorbing performance is further improved. When organic resin particles are used as nonporous particles, a higher fixing performance is obtained. When liquid absorbing resin particles are used as organic resin particles of nonporous particles, a higher liquid absorbing performance is achieved. On the other hand, when nonporous inorganic particles are used, in addition to liquid absorbing property, charging and conductive functions are also applied.

In the composite particles, the ratio by weight of the organic-inorganic hybrid particles and the inorganic particles (organic-inorganic hybrid particles: inorganic particles) is preferred to be 5:1 to 1:10, more preferably 3:1 to 1:5, and still more preferably 2:1 to 1:3. By defining in this range, both high speed drying performance and fixing performance can be established. High speed drying performance is estimated to be achieved when liquid permeates into the voids in the organic-inorganic hybrid particles, and the voids between the organic-inorganic particles. The fixing performance depends on the ratio of organic resin in the organic-inorganic hybrid particles, and the fixing performance is advantageous when the ratio of the organic resin is higher.

In the composite particles, the ratio by weight of the organic-inorganic hybrid particles and the organic particles (organic-inorganic hybrid particles: organic particles) is preferred to be 10:1 to 1:5, more preferably 5:1 to 1:3, and still more preferably 3:1 to 1:2. By defining in this range, both high speed drying performance and fixing performance can be established. High speed drying performance is estimated to be achieved when liquid permeates into the gaps in the organic-inorganic hybrid particles, and the gaps between the organic-inorganic particles. The fixing performance depends on the ratio of the organic resin in the composite particles, and the fixing performance is advantageous when the ratio of the organic resin is higher.

The volume-average particle size of the organic-inorganic hybrid particles in the composite particles is preferred to be 0.1 nm to 50 μm, more preferably 0.5 μm to 25 μm, and still more preferably 1 μm to 10 μm.

On the other hand, the volume-average particle size of the organic resin particles (porous particles, nonporous particles) is preferred to be 50 nm to 10 μm, more preferably 0.1 μm to 5 μm, and still more preferably 0.2 μm to 2 μm. The volume-average particle size of the inorganic resin particles (porous particles, nonporous particles) is preferred to be 10 nm to 30 μm, more preferably 50 nm to 10 μm, and still more preferably 0.1 μm to 5 μm. The organic resin particles and the porous particles are either primary particles, or particles granulated from primary particles.

These composite particles are obtained by granulating particles in semisintered state. Semisintered state is a state in which granular shapes are somewhat left over and voids are held between particles. The composite particles may be dissociated somewhat when the ink liquid component is trapped on the trap structures, and the composite particles may be broken up and component particles may be scattered about.

The particle size of ink receptive particles of the invention is preferred to be 0.1 to 50 μm in average spherical equivalent diameter, more preferably 0.5 μm too 25 μm, and still more preferably 1 μm to 10 μm. In this range, a high image quality is achieved. That is, when the average particle size is too large, a step difference occurs in the height direction, between the particle existing portion and non-existing portion on the image, and smoothness of image may be inferior. On the other hand, when the average particle size is too small, powder handling property is inferior, and it tends to be hard to supply powder at desired position on transfer body. As a result, a liquid absorbing particle absent portion occurs on the image, and high speed recording and high image quality may not be achieved.

The average spherical equivalent diameter can be determined in the method shown above.

The BET specific surface area ($N_2$) of the ink receptive particles in embodiment C of the invention is preferred to be 1 to 500 $m^2/g$, more preferably 2 to 100 $m^2/g$, and still more preferably 5 to 10 $m^2/g$. In this range, it tends to be excellent in high speed drying performance. It is estimated because the particles defined in this range have sufficient voids in the particles and voids between the particles, so that the liquid can be trapped at high speed in these voids.

The BET specific surface area ($CO_2$)/BET specific surface area ($N_2$) of the ink receptive particles in embodiment C of the invention is preferred to be 1 to 50, more preferably 1 to 40, and still more preferably 5 to 30. In this range, it tends to be excellent in high speed drying performance. It is estimated that since the particles in this range are hydrophilic on the particle surface, the liquid trap speed can be increased from the viewpoint of wettability of particle surface.

Herein, the BET specific surface area ($N_2$) and the BET specific surface area ($CO_2$) can be measured by using a Betathorp automatic surface area meter (MODEL 4200 of Nikkiso Co., Ltd.).

The organic resin of the organic-inorganic hybrid particles may be either a non-liquid absorbing resin or a liquid absorbing resin, and the organic resin of the organic resin particles may be either a non-liquid absorbing resin or a liquid absorbing resin, as long as the inc receptive particles contain a liquid absorbing resin.

The non-liquid absorbing resin is explained. The non-liquid absorbing resin includes hydrophobic monomer alone, or copolymer of plural types. Examples of hydrophobic monomer include ethylene, propylene, butadiene, other olefin compounds, styrene, alpha-methyl styrene, alpha-ethyl styrene, vinyl toluene, other styrene derivatives, methyl methacrylate, ethyl methacrylate, butyl methacrylate, acrylonitrile, vinyl acetate, methyl acrylate, ethyl acrylate, butyl acrylate, lauryl methacrylate, vinyl cylclohexane, vinyl naphthalene, vinyl naphthalene derivatives, alkyl ester acrylate, phenyl ester acrylate, alkyl ester methacrylate, phenyl ester methacrylate, cycloalkyl ester methacrylate, alkyl ester crotonate, dialkyl ester itaconate, and dialkyl ester maleate.

The non-liquid absorbing resin is a material of which solubility is 3 mass % or less when a single resin is added to liquid (ink).

The liquid absorbing resin is explained. In the liquid absorbing resin, since the absorbed ink liquid component (for example, water-based solvent) acts as plasticizer of resin (polymer), and it is softened and the fixing property is improved. Accordingly, the ink receptive particles can be transferred (fixed) on plain paper as recording medium only by pressurizing (however, for improving the gloss of recording medium, heating and pressurizing may be effective). However, if absorbing liquid too much to be swollen, bleeding may occur and fixing property drops, and therefore the liquid absorbing resin is preferred to be weak liquid absorbing resin (a resin that absorbs liquid weakly). The weak liquid absorbing resin is, for example, when absorbing water as liquid, a hydrophilic resin capable of absorbing from several percent (approximately 5 percent) to hundreds of percent (approximately 500 percent) by mass relative to the resin, preferably approximately 5% to 100%.

If the liquid absorbing property is less than approximately 5%, the liquid trapped in the voids may flow out from the voids at the time of transferring (or fixing), and the image quality deteriorates. Besides, since the plasticization force of resin is insufficient, a greater energy is needed for fixing. To the contrary, if the liquid absorbing capacity is too high, not only liquid absorption, but also moisture absorption is active, and therefore, dependence of ink receptive particles on handling environment is higher, and it may be hard to use. For example, by crosslinking the resin at high degree, it is possible to avoid mutual fusion of particle if absorbing moisture (for example, commercial water absorbing resin). In such a case, however, it may be hard to fix on the recording medium. In the case of weak liquid absorbing resin, since the liquid absorbing speed of resin is considerably slower than in the strong liquid absorbing resin, it is an important point in designing of structure and properties of ink receptive particles so as to trap the liquid in the void structure initially, and then absorb liquid in the resin.

From such point of view, the liquid absorbing resin is composed of, for example, a homopolymer of a hydrophilic monomer, or a copolymer composed of both a hydrophilic monomer and a hydrophobic monomer. The copolymer is preferred for obtaining a weak water absorbing resin. In addition to the monomers, graft copolymers or block copolymers may be used by copolymerizing a unit of polymer/oligomer structure as starting material.

Examples of the hydrophilic monomer include monomers including —OH; -EO unit (ethylene oxide group); —COOM wherein M is, for example, a hydrogen, an alkaline metal such as Na, Li, K, or the like, an ammonia, an organic amine, or the like; —$SO_3M$ (M is, for example, a hydrogen, an alkaline metal such as Na, Li, K, or the like, an ammonia, an organic amine, or the like); —$NR_3$ wherein R is H, alkyl, phenyl, or the like; $NR_4X$ wherein R is H, alkyl, phenyl, or the like, and X is a halogen, a sulfate radical, acidic anions such as a carboxylic acid, $BF_4$, or the like. Specific examples of the hydrophilic monomer include 2-hydroxy ethyl methacrylate, 2-hydroxy ethyl acrylate, acrylamide, acrylic acid, methacrylic acid, unsaturated carboxylic acid, crotonic acid, and maleic acid. Examples of a hydrophilic unit or monomer include cellulose derivatives such as cellulose, ethyl cellulose, carboxy methyl cellulose; polymerizable carboxylates such as starch derivatives, monosaccharides, polysaccharides, vinyl sulfonic acid, styrene sulfonic acid, acrylic acid, methacrylic acid, (anhydrous) maleic acid, other polymerizable carboxylates and their (partially) neutralized salts thereof; vinyl alcohols; vinyl pyrrolidone, vinyl pyridine, amino(meth)acrylate or dimethyl amino(meth)acrylate, or onium salts thereof; amide such as acrylamide, isopropyl acrylamide, or the like; vinyl compounds containing polyethylene oxide chain; vinyl compounds containing hydroxyl group; polyesters composed of multifunctional carboxylic acid and polyhydric alcohol; especially branched polyesters having tri- or higher functional acids or acids such as trimellitic acid and containing plural carboxylic acids or hydroxyl groups at the end portion, polyester having polyethylene glycol structure, and the like.

The hydrophobic monomers are monomers a having hydrophobic group, and specific examples include olefin (tyrene, butadiene, etc.), styrene, alpha-methyl styrene, alpha-ethyl styrene, methyl methacrylate, ethyl methacrylate, butyl methacrylate, acrylonitrile, vinyl acetate, methyl acrylate, ethyl acrylate, butyl acrylate, lauryl methacrylate, and the like. Examples of a hydrophobic unit or monomer include styrene derivatives such as styrene, alpha-methyl styrene, vinyl toluene; polyolefines such as vinyl cyclohexane, vinyl naphthalene, vinyl naphthalene derivatives, alkyl acrylate, phenyl acrylate, alkyl methacrylate, phenyl methacrylate, cycloalkyl methacrylate, alkyl crotonate, dialkyl itaconate, dialkyl maleate, polyethylene, ethylene/vinyl acetate, polypropylene, or the like; and derivatives thereof.

Specific examples of liquid absorbing resin composed of copolymers of the hydrophilic monomer and the hydrophobic monomer include olefin polymers (or its modifications, or products into which a carboxylic acid unit is introduced by copolymerization, or the like) such as (meth)acrylate, styrene/(meth)acrylate/(an hydrous) maleic acid copolymer, ethylene/propylene, or the like, branched polyesters enhanced in acid value by trimellitic acid or the like, polyamides, and the like.

Preferably, the liquid absorbing resin has a structure of neutralized salt (for example, carboxylic acid). The neutralized salt structure such as carboxylic acid can form an ionomer by interaction with a cation (for example, a monovalent metal cation such as Na, Li, or the like), when absorbing ink containing the corresponding cation, and thus, the fixing strength of final recorded matter improves. Moreover, the neutralized salt structure such as carboxylic acid promotes the aggregation of recording materials (for example, pigment or dye) having an anionic group and hence the image quality is also improved.

Preferably, the liquid absorbing resin contains a substituted or non-substituted amino group, or substituted or non-substituted pyridine group. Such group has a bactericidal effect or interaction with a recording material having an anion group (for example, a pigment or a dye), and therefore the image quality and fixing property are enhanced.

In the liquid absorbing resin, the molar ratio (hydrophilic monomer:hydrophobic monomer) of hydrophilic unit (hydrophilic monomer) and hydrophobic unit (hydrophobic monomer) is preferably 5:95 to 70:30, more preferably 7:93 to 60:40, and still more preferably 10:90 to 50:50. In particular, the hydrophilic unit is preferably 5 to 70 mol % relative to the total amount of the liquid absorbing resin, more preferably 10 to 50 mol %. If the amount of the hydrophilic monomer is within the above range, the water absorbing speed and water absorbing amount are improved when the ink receptive particles absorb water-based liquid, and the handling performance of receptive particles in environments of high humidity to low humidity, and balance of transfer and fixing property can be established.

Common characteristics of non-liquid absorbing resin and liquid absorbing resin (collectively called organic resin) are described below.

The organic resin may be an organic resin of straight chain structure, or an organic resin of branched structure, preferably, the liquid absorbing resin is branched structure. The organic resin may be non-crosslinked or low crosslinked. The organic resin may be random a copolymer or block copolymer of the straight chain structure, or may be more preferably a polymer of branched structure (examples thereof including a random copolymer, block copolymer and graft copolymer of branched structure). For example, in the case of polyesters synthesized by polycondensation, when the end group is increased in branched structure, it is easier to extend the control latitude of hydrophilic property, water absorbing property, and handling property and fixing property of particles. Regardless of addition polymerization system or in polycondensation system, when a carboxylic group is placed on the branched portion, supply of the cation from ink enables a final formation of a firmly fixed image of an ion crosslinked type. Such branched structure can be obtained by the popular techniques, that is a traces (for example, less than 1%) of a crosslinking agent such as divinyl benzene or di(meth)acrylate is added at the time of synthesizing or a large amount of an initiator is added together with the crosslinking agent. It is to be noted that fixing of recorded image may be difficult or energy required for fixing may be increased when forming a three-dimensional network by enhancing the crosslinking degree of the liquid absorbing resin or the like. To assure the fixing property, even though a crosslinking reaction takes place, it is required to adjust so that the thermoplasticity main be maintained sufficiently on the entire structure, while being kept in part.

The organic resin may be ion-crosslinked by ions supplied from ink. When introducing a unit having a carboxylic acid into the organic resin, the strength of resin image after fixing tends to be higher. Examples of the unit having carboxylic acid include such as copolymers having a carboxylic acid such as (meth)acrylic acid or maleic acid, a (branched) polyesters having a carboxylic acid. It is estimated that ion crosslinking or acid-base interaction occurs between the carboxylic acid in the resin, and alkaline metal cation, alkaline earth metal cation, organic amine, or onium cation, or the like, which is supplied from liquid such as water-based ink, thereby reinforcing the fixed image.

When the organic resin contains a polar group, it is preferred from a viewpoint of enabling hydrophilic property, and charging and conductive properties. The polar group contributing to hydrophilic property is the same as that for the hydrophilic monomer, and includes. Examples of the polar group include hydroxyl group, ethylene oxide group, carboxylate group, and amino group. The polar group contributing to charging and conductive properties is preferably a salt forming structure such as (substituted) amino group, (substituted) pyridine group or its amine salt, quaternary ammonium salt, and the like for positive charging, or is preferably an organic acid (salt) structure such as carboxylic acid (salt), sulfonic acid (salt), and the like for negative charging. It is further effective to add a charge controlling agent for electrophotographic toner such as a salt forming compound of quaternary ammonium salt of low molecular weight, organic borate, salicylic acid derivative, and the like to the organic resin. For controlling the conductivity, it is effective to add conductive or semiconductive inorganic materials such as the oxide, titanium oxide, or the like.

The organic resin is preferred to be an amorphous resin, and its glass transition temperature (Tg) is preferably 40 to 90 deg. C., and more preferably 50 to 70 deg. C. When the glass transition temperature is within this range, the particle handling property, image blocking property, and imaging fixing property are satisfied at the same time. The glass transition temperature (and melting point) is determined from the major maximum peak measured in accordance with ASTMD 3418-8. The major maximum peak can be measured by using DSC-7 (manufactured by Perkin Elmer). In this apparatus, temperature of detection unit is corrected by melting point of indium and zinc, and the calorimetric value is corrected by using fusion heat of indium. For the sample, an aluminum pan is used, and for the control, an empty pan is set. Measurement is carried out at an elevated rate of temperature of 10 deg. C./min.

The weight-average molecular weight of the organic resin is preferably 3,000 to 300,000, or more preferably 10,000 to 100,000. When the weight-average molecular weight is within this range, quick liquid absorption, fixing at a low energy, and strength of image after fixing can be satisfied at the same time. The weight-average molecular weight is measured under the following conditions. For example, the GPC apparatus used is HLC-8120GPC, SC-8020 (manufactured by TOSOH CORPORATION), as the column, two pieces of TSK gel, SuperHM-H (manufactured by TOSOH CORPORATION, 6.0 mm ID×15 cm) are used, and the eluent is THF (tetrahydrofuran). The experiment can be carried out under the following conditions: the sample concentration of 0.5%, flow velocity of 0.6 ml/min, sample injection amount of 10 μl, measuring temperature of 40 deg. C., and IR detector. Calibration curve is prepared from ten samples of polystyrene standard samples TSK standards manufactured by TOSOH CORPORATION, A-500, F-1, F-10, F-80, F-380, A-2500, F-4, F-40, F-128 and F-700.

The acid value of the organic resin may be 50 to 1000 as expressed by carboxylic acid groups (—COOH), preferably 150 to 500, more preferably 50 to 500, and still more preferably 100 to 300. When the acid value is within this range, it is possible to control the handling and water absorbing properties of particles and fixing property. The acid value as expressed by carboxylic acid groups (—COOH) can be measured as follows.

The acid value is measured by a neutralization titration method in accordance with JIS K 0070 (the disclosure of which is incorporated herein by reference). That is, a proper amount of sample is prepared, and to this sample, 100 ml of solvent (diethyl ether/ethanol mixture) is added together with several droplets of indicator (phenolphthalein solution). Then, the resulting mixture is stirred and mixed sufficiently in a water bath until the sample is dissolved completely. The solution is titrated with 0.1 mol/L of potassium hydroxide ethanol solution, and an end point is determined when a pale scarlet color of indicator continues for 30 seconds. Acid value A is calculated by the following equation:

$$A=(B \times f \times 5.611)/S$$

In the above formula, A represents acid value, S is the sample amount (g), B is the amount (ml) of 0.1 mol/L of potassium hydroxide ethanol solution used in titration, and f is a factor of 0.1 mol/L of potassium hydroxide ethanol solution.

The inorganic particles (the inorganic particles and the inorganic materials) are explained below.

The inorganic particles include colorless, pale color, or white particles, and specific examples include colloidal silica, alumina, calcium carbonate, zinc oxide, titanium oxide, tin oxide and the like. These inorganic particles may be surface treated (partial hydrophobic treatment, introduction of specific functional group, etc.). In the case of silica, for example, a hydroxyl group in silica is treated with a silylating agent such as trimethyl chlorosilane or t-butyl dimethyl chlorosilane to introduce an alkyl group. Then, dehydrochlorination takes place by silylating agent, and reaction progresses. When an amine is added to this reaction system, hydrochloric acid is transformed into hydrochloride, and therefore, reaction is promoted. The reaction can be controlled by regulating the treating amount or treating conditions of a silane coupling agent having an alkyl group or phenyl group as a hydrophobic group, or a coupling agent such as titanate system or zirconate system. Similarly, surface treatment can also be carried out by using aliphatic alcohols, higher fatty acids, or derivatives thereof. Further, for the surface treatment, a coupling agent having a cationic functional group such as a silane coupling agent having quaternary ammonium salt structure, (substituted) aminogroups, or the like, silane, a coupling agent having fluorine functional group such as fluorosilane, and other coupling agents having anionic functional group such as carboxylic acid may be used. In particular, the inorganic particles are preferred to be porous particles from the viewpoint of effective liquid absorbing property of ink receptive particles. In embodiments A, B and C, the inorganic particles may be either porous particles or nonporous particles.

Other additives for ink receptive particles of the invention are described below. The ink receptive particles of the invention are preferred to contain components for aggregating or thickening ink components. When such components are contained, recording materials (for example, pigment or dye) contained in ink is aggregated or the polymers are thickened, and therefore the image quality and fixing property are improved.

The component having such functions may be contained as functional groups, or as compound in the water absorbing resin. Examples of such functional group include carboxylic acid, polyhydric metal cation, polyamine, and the like.

Preferred examples of such compound include aggregating agents such as inorganic electrolyte, organic acid, inorganic acid, organic amine, and the like.

Examples of the inorganic electrolyte includes an alkali metal ion such as a lithium ion, a sodium ion, a potassium ion, a polyvalent metal ion such as an aluminum ion, a barium ion, a calcium ion, a copper ion, an iron ion, a magnesium ion, a manganese ion, a nickel ion, a tin ion, a titanium ion and a zinc ion, hydrochloric acid, hydrobromic acid, hydriodic acid, sulfinuric acid, nitric acid, phosphoric acid, thiocyanic acid, and an organic carboxylic acid such as acetic acid, oxalic acid, lactic acid, fumaric acid, citric acid, salicylic acid and benzoic acid, and organic sulfonic acid salts.

Specific examples of the inorganic electrolyte include an alkali metal salt such as lithium chloride, sodium chloride, potassium chloride, sodium bromide, potassium bromide, sodium iodide, potassium iodide, sodium sulfate, potassium nitrate, sodium acetate, potassium oxalate, sodium citrate, and potassium benzoate, and a polyvalent metal salt such as aluminum chloride, aluminum bromide, aluminum sulfate, aluminum nitrate, aluminum sodium sulfate, aluminum potassium sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogenphosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, ion iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, and zinc acetate.

Examples of the organic acid include arginine acid, citric acid, glycine, glutamic acid, succinic acid, tartaric acid, cysteine, oxalic acid, fumaric acid, phthalic acid, maleic acid, malonic acid, lycine, malic acid, the compounds represented by Formula (1), and derivatives of the compounds.

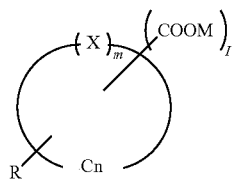

In the Formula (1), X represents O, CO, NH, $NR_1$, S or $SO_2$. $R_1$ represents an alkyl group and $R_1$ is preferably $CH_2$, $C_2H_5$ and $C_2H_4OH$. R represents an alkyl group and R is preferably $CH_2$, $C_2H_5$ and $C_2H_4OH$. R may be or may not be included in the Formula. X is preferably CO, NH, NR and O, and more preferably CO, NH and O. M represents a hydrogen atom, an alkali metal or amines. M is preferably H, Li, Na, K, monoethanol amine, diethanol amine or triethanol amine, is more preferably H, Na, and K, and is further preferably a hydrogen atom. n represents an integer of 3 to 7. n is preferably such a number that a heterocyclic ring is a six-membered ring or five-membered ring, and is more preferably such a number that the heterocyclic ring is a five-membered ring. m represents 1 or 2. A compound represented by the Formula (1) may be a saturated ring or an unsaturated ring when the compound is the heterocyclic ring. I represents an integer of 1 to 5.

Specific examples of the compound represented by the Formula (1) include the compound having any of furan, pyrrole, pyrroline, pyrrolidone, pyrone, pyrrole, thiophene, indole, pyridine, and quinoline structures, and furthermore, having a carboxyl group as a functional group. Specific examples of the compound include 2-pyrrolidone-5-carboxylic acid, 4-methyl-4-pentanolide-3-carboxylic acid, furan carboxylic acid, 2-benzofuran carboxylic acid, 5-methyl-2-furan carboxylic acid, 2,5-dimethyl-3-furan carboxylic acid, 2,5-furan dicarboxylic acid, 4-butanolido-3-carboxylic acid, 3-hydroxy-4-pyrone-2,6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophene carboxylic acid, 2-pyrrole carboxylic acid, 2,3-dimethylpyrrole-4-carboxylic acid, 2,4,5-trimethylpyrrole-3-propionic acid, 3-hydroxy-2-indole carboxylic acid, 2,5-dioxo-4-methyl-3-pyrroline-3-propionic acid, 2-pyrrolidine carboxylic acid, 4-hydroxyproline, 1-methylpyrrolidine-2-carboxylic acid, 5-carboxy-1-methyl pyrrolidine-2-acetic acid, 2-pyridine carboxylic acid, 3-pyridine carboxylic acid, 4-pyridine carboxylic acid, pyridine dicarboxylic acid, pyridine tricarboxylic acid, pyridine pentacarboxylic acid, 1,2,5,6-tetrahydro-1-methyl nicotinic acid, 2-quinoline carboxylic acid, 4-quinoline carboxylic acid, 2-phenyl-4-quinoline carboxylic acid, 4-hydroxy-2-quinoline carboxylic acid, and 6-methoxy-4-quinoline carboxylic acid.

Preferable examples of the organic acid includes citric acid, glycine, glutamic acid, succinic acid, tartaric acid, phthalic acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, or the derivatives or salts thereof. The organic acid is more preferably pyrrolidone carboxylic acid, pyrone carboxylic acid, pyrrole carboxylic acid, furan carboxylic acid, pyridine carboxylic acid, coumalic acid, thiophene carboxylic acid, nicotinic acid, or a derivative or salt thereof. The organic acid is further preferably pyrrolidone carboxylic acid, pyrone carboxylic acid, furan carboxylic acid, coumalic acid, or a derivatives or salts thereof.

An organic amine compound may be any of a primary amine, secondary amine, tertiary amine, quaternary amine or salts thereof. Specific examples of the organic amine compound include a tetraalkyl ammonium, alkylamine, benzalconium, alkylpyridium, imidazolium, polyamine and derivatives or salts thereof. Specific examples of the organic amine include amyl amine, butyl amine, propanol amine, propyl amine, ethanol amine, ethyl ethanol amine, 2-ethyl hexyl amine, ethyl methyl amine, ethyl benzyl amine, ethylene diamine, octyl amine, oleyl amine, cyclooctyl amine, cyclobutyl amine, cyclopropyl amine, cyclohexyl amine, diisopropanol amine, diethanol amine, diethyl amine, di-2-ethylhexyl amine, diethylene triamine, diphenyl amine, dibutyl amine, dipropyl amine, dihexyl amine, dipentyl amine, 3-(dimethyl amino)propyl amine, dimethyl ethyl amine, dimethyl ethylene diamine, dimethyl octyl amine, 1,3-dimethyl butyl amine, dimethyl-1,3-propane diamine, dimethyl hexyl amine, amino butanol, amino propanol, amino propane diol, N-acetyl amino ethanol, 2-(2-amino ethyl amino)-ethanol, 2-amino-2-ethyl-1,3-propane diol, 2-(2-amino ethoxy)ethanol, 2-(3,4-dimethoxy phenyl)ethyl amine, cetyl amine, triisopropanol amine, triisopentyl amine, triethanol amine, trioctyl amine, trityl amine, bis(2-aminoethyl) 1,3-propane diamine, bis(3-aminopropyl)ethylene diamine, bis(3-aminopropyl) 1,3-propane diamine, bis(3-amino propyl)methyl amine, bis(2-ethyl hexyl)amine, bis(trimethyl silyl)amine, butyl amine, butyl isopropyl amine, propane diamine, propyl diamine, hexyl amine, pentyl amine, 2-methyl-cyclohexyl amine, methyl-propyl amine, methyl benzyl amine, monoethanol amine, lauryl amine, nonyl amine, trimethyl amine, triethyl amine, dimethyl propyl amine, propylene diamine, hexamethylene diamine, tetraethylene pentamine, diethyl ethanol amine, tetramethyl ammonium chloride, tetraethyl ammonium bromide, dihydroxy ethyl stearyl amine, 2-heptadecenyl-hydroxyethyl imidazoline, lauryl dimethyl benzyl ammonium chloride, cetylpyridinium chloride, stearamid methylpyridium chloride, a diaryl dimethyl ammonium chloride polymer, a diaryl amine polymer, and a monoaryl amine polymer.

More preferably, there are used triethanol amine, triisopropanol amine, 2-amino-2-ethyl-1,3-propanediol, ethanol amine, propane diamine, and propyl amine as the organic amine compound.

Among these aggregating agents, polyvalent metal salts, such as $Ca(NO_3)$, $Mg(NO_3)$, $Al(OH_3)$, a polyaluminum chloride, and the like are preferable.

The aggregating agents may either be used alone or two or more kinds of the aggregating agents may be mixed and used. The content of the aggregating agent is preferably 0.01% by mass to 30% by mass, more preferably 0.1% by mass to 15% by mass, and further preferably 1% by mass to 15% by mass.

Preferably, a releasing agent is contained in the ink receptive particles of the invention. It is hence possible to transfer or fix the ink receptive particles onto the recording medium in a manner of oilless. The releasing agent may be contained in the liquid absorbing resin, or the releasing agent particles may be contained by compounding it together with particles of liquid absorbing resin.

Examples of such releasing agent include low molecular polyolefins such as polyethylene, polypropylene, polybutene, or the like; silicones having softening point by heating; fatty acid amides such as oleic amide, erucic amide, ricinoleic amide, stearic amide, or the like; vegetable wax such as carnauba wax, rice wax, candelilla wax, Japan wax, jojoba oil, or the like; animal wax such as beeswax, or the like; mineral or petroleum wax such as montan wax, ozokerite, ceresin, paraffin wax, microcrystalline wax, Fischer-Tropsch wax, or the like; and modifications thereof. Among them, crystalline compound is preferred.

External additives may be also added to the ink receptive particles of the invention. By adding the external additives, the ink receptive particles are provided with powder fluidity, charging and conductive control, liquid absorbing control, and the like. Examples of the external additives include inorganic particles (colorless, pale color or white particles, for example, colloidal silica, alumina, calcium carbonate, zinc oxide, titanium oxide, tin oxide, cerium oxide, carbon black, or the like), resin particles (vinyl resin, polyester, silicone particles or the like), and the like. Particles of these external additives may be either hydrophobic or hydrophilic, and may include specific functional groups (for example, amino group or fluorine system) on the surface by treating the surface of the particles with a coupling agent (for example, silane coupling agent). The particle size of the external additive is preferably 5 nm to 100 nm, and more preferably 10 to 50 nm, as expressed by volume average particle size.

(Marking Materials (Marking Materials System))

The marking materials system (marking materials) of the invention at least includes an ink containing a recording material, and the ink receptive particles of the invention. The marking material is a material for recording by receiving ink in the ink receptive particles, and transferring the ink receptive particles on a recording medium.

The ink is described below in detail. Both water-based ink and oil-based ink can be used, but from the environmental viewpoint, water-based ink is preferred. The water-based ink (hereinafter called the ink) contains, in addition to a recording material, an ink solvent (for example, water or water soluble organic solvent). As required, other additives may be also contained.

Next, the recording material will be explained. Examples of the recording material generally include colorants. As the colorant, either a dye or a pigment can be used, but, a pigment is preferable. As the pigment, either an organic pigment or an inorganic pigment can be used. Examples of the black pigment include carbon black pigments such as a furnace black, a lamp black, an acetylene black, and a channel black. In addition to black and three primary colors of cyan, magenta and yellow, specific color pigments of red, green blue, brown, white, or the like, metal glossy pigments of gold, silver, or the like, colorless or pale color extender pigments, plastic pigments, or the like may be used. Moreover, a pigment newly synthesized for the invention may be used as well.

Moreover, particles prepared by fixing a dye or a pigment onto the surface of silica, alumina, polymer beads, or the like as the core, an insoluble lake product of a dye, a colored emulsion, a colored latex, or the like can also be used as a pigment.

Specific examples of the black pigment used in the present invention include RAVEN 7000, RAVEN 5750, RAVEN 5250, RAVEN 5000 ULTRA II, RAVEN 3500, RAVEN 2000, RAVEN 1500, RAVEN 1250, RAVEN 1200, RAVEN 1190 ULTRA II, RAVEN 1170, RAVEN 1255, RAVEN 1080 and RAVEN 1060 (manufactured by Columbian Carbon Company); REGAL 400R, REGAL 330R, REGAL 660R, MOGUL L, Black Pearls L, MONARCH 700, MONARCH 800, MONARCH 880, MONARCH 900, MONARCH 1000, MONARCH 1100, MONARCH 1300 and MONARCH 1400 (manufactured by Cabot Corporation): Color Black FW1, Color Black FW2, Color Black FW2V, Color Black 18, Color Black FW200, Color Black S150, Color Black S160, Color Black S170, PRINTEX 35, PRINTEX U, PRINTEX V, PRINTEX 140U, PRINTEX 140V, Special Black 6, Special Black 5, Special Black 4A and Special Black 4 (manufactured by Degussa Co.): and No. 25, No. 33, No. 40, No. 47, No. 52, No. 900, No. 2300, MCF-88, MA 600, MA 7, MA 8 and MA 100 (manufactured by Mitsubishi Chemical Co., Ltd.). However, the pigments are not restricted thereto.

While specific examples of the cyan color pigments include C.I. Pigment Blue-1, -2, -3, -15, -15:1, -15:2, -15:3, -15:4, -16, -22 and -60, the pigments are not restricted thereto.

While specific examples of the magenta color pigments include C.I. Pigment Red-5, -7, -12, -48, -48:1, -57, -112, -122, -123, -146, -168, -177, -184, -202, and C.I. Pigment Violet-19, the pigments are not restricted thereto.

While specific examples of the yellow color pigments include C.I. Pigment Yellow-1, -2, -3, -12, -13, -14, -16, -17, -73, -74, -75, -83, 93, -95, -97, -98, -114, 128, -129, -138, -151, -154 and -180, the pigments are not restricted thereto.

Here, in the case a pigment is used as the colorant, it is preferable to use a pigment dispersing agent in a combination thereof. As a usable pigment dispersing agent, a polymer dispersing agent, an anionic surfactant, a cationic surfactant, an amphoteric surfactant, a nonionic surfactant, and the like are exemplified.

As the polymer dispersing agent, a polymer having a hydrophilic structure part and a hydrophobic structure part can preferably be used. As the polymer having a hydrophilic structure part and a hydrophobic structure part, a condensation-based polymer and an addition polymer can be used. As the condensation-based polymer, known polyester based dispersing agents can be exemplified. As the addition polymer, addition polymers of monomers having an $\alpha,\beta$-ethylenically unsaturated group can be exemplified. By copolymerizing optionally a monomer having an $\alpha,\beta$-ethylenically unsaturated group having a hydrophilic group and a monomer having an $\alpha,\beta$-ethylenically unsaturated group having a hydrophobic group in combination, a targeted polymer dispersing agent can be obtained. Moreover, a homopolymer of monomers having an $\alpha,\beta$-ethylenically unsaturated group having a hydrophilic group can be used as well.

As the monomer having an $\alpha,\beta$-ethylenically unsaturated group having a hydrophilic group, monomers having a carboxyl group, a sulfonic acid group, a hydroxyl group, a phosphoric acid group, or the like, such as acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinyl naphthalene, vinyl alcohol, acrylic amide, methacryloxy ethyl phosphate, bismethacryloxy ethyl phosphate, methacryloxy ethyl phenyl acid phosphate, ethylene glycol dimethacrylate, and diethylene glycol dimethacrylate can be exemplified.

As the monomer having an α,β-ethylenically unsaturated group having a hydrophobic group, styrene derivatives such as styrene, methylstyrene and vinyl toluene, vinyl cyclohexane, vinyl naphthalene, vinyl naphthalene derivatives, alkyl acrylate, alkyl methacrylate, phenyl methacrylate, cycloalkyl methacrylate, alkyl crotonate, dialkyl itaconate, dialkyl maleate and the like are exemplified.

Preferable examples of the copolymer which is used as a polymer dispersant include styrene-styrene sulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, alkyl acrylate-acrylic acid copolymer, alkyl methacrylate-methacrylic acid copolymer, styrene-alkyl methacrylate-methacrylic acid copolymer, styrene-alkyl acrylate-acrylic acid copolymer, styrene-phenyl methacrylate-methacrylic acid copolymer, and styrene-cyclohexyl methacrylate-methacrylic acid copolymer. Polymers obtained by appropriately polymerizing a monomer having a polyoxyethylene group or a hydroxyl group to these polymers may be used.

As the above-mentioned polymer dispersing agent, from the viewpoint of achieving both the dispersing property of the pigment and the ink ejection property, the polymer dispersant having a weight average molecular weight of 2,000 to 50,000 are preferable. The polymer dispersant having a weight average molecular weight of 3,000 to 20,000 are more preferable, and 4,000 to 8,000 are further preferable.

These pigment dispersing agents may either be used alone or two or more kinds in combination. Although the addition amount of the pigment dispersing agent varies with the types of the pigments largely, in general, it is added at a ratio of 0.1 to 100% by mass in total with respect to the pigment, preferably 1 to 70% by mass, and further preferably 3 to 50% by mass.

A self-dispersible pigment in water can be used as a colorant. The self-dispersible pigment in water used in the present invention refers to the pigment having many water-solubilizing groups on the surface of the pigment, which can be stably dispersed in water without adding any polymer dispersant. The self-dispersible pigment in water is practically obtained by applying surface modification treatments such as an acid or a base treatment, a coupling agent treatment, a polymer graft treatment, a plasma treatment or a redox treatment on so-called usual pigments.

As a self-dispersible pigment in water, in addition to the surface-modified pigments described above, commercially available pigments such as CAB-O-JET-200, CAB-O-JET-300, IJX-157, IJX-253, IJX-266, IJX-273, IJX-444, IJX-55, and CABOT 260 (manufactured by Cabot Corporation), and MICROJET BLACK CW-1 and CW-2 (manufactured by Orient Chemical Industries, Ltd.) may also be used as the self-dispersible pigment in water.

As the self dispersing pigment, a pigment having as a functional group at least a sulfonic acid, a sulfonate, a carboxylic acid, or a carboxylate on the surface thereof is preferable. A pigment having as a functional group at least a sulfonic acid or a sulfonate on the surface thereof is more preferable.

The pigment coated with a resin may be used as the colorant. Such pigment is called as microcapsule pigments, which include commercially available microcapsule pigments manufactured by Dainippon Ink & Chemicals, Inc. and Toyo Ink MFG Co., Ltd. as well as microcapsule pigments prepared for use in the present invention.

Moreover, a resin dispersing type pigment with a polymer substance chemically bonded with the above-mentioned pigment can also be used.

Other examples of recording material include hydrophilic anionic dye, direct dye, cationic dye, reactive dye, high molecular dye, oil-soluble dye, other dyes, wax powder and resin powder colored by dye, emulsions, fluorescent dye or fluorescent pigment, infrared absorber, ultraviolet absorber, ferrite, magnetite, other ferromagnetic materials and magnetic materials, titanium oxide, zinc oxide, other semiconductor and photo catalysts, organic and inorganic electronic material particles.

The content (concentration) of the recording material is preferably 5% by mass to 30% by mass, more preferably 7% by mass to 25% by mass, and still more preferably 10% by mass to 20% by mass, with respect to the ink. Sufficient optical density may not be obtained when the content of the recording material is less than 5% by mass, while the ink ejection characteristics may become unstable when the content of the recording material is larger than 30% by mass.

The volume average particle size of the colorant is preferably 10 nm or more and 1,000 nm or less, more preferably 30 nm or more and 250 nm or less, further preferably 50 nm or more and 200 nm or less, and most porefeably 60 nm or more and 120 nm or less. In the case the volume average particle size of the colorant is too small, the optical density may be low. On the other hand, in the case the volume average particle size of the colorant is too large, the storage stability of the colorant may not be ensured.

The volume average particle size of the colorant denotes the particle size of the colorant itself, or when an additive such as a dispersing agent is adhered onto the colorant, the particle size with the additive adhered. In the invention, as the device for measuring the volume average particle size, MICROTRUCK UPA particle size analysis meter 9340 (produced by Leeds & Northrup Corp.) is used. The measurement is carried out with 4 ml of an ink for an inkjet placed in a measurement cell according to a predetermined measuring method. As the parameters to be inputted at the time of the measurement, the viscosity of the ink for an inkjet is inputted as the viscosity, and the density of the colorant is inputted as the density of the dispersion particles Next, a water-soluble organic solvent will be mentioned. As a water-soluble organic solvent, polyhydric alcohols, a polyhydric alcohol derivative, a nitrogen-containing solvent, alcohols and a sulfur-containing solvent, and the like may be used.

As specific examples of the water-soluble organic solvent, the polyhydric alcohols include ethylene glycol, diethylene glycol, propylene glycol, butylene glycol, triethylene glycol, 1,5-pentane diol, 1,2,6-hexane triol and glycerin.

Specific examples of the polyhydric alcohol derivative include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and the ethylene oxide adduct of diglycerin.

Specific examples of the nitrogen-containing solvent include pyrrolidone, N-methyl-2-pyrrolidone, cyclohexyl pyrrolidone, triethanol amine. Specific examples of the alcohols include ethanol, isopropyl alcohol, butyl alcohol, and benzyl alcohol. Specific examples of the sulfur-containing solvent include thiodiethanol, thiodiglycerol, sulfolane, and dimethyl sulfoxide.

It is also possible to use propylene carbonate, ethylene carbonate, or the like as a water-soluble organic solvent.

It is preferable that at least one kind of water-soluble organic solvent is used. The content of the water-soluble organic solvent to be used may be 1% by mass or more and 70% by mass or less, and is preferably 10% by mass or more and 65% by mass or less, and more preferably, 20% by mass or more and 60% by mass or less. When the content of the water-soluble organic solvent in the ink is less than 1% by mass, a sufficient optical density cannot be obtained in some cases. To the contrary, when the content of the water-soluble organic solvent is more than 70% by mass, the viscosity of the liquid is increased so that the jet characteristic of the liquid may become unstable.

Next, water will be explained. As the water, in order to prevent introduction of impurities, it is particularly preferable to use ion exchange water, ultra pure water, distilled water or ultrafiltrated water.

Next, other additives will be explained. A surfactant may be added to the ink.

As the kinds of the surfactants, various kinds of anionic surfactants, nonionic surfactants, cationic surfactants, and amphoteric surfactants, or the like are exemplified. Preferably, the anionic surfactants and the nonionic surfactants can be used.

Hereinafter, specific examples of the surfactant are mentioned.

Examples of the anionic surfactant may include alkylbenzenesulfonic acid salt, alkylphenylsulfonic acid salt, alkylnaphthalenesulfonic acid salt, higher fatty acid salt, sulfuric acid ester salt of higher fatty acid ester, sulfonic acid salt of higher fatty acid ester, sulfuric acid ester salt and sulfonic acid salt of higher alcohol ether, higher alkylsulfosuccinic acid salt, polyoxyethylenealkyl ethercarboxylic acid salt, polyoxyethylenealkyl ethersulfuric acid salt, alkylphosphoric acid salt and polyoxyethylenealkyl etherphosphoric acid salt, preferably dodecylbenzenesulfonic acid salt, isopropylnaphthalenesulfonic acid salt, monobutylphenylphenol monosulfonic acid salt, monobutylbiphenylsulfonic acid salt, monobutylbiphenylsulfonic acid salt and dibutylphenylphenoldisulfonic acid salt.

Examples of the nonionic surfactant may include polyoxyethylene alkyl ether, polyoxyethylene alkylphenyl ether, polyoxyethylene fatty acid ester, sorbitan fatty acid ester, polyoxyethylene sorbitan fatty acid ester, polyoxyethylene sorbitol fatty acid ester, glycerine fatty acid ester, polyoxyethyleneglycerine fatty acid ester, polyglycerine fatty acid ester, sucrose fatty acid ester, polyoxyethylenealkylamine, polyoxyethylene fatty acid amide, alkylalkanol amide, polyethyleneglycolpolypropyleneglycol block copolymer, acetylene glycol and polyoxyethylene adduct of acetylene glycol, preferably polyoxyethylene adducts such as polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylol amide, polyethyleneglycol polypropyleneglycol block copolymer, acetylene glycol and polyoxyethylene adduct of acetylene glycol.

In addition, silicone surfactants such as polysiloxaneoxyethylene adduct, fluorine-based surfactants such as perfluoroalkyl carboxylic acid salt, perfluoroalkyl sulfonic acid salt and oxyethylene perfluoroalkyl ether, biosurfactants such as spiculisporic acid, rhamnolipid and lysolecithin.

These surfactants may be used solely or as a mixture. The HLB of the surfactant is preferably in the range of 3 to 20 in view of dissolving stability, or the like.

The amount of the surfactant to be added is preferably 0.001% by mass to 5% by mass, and more preferably 0.01% by mass to 3% by mass.

Furthermore, additionally, various additives can be added to the ink, such as a permeating agent, or polyethylene imine, polyamines, a polyvinyl pyrrolidone, a polyethylene glycol, en ethyl cellulose, and a carboxy methyl cellulose, in order to adjust the permeation property, or in order to control the ink ejection property, and compounds of alkali metals such as a potassium hydroxide, a sodium hydroxide and a lithium hydroxide for adjusting the conductivity and the pH. As needed, a pH buffer, an antioxidant, a mildew preventing agent, a viscosity adjusting agent, a conductive agent, an ultraviolet ray absorbing agent, a chelating agent, or the like can be added as well.

Preferred characteristics of the ink are described. First of all, the surface tension of the ink is preferred to be 20 to 45 mN/m, or more preferably 25 to 38 mN/m. When the surface tension is in this range, injection stability, liquid absorbing property of the receptive particles, and high image quality forming are satisfied. If the surface tension is too low, the injection is unstable, or if too high, the image quality may be lowered.

Here, as the surface tension, the value measured under the conditions of 23° C., and 55% RH by the use of the WILLHERMY type surface tension meter (produced by Kyowa Kaimen Kagaku Corp.) is used.

The ink viscosity is preferred to be 1.5 to 30 mPa·s, and more preferably 3 to 20 mPa·s. When the ink viscosity is in this range, injection stability, liquid absorption, and image quality are satisfied. When the viscosity is too high, both high speed injection and high speed liquid absorption may be difficult. When the viscosity is too low, the injection is unstable, and the ink image may be disturbed on ink receptive particles or in particles.

The viscosity is a value measured by using RHEOMAT 115 (manufactured by Contraves), at measuring temperature of 23° C., and the shearing speed of $1400 \, s^{-1}$.

The ink composition is not particularly limited to the above, and may include other functional materials such as a crystal material and electronic material, as well as the recording material.

(Ink Receptive Particle Storage Cartridge)

The ink receptive particle storage cartridge of the invention is detachably disposed in the recording apparatus, and the ink receptive particle storage cartridge is used for holding the ink receptive particles of the invention, and for supplying the ink receptive particles to a particle applying device (particle supply device) of the recording apparatus. By detaching the cartridge from the recording apparatus, the ink receptive particles can be easily added to the recording apparatus.

Figure 10:
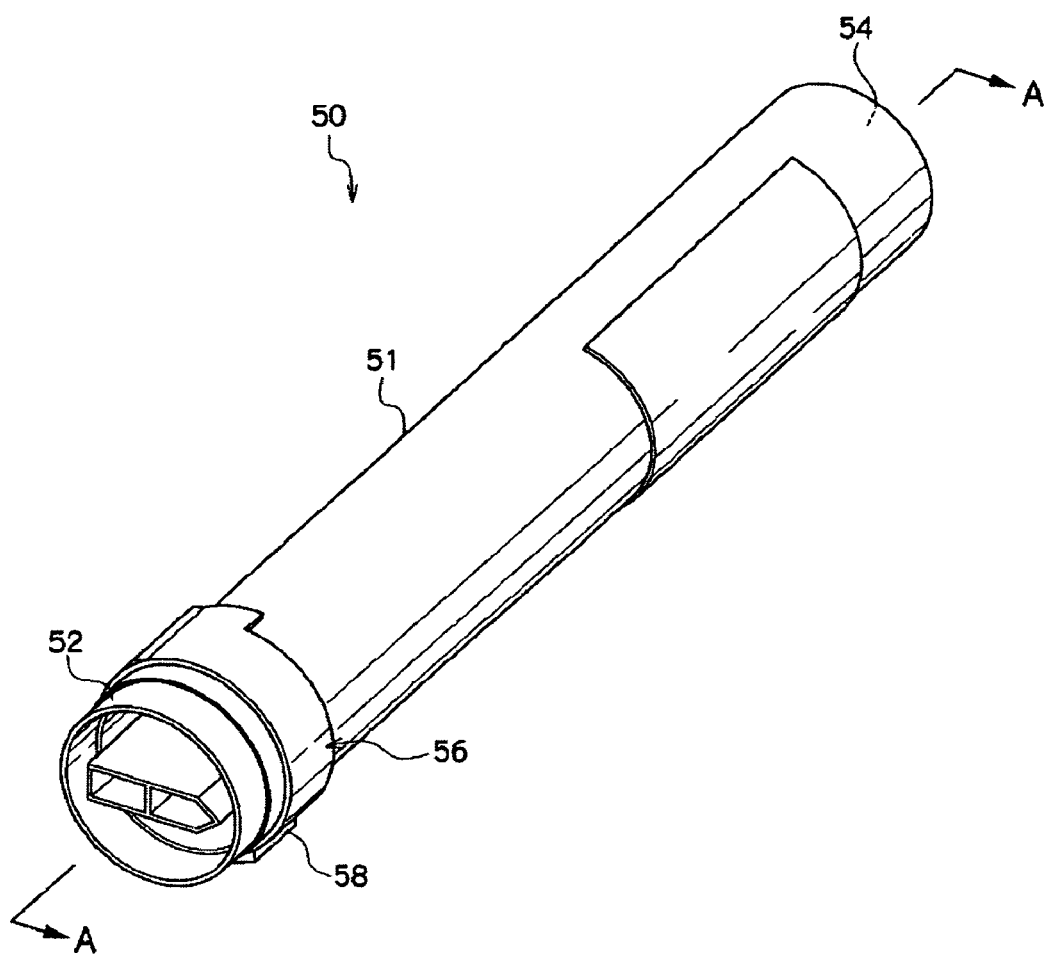
FIG. 10 is a perspective view of an ink receptive particle storage cartridge in an embodiment.
Figure 11:
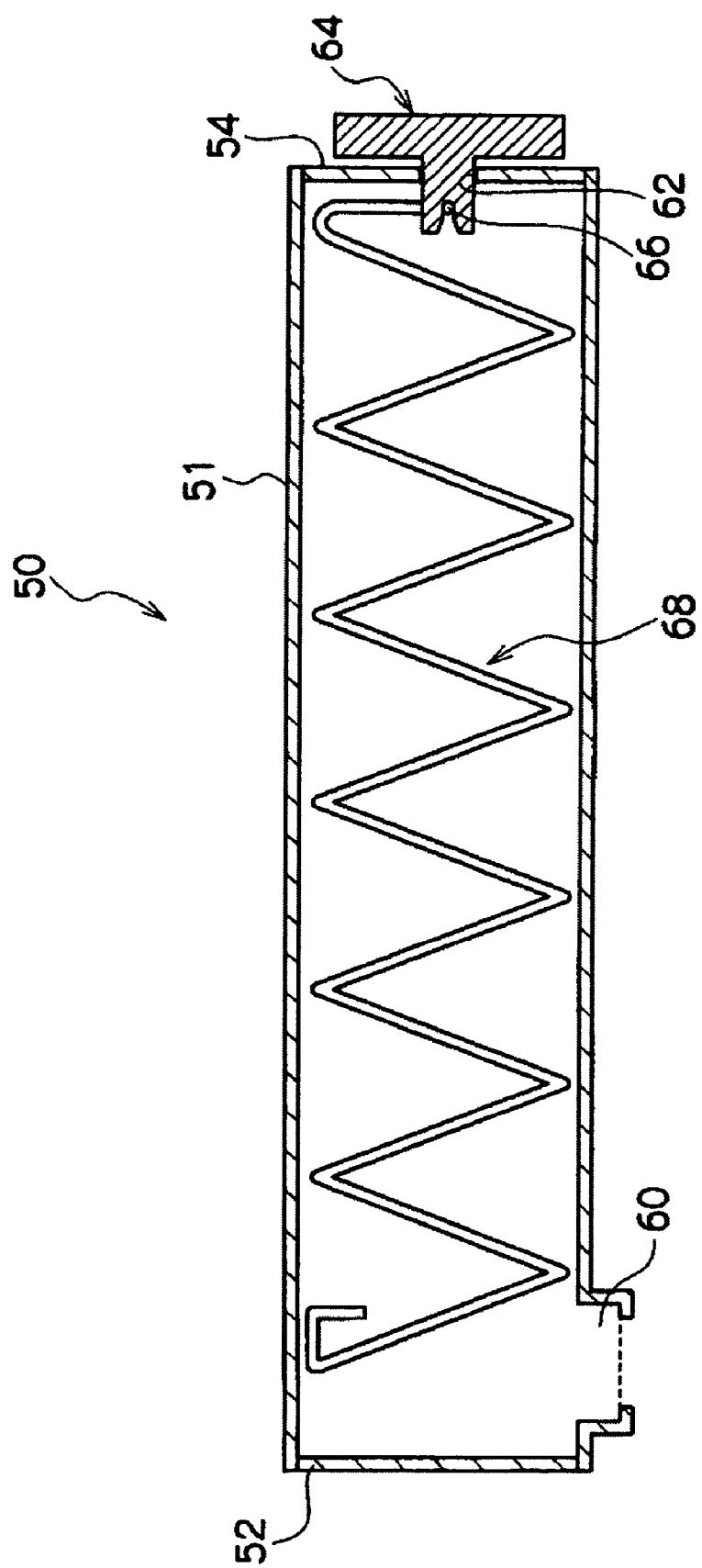
FIG. 11 is a sectional view taken along A-A in FIG. 10.

An embodiment of the ink receptive particle storage cartridge of the invention is described by reference to drawings. FIG. 10 is a perspective view of the ink receptive particle storage cartridge in an embodiment. FIG. 11 is a sectional view A-A in FIG. 10.

As shown in FIG. 10 and FIG. 11, an ink receptive particle storage cartridge 50 of the embodiment comprises a cylindrical particle storage cartridge main body 51, and side walls 52, 54 fitted to both ends of the particle storage cartridge main body 51.

A discharge port 60 is provided on a surface the particle storage cartridge main body 51 at one end, for ejecting ink receptive particles toward the particle applying device (particle supply device; not shown) of the recording apparatus. A belt 56 is slidably provided on the particle storage cartridge main body 51. This belt 56 has a storage unit 58 for accommodating the discharge ports 60 at the outer side of the discharge port 60.

Therefore, when the particle storage cartridge 50 is not installed in the recording apparatus (or right after installing), the storage unit 58 accommodates the discharge port 60 so that the ink absorptive particles contained in the particle storage cartridge main body 51 are unlikely to leak from the discharge port 60.

A hole 62 is provided in the center part of the side wall 54 at the other end of the particle storage cartridge main body 51. A junction 66 of a coupling 64 penetrates from the hole 62 of side wall 54 into the inside of particle storage cartridge main body 51. As a result, the coupling 64 is free to rotate on the side wall 54.

An agitator 68 is disposed nearly in an entire area of particle storage cartridge main body 51. The agitator 68 is a metal linear member, for example, stainless steel (SUS304WP), and is formed in a spiral shape. One end of the agitator is bent in a vertical direction toward the rotary shaft (center of rotation), and is coupled to the junction 66 of the coupling 64. Other end is a free end, being free from restraint.

The agitator 68 receives torque from the junction 66 of the coupling 64, and is put in rotation, and conveys the ink receptive particles in the particle storage cartridge main body 51 toward the discharge port 60 while agitating. Thus, by discharging the particles from the discharge port 60, the recording apparatus can be refilled with ink receptive particles.

The ink receptive particle storage cartridge of the invention is not limited to the example explained above.

(Recording Method, Recording Apparatus)

The recording method (recording apparatus) of the invention is a recording method (recording apparatus) using the ink containing a recording material, and the ink receptive particles of the invention, and includes receiving the ink in the ink receptive particles (receiving unit or discharge unit), and transferring the ink receptive particles having received the ink onto a recording medium (transfer unit). The recording method (recording apparatus) may further include fixing the ink receptive particles transferred on the recording medium (fixing unit).

Specifically, for example, from a supply unit, the ink receptive particles are supplied on an intermediate body in a layer form. On the supplied layer of ink receptive particles (that is, ink receptive particle layer), ink is discharged from the ink discharge unit to be received. The ink receptive particle layer having received the ink is transferred from the intermediate body onto a recording medium by the transfer unit. Entire area of the ink receptive particle layer may be transferred, or only a selected recording area (ink receiving area) may be transferred. The ink receptive particle layer transferred on the recording medium is pressurized (or heated and pressurized) and fixed by the fixing unit, as necessary. Thus, the image is recorded by the ink receptive particles having received the ink. Transfer and fixing may be done also simultaneously.

In order to receive the ink, the ink receptive layers are formed, for example, in a layer, and the thickness of ink receptive particle layer is preferred to be 1 µm to 100 µm, more preferably 3 µm to 60 µm, and still more preferably 5 µm to 30 µm. The porosity of ink receptive particle layer (that is, porosity of voids between ink receptive particles+porosity of voids in ink receptive particles (trap structure)) is preferably 10% to 80%, more preferably 30% to 70%, and still more preferably 40% to 60%.

In the ink receptive particles of the invention, since the liquid absorbing resin absorbs liquid (water), and the liquid (water) functions as plasticizer of resin, it is possible to fix at low energy, further when the liquid (water) is evaporated along with the lapse of time, the fixing strength can be enhanced by the ion crosslinking formed between the metal cation (cluster) supplied from the ink and the carboxylic acid of the resin.

On the surface of the intermediate body, a releasing agent may be applied preliminarily before supply of the ink receptive particles. As a result, the transfer property of ink receptive particle layer is improved. Examples of such releasing agent include (modified) silicone oil, fluorine oil, hydrocarbon oil, mineral oil, vegetable oil, polyalkylene glycol, alkylene glycol ether, alkane diol, fused wax, etc.

The recording medium may be either permeable medium (such as plain paper or coated paper) or impermeable medium (such as resin film). The recording medium is not limited to these examples, and may include semiconductor substrate and other industrial products.

Figure 12:
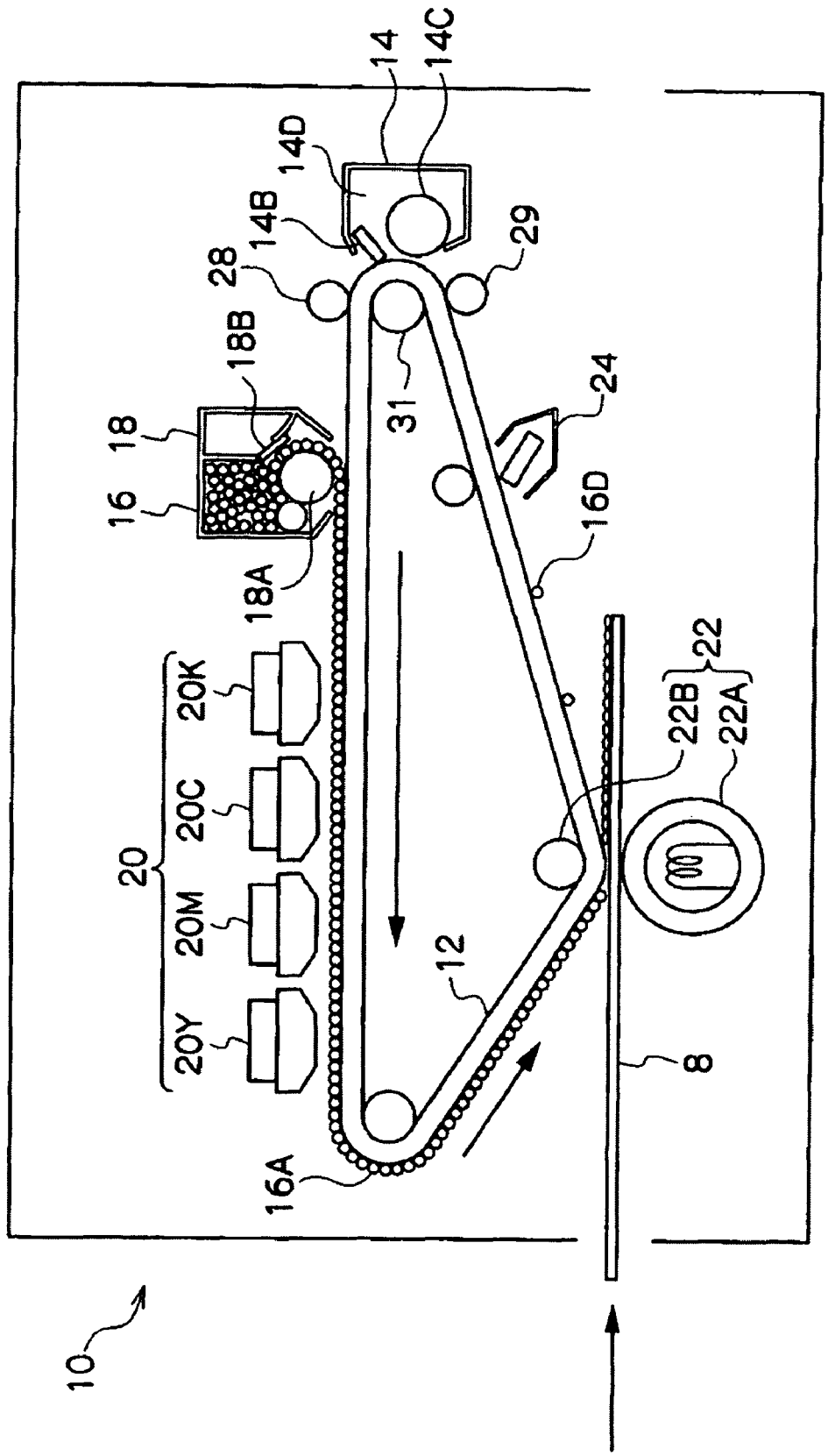
FIG. 12 is a diagram of an example of a recording apparatus according to a first embodiment of the invention.

Embodiments of the recording apparatus of the invention are described below by reference to accompanying drawings. FIG. 12 shows a recording apparatus (image forming apparatus) according to a first embodiment of the invention.

As shown in FIG. 12, a recording apparatus 10 of the invention comprises an endless belt-shaped intermediate transfer body 12, a charging device 28 for charging the surface of the intermediate transfer body 12, a particle applying device 18 for forming a particle layer by adhering ink receptive particles 16 in a uniform and a specified thickness onto a charged region on the intermediate transfer body 12, an ink jet recording head 20 for forming an image by ejecting ink droplets onto the particle layer, and a transfer fixing device 22 for transferring and fixing an ink receptive particle layer on a recording medium 8 by overlapping the intermediate transfer body 12 with the recording medium 8 and by applying pressure and heat.

Figure 13:
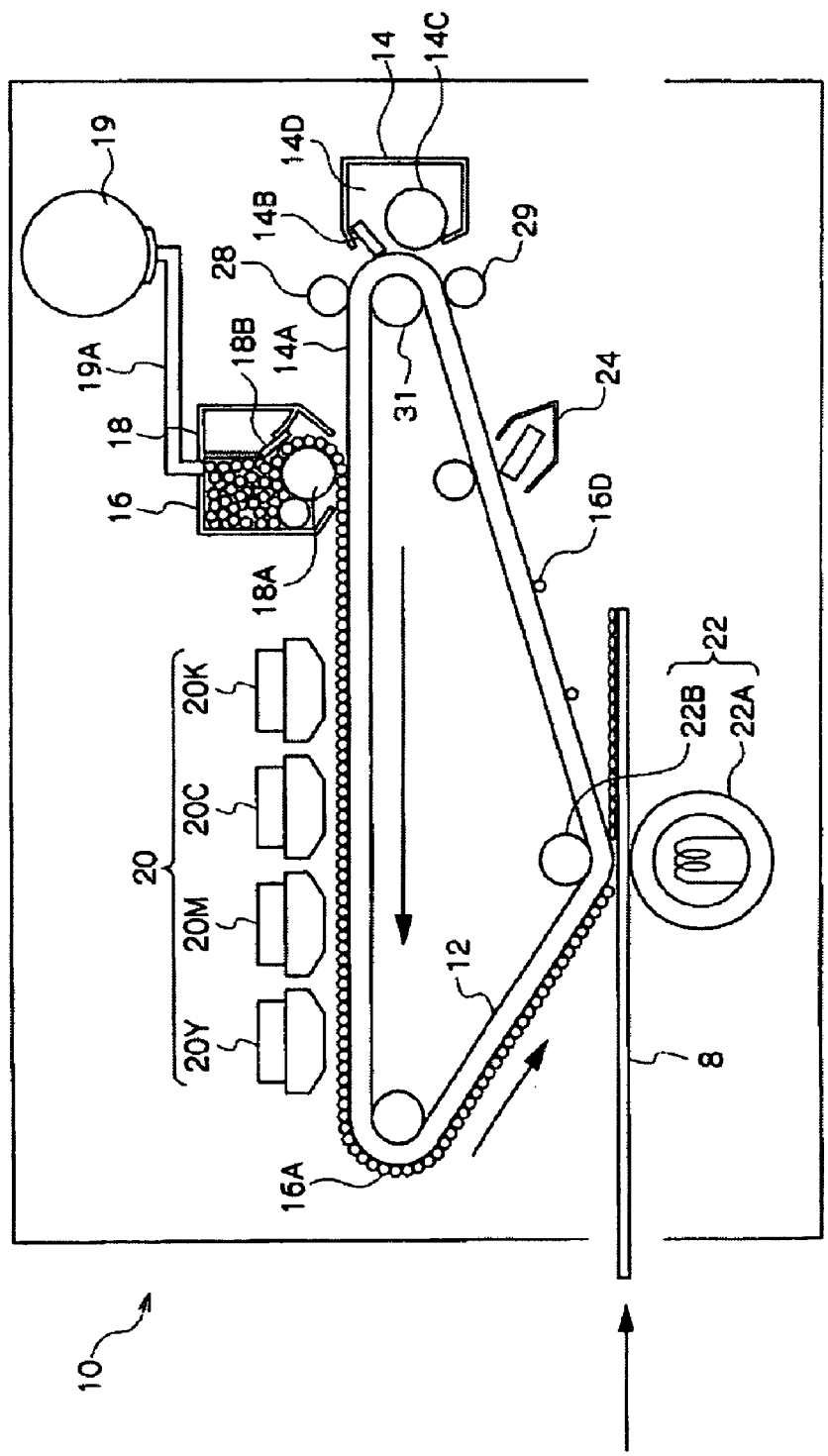
FIG. 13 shows another example of a recording apparatus according to the first embodiment of the invention.

As shown in FIG. 13, in a particle applying device 18, an ink receptive particle storage cartridge 19 may be detachably coupled to the particle applying device 18 with a supply tube 19A provided therebetween.

At the upstream side of charging device 28, a releasing agent applying device 14 is disposed for forming a releasing layer 14A for promoting releasing of an ink receptive particle layer 16A from the surface of intermediate transfer body 12, in order to enhance transfer efficiency of ink receptive particle layer 16A onto the recording medium 8 from the surface of intermediate transfer body 12.

An electric charge is formed on the surface of intermediate transfer body 12 by the charging device 28, and on the charged surface of the intermediate transfer body 12, ink receptive particles 16 are applied and adhered uniformly in a specified thickness from the particle applying device 18, and an ink receptive particle layer 16A is formed. On the ink receptive particle layer 16A, ink droplets 20A in each color are ejected from ink jet recording heads 20 of individual colors, that is, 20K, 20C, 20M, 20Y, and a color image is formed.

The ink receptive particle layer on which the color image layer is formed is transferred onto the recording medium 8 in each color images by the transfer fixing device (transfer fixing roll) 22. At the downstream side of the transfer fixing device 22, a cleaning device 24 is disposed for removing deposits sticking onto the intermediate transfer body such as ink receptive particles 16 remained on the surface of intermediate transfer body 12, and foreign matter (paper dust of recording medium 8 or the like) other than particles.

The recording medium 8 on which the color image is transferred is directly conveyed out, and the surface of the intermediate transfer body 12 is charged again by charging device 28. At this time, ink receptive particles 16 transferred onto the recording medium 8 absorb and hold the ink droplets 20A, and can be discharged quickly, and the productivity of the apparatus as a whole can be enhanced as compared with the conventional method of absorbing ink in the recording medium 8.

As required, a neutralization apparatus 29 may be installed between the cleaning device 24 and the releasing agent applying device 14 in order to remove the residual electric charge on the surface of the intermediate transfer body 12.

In the recording apparatus of an embodiment, the intermediate transfer body 12 is composed of a base layer of polyimide film of 1 mm in thickness, on which a surface layer of ethylene propylene diene monomer (EPDM) rubber of 400 µm in thickness is formed. Herein, the surface resistivity is preferably approximately 10E13 ohms/square, and the volume resistivity is approximately 10E12 ohms-cm (semi-conductivity).

The intermediate transfer body 12 is moved to convey, and a releasing layer 14A is formed on the intermediate transfer body 12 by the releasing agent applying device 14. A releasing agent 14D is applied on the surface of the intermediate transfer body 12 by an application roller 14C of the releasing agent applying device 14, and the layer thickness is regulated by the blade 14B.

At this time, in order to form image and print continuously, the releasing agent applying device 14 may be formed to continuously contact with the intermediate transfer body 12, or may be appropriately separated from the intermediate transfer body 12.

From an independent liquid supply system (not shown), a releasing agent 14D may be supplied into the applying device, so that the supply of releasing agent 14D is not interrupted. In this embodiment, amino silicone oil is used as releasing agent 14D.

By applying a positive charge onto the surface of intermediate transfer body 12 by the charging device 28, a positive charge is applied onto the surface of intermediate transfer body 12. A potential capable of supplying and adsorbing ink receptive particles 16 onto the surface of intermediate transfer body 12 may be formed by an electrostatic force of electric field which can be formed between the ink receptive particle supply roll 18A of ink receptive particle applying device 18 and the surface of intermediate transfer body 12.

In the embodiments of the invention, using the charging device 28, a voltage is applied between the charging device 28 and a driven roll 31 (connected to ground), between which the intermediate transfer body 12 is disposed, and the surface of the intermediate transfer body 12 is charged.

The charging device 28 is a roll shape member adjusted to a volume resistivity of 10 E 6 to 10 E 8 ohms-cm which forms an elastic layer (foamed urethane resin) dispersed with a conductive material on the outer circumference of stainless steel bar material. The surface of elastic layer is coated with a skin layer (PFA) of water-repellent and oil-repellent property of approximately 5 to 100 µm in thickness. It is hence effective in suppressing characteristic changes (changes in resistance value) due to humidity changes in the apparatus, or sticking of releasing agent to the charged layer surface.

A power source is connected to the charging device 28, and the driven roll 31 is electrically connected to the frame ground. The charging device 28 is driven together with the driven roll 31, while the intermediate transfer body 12 is disposed between the charging device 28 and the driven roll 31, and at the pressed position, since a specified potential difference occurs against the grounded driven roll 31, an electric charge can be applied onto the surface of the intermediate transfer body 12. Here, a DC voltage of 1 kV (constant voltage control) is applied onto the surface of intermediate transfer body 12 by the charging device 28, and the surface of the intermediate transfer body 12 is charged.

The charging device 28 may be composed of corotron or brush. In this case, the voltage is applied under almost the same conditions as above. In particular, the corotron can apply an electric charge to the intermediate transfer body 12 without making contact.

Ink receptive particles 16 are supplied from the particle applying device 18 onto the surface of the intermediate transfer body 12, and an ink receptive particle layer 16A is formed. The particle applying device 18 has an ink receptive particle supply roll 18A in the portion facing the intermediate transfer body 12 in the container containing the ink receptive particles 16, and a charging blade 18B is disposed so as to press the ink receptive particle supply roll 18A. The charging blade 18B also functions to regulate the film thickness of the ink receptive particles 16 applied and adhered onto the surface of the ink receptive particle supply roll 18A.

Ink receptive particles 16 are supplied by ink receptive particle supply roll 18A (conductive roll), and the ink receptive particle layer 16A is regulated by the charging blade 18B, and is charged negatively with the reverse polarity of the electric charge on the surface of the intermediate transfer body 12. The supply rolls 18A is aluminum solid rolls, and the charging blades 18B is made of metal plates (such as SUS, or the like) being coated with urethane rubber or the like in order to apply pressure. The charging blade 18B is contacting with a supply roll 18A in a type of doctor blades.

The charged ink receptive particles 16 form, for example, approximately one layer of particles on the surface of the ink receptive particle supply roll 18A, and are conveyed to a position opposite to the surface of intermediate transfer body 12. When closing to the intermediate transfer body 12, the charged ink receptive particles 16 are moved electrostatically onto the surface of intermediate transfer body 12 by the electric field formed by the potential difference on the surfaces of the ink receptive particle supply roll 18A and the intermediate transfer body 12

At this time, the relative ratio (peripheral speed ratio) of moving speed of intermediate transfer body 12 and rotating speed of supply roll 18A are determined such that approximately one layer of particles on the surface of intermediate transfer body 12. This peripheral speed ratio depends on the charging amount of intermediate transfer body 12, charging amount of ink receptive particles 16, relative position of supply roll 18A and intermediate transfer body 12, and other parameters.

On the basis of the peripheral speed ratio for forming approximately one layer of the ink receptive particle layer 16A, if the peripheral speed of ink receptive particle supply roll 18A is relatively accelerated, the number of particles supplied on the intermediate transfer body 12 may be increased. It is hence possible to control the layer thickness of ink receptive particle layer 16A formed on the intermediate transfer body 12. That is, when the transferred image density is low (an amount of the ink load is small), the layer thickness is regulated to a minimally required limit, and when the image density is high (an amount of the ink load is large), it is preferred to regulate to a sufficient layer thickness for holding the ink solvent.

For example, in the case of a character image at which an amount of ink load is small, when forming an image on an ink receptive particle layer 16A, which is approximately one layer, on the intermediate transfer body, the image forming material (pigment) in the ink is trapped near the surface of ink receptive particle layer 16A on the intermediate transfer body 12, and is fixed on the surface of porous particles or fixing particles forming the ink receptive particles 16, so that the distribution is smaller in the depth direction. Accordingly, after transferring and fixing, the amount of image forming material (pigment) exposed on the surface of the image layer is small, and sufficient fixing property against abrasion or the like is realized as compared with the case of forming an image directly on the recording material surface (the case where almost all pigment exists near the surface).

For example, if it is desired to form a layer 16C to be a protective layer on an image layer 16B to be a final image (see FIG. 15A and FIG. 15B), the ink receptive particle layer 16A is formed at substantially three layers thick, and the ink image is formed on the highest layer only, so that the remaining two layers not forming image can be formed, on the image layer 16B as protective layers after transferring and fixing.

Alternatively, when forming an image in two or more colors, or an image at which an amount of ink load is large, ink receptive particles 16 are layered, so that the pigment is trapped on the surface of porous particles and fixing particles capable of holding the solvent in the ink and forming the ink receptive particles 16, and the number of particles is sufficient for the pigment not to reach the lowest layer. In this case, the image forming material (pigment) is not exposed on the image layer surface after transferring and fixing, and ink receptive particles not forming image may be formed as a protective layer on the image surface.

Next, the ink jet recording head 20 applies ink droplets 20A to the ink receptive particle layer 16A. Based on the specified image information, the ink jet recording head 20 applies ink droplets 20A to specified positions.

Finally, by nipping the recording medium 8 and intermediate transfer body 12 by the transfer fixing device 22, and applying pressure and heat to the ink receptive particle layer 16A, the ink receptive particle layer 16A is transferred onto the recording medium 8.

The transfer fixing device 22 is composed of a heating roll 22A incorporating a heating source, and a pressurizing roll 22B, between which the intermediate transfer body 12 is disposed and which are opposed, and the heating roll 22A and pressurizing roll 22B abut against each other to form a nip. The heating roll 22A and pressurizing roll 22B are, like a fixing device (fuser) of electrophotography, formed of an aluminum core, coated with silicone rubber on the outer surface, and are further covered with a PFA tube.

In the nip of heating roll 22A and pressurizing roll 22B, the ink receptive particle layer 16A is heated by the heater and is pressurized, and hence the ink receptive particle layer 16A is fixed simultaneously when transferred onto the recording medium 8.

At this time, resin particles in non-image portion are heated above the softening point (Tg), and are softened (or fused), and the ink receptive particle layer 16A is released from the releasing layer 14A formed on the surface of intermediate transfer body 12 by the pressure, and is transferred and fixed on the recording medium 8. Since weak liquid absorbing resin particles (fixing particles 16E) of the image portions loaded with ink are softened by absorbing the ink solvent, the ink receptive particle layer 16A is released from the releasing layer 14A formed on the surface of intermediate transfer body 12 by the pressure, and is transferred and fixed onto the recording medium 8. At this time, transfer fixing property is improved by heating. In this embodiment, the surface of heating roll 22A is controlled at 160 deg. C. At this time, the ink solvent held in the ink receptive particle layer 16A is held in the same ink receptive particle layer 16A even after trans-fer, and is fixed. Before the transfer fixing device 22, the efficiency of transfer and fixing may be enhanced by preheating the intermediate transfer body 12.

FIG. 14A shows the image forming process according to the first embodiments of the invention. As shown in FIG. 14A, on the surface of intermediate transfer body 12, a releasing layer 14A is formed by a releasing layer applying device 14 in order to prevent problems of sticking of ink receptive particles 16 due to moisture adhesion to the surface, as well as to secure releasing property when transferring. If the material of the intermediate transfer body 12 is aluminum or PET base, the effect of releasing layer 14A is large. Or by using the material such as fluoroplastic or silicone rubber, the surface of the intermediate transfer body 12 may be provided with releasing property.

Next, the surface of intermediate transfer body 12 is charged with the reverse polarity of the ink receptive particles 16 by the charging device 28. As a result, the ink receptive particles 16 supplied by the supply roll 18A of the particle applying device 18 can be adsorbed electrostatically, and a uniform layer of ink receptive particles 16 can be formed on the surface of the intermediate transfer body 12.

Further, on the surface of the intermediate transfer body 12, ink receptive particles 16 are formed as a uniform layer by the supply roll 18A of the particle applying device 18. For example, the ink receptive particle layer 16A is formed such that a thickness thereof corresponds to substantially three layers of particles. That is, the particle layer 16A is regulated to a desired thickness by the gap between the charging blade 18B and supply roll 18A, and thus, the thickness of the particle layer 16A transferred on the recording medium 8 is regulated. Or it may be regulated by the peripheral speed ratio of supply roll 18A and intermediate transfer body 12.

Herein, the structure of ink receptive particles 16 is secondary particles of a diameter of about 2 to 3 μm, preferably aggregated and granulated from fixing particles 16E and porous particles 16F between which gap 16G is formed, as shown in FIG. 14B.

On the formed particle layer 16A, ink droplets 20A are ejected from ink jet recording heads 20 of individual colors driven by piezoelectric or thermal systems, and an image layer 16B is formed on the particle layer 16A. Ink droplets 20A ejected from the ink jet recording head 20 are loaded to the ink receptive particle layer 16A, and are promptly absorbed by voids 16G formed between ink receptive particles 16, and the solvent is then sequentially absorbed in the voids of porous particles 16F and fixing particles 16E, and the pigment (coloring material) is trapped on the surface of primary particles (fixing particles 16E and porous particles 16F) forming the ink receptive particles 16.

At this time, voids between primary particles forming the secondary particles function as a filter, and trap the pigment in the ink near the surface of the particle layer and by trapping and fixing on the primary particle surface, most of the pigment can be trapped near the surface of the ink receptive particle layer 16A.

In order to trap the pigment near the surface of ink receptive particle layer 16A on the surface of primary particles with certainty, it is possible to use a method whereby the ink and ink receptive particles 16 are made to react with each other, and the pigment promptly made insoluble (to aggregate).

After trapping of pigment, the ink solvent permeates in the depth direction of the particle layer, and is absorbed in the voids of porous particles 16F and fixing particles 16E, and is held in voids 16F between particles. The fixing particles 16E absorbing the ink solvent are softened, and hence contribute to transfer and fixing.

Accordingly, advancing to next ink jet recording head 20, when ink droplets 20A of next color are ejected, mixing of inks and bleeding phenomenon can be suppressed.

At this time, the solvent or dispersion medium contained in the ink droplets 20A permeates into the particle layer 16A, however the recording material such as pigment is trapped near the surface of the particle layer 16A. That is, the solvent or dispersion medium may permeate to the back side of the particle layer 16A, however the recording medium, such as pigment, does not permeate to the back side of the particle layer 16A. Hence, when transferred onto the recording medium 8, the particle layer 16C not permeated with the recording material, such as pigment, forms a layer on the image layer 16B. As a result, this particle layer 16C becomes a protective layer for sealing the surface of image layer 16B, and the coloring material, such as pigment, is not exposed on the surface, and so a tough image resistant to abrasion can be formed. The ink is preferred to be a pigment ink of concentration of about 10% or more, but it is not limited to pigment ink, and a dye ink may be also used.

Next, by transferring and/or fixing the particle layer 16A on which the ink image layer 16B is formed on the recording medium 8 from the intermediate transfer body 12, a color image is formed on the recording medium 8. The particle layer 16A on the intermediate transfer body 12 is heated and pressurized by the transfer fixing device 22 heated by heating means such as a heater, and transferred onto the recording medium 8. Fixing by fixing particles 16E is carried out by adhesion between fixing particles 16E, or adhesion of fixing particles 16E and recording medium 8 by pressure and/or heat.

At this time, by adjusting heating and pressurizing as mentioned below, the roughness of the image surface can be properly adjusted, and the degree of gloss can be controlled. Similar effects can be obtained by cooling and peeling off.

After peeling off particle layer 16A, residual particles 16D remaining on the surface of intermediate transfer body 12 are collected by the cleaning device 24 of FIG. 12, and the surface of intermediate transfer body 12 is charged again by the charging device 28, and the ink receptive particles 16 are supplied, and the ink receptive layer 16A is formed.

FIG. 15A and FIG. 115B show particle layers used in forming of images in the invention. As shown in FIG. 15A, on the surface of intermediate transfer body 12, a releasing layer 14A is formed to assure releasing property when transferring and to prevent adhesion inhibition of ink receptive particles 16 due to moisture adhesion to the surface.

Next, on the surface of intermediate transfer body 12, a uniform layer of ink receptive particles 16 is formed by the particle applying device 18. The particle layer 16A formed as mentioned above is preferred to be formed such that a thickness thereof corresponds to substantially three layers of ink receptive particles 16. By regulating the particle layer 16A to a desired thickness, the thickness of the particle layer 16A transferred onto the recording medium 8 is controlled. At this time, the surface of particle layer 16A is formed in a uniform thickness so as not to disturb image forming (forming of image layer 16B) by ejection of ink droplets 20A.

The recording material such as pigment contained in the ejected ink droplets 20A permeates into substantially one third to half of particle layer 16A as shown in FIG. 15A, and a particle layer 16C into which recording material such as pigment has not permeated is remaining beneath it.

When the particle layer 16A is formed on the recording medium by heating, pressurizing and transferring using the transfer fixing device 22, as shown in FIG. 15B, a particle layer 16C not containing ink is present on the ink image layer 16B, and the layer functions as a protective layer for the ink image layer 16B. Accordingly, the ink receptive particles 16, at least after fixing must be transparent.

The particle layer 16C is heated and pressurized by the transfer fixing device 22, and its surface can be made sufficiently smooth, and the degree of gloss of the image surface can be controlled by heating and pressurizing. That is, by controlling either the pressure or heat (or both) applied during transfer and fixing, it is possible to change the state of the surface on which the image layer 16B is formed on the ink receptive particle layer 16A transferred and fixed on the recording medium 8. By increasing the pressure or heat, the roughness of surface of ink receptive particle layer 16A is decreased, and the gloss is increased. By decreasing the pressure or heat, the surface of ink receptive particle layer 16A is not smoothed (remains rough), thereby the gloss is lowered, and a matte finish is obtained.

Further, drying of solvent trapped inside the ink receptive particles 16 may be promoted by heating.

The ink solvent received and held in the ink receptive particle layer 16A is also held in the ink receptive particle layer 16A after transferring and fixing, and is removed by natural drying, in the same way as drying of ink solvent in ordinary water-based ink jet recording. Accordingly, regardless of difference in ink permeability of recording medium 8, or in spite of being impermeable paper, an image of high quality can be formed at higher speed using water-based ink.

Through the above process, the image forming is completed. If residual particles 16D remaining on the intermediate transfer body 12 or foreign matter such as paper dust removed from the recording medium 8 are presented, after transfer of ink receptive particles 16 on the recording medium 8, they may be removed by the cleaning device 24.

When charging is repeated on the intermediate transfer body 12, the charging amount may not remain constant. In such a case, a neutralization apparatus 29 may be disposed at the downstream side of the cleaning device 24. Using a similar conductive roll as in the charging device 28, and an alternating-current voltage of approximately ±3 kV, 500 Hz is applied to the surface of intermediate transfer body 12 between the conductive roll and a driven roll 31 (grounded), and the surface of intermediate transfer body 12 can be neutralized.

The charging voltage, particle layer thickness, fixing temperature and other mechanical conditions are determined in optimum conditions depending on the composition of ink receptive particles 16 or ink, ink ejection volume, and the like, and hence desired effects can be obtained by optimizing each condition.

Figure 16A:
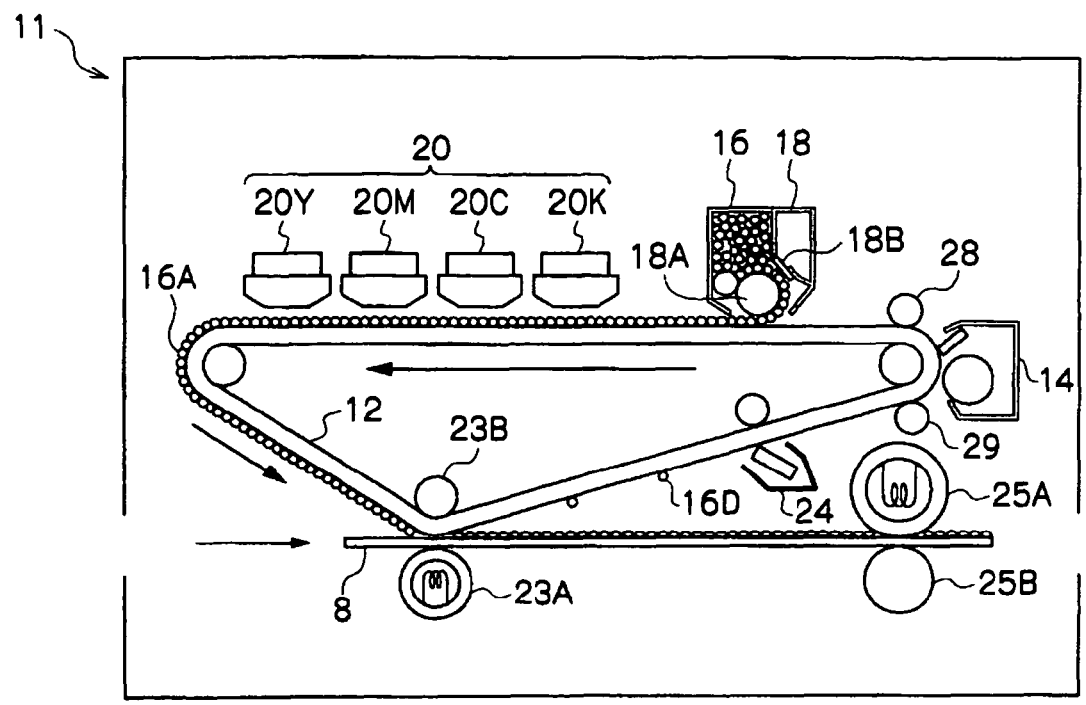
FIG. 16A and FIG. 16B are diagrams of an example of recording apparatus in a second embodiment of the invention.
Figure 16B:
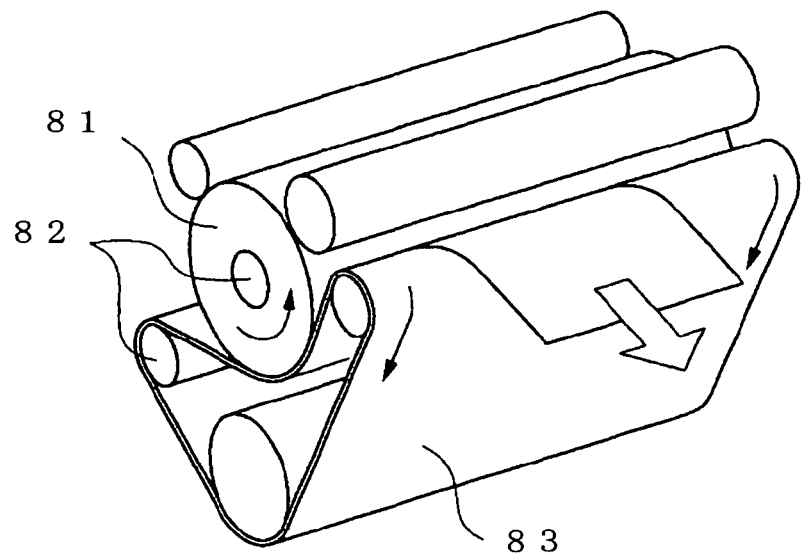

FIG. 16A and FIG. 16B show a recording apparatus of a second embodiment. As shown in FIG. 16A, a recording apparatus 11 of this embodiment comprises an endless belt-shaped intermediate transfer body 12, a charging device 28 for charging the surface of the intermediate transfer body 12, a particle applying device 18 for forming a particle layer by applying and adhering ink receptive particles 16 in a uniform and specified thickness in a charged region on the intermediate transfer body 12, an ink jet recording head 20 for forming an image by ejecting ink droplets on the particle layer, a transfer device 23 for transferring an ink receptive particle layer 16A on the recording medium 8 by overlapping the intermediate transfer body 12 with a recording medium 8, and by applying pressure and heat, and a fixing device 25 for fixing the ink receptive particle layer 16A on the recording medium 8.

In this embodiment, the transfer and fixing process of the first embodiment is separated into transfer and fixing. More specifically, the ink receptive particle layer 16A on the intermediate transfer body 12 is nipped between the transfer roller 23A of the transfer device 23 and the driven roller 23B, which are opposite position and between which the intermediate transfer body 12 is placed, and transferred onto the recording medium 8 together with the image layer 16B.

Then, the ink receptive particle layer 16A transferred onto the recording medium 8 is nipped between the fixing device 25 and the driven roller 25B, which are opposite position and between which the recording medium 8 is placed, and fixed on the recording medium 8.

Thus, by separating into an image transfer operation and fixing operation, the image fixing property can be enhanced without sacrificing print speed. By the secondary fixing operation, pressure in the transfer process can be lowered, and the load on the intermediate transfer body 12 and transfer device 23 can be lessened.

Further, by separating into an image transfer operation and fixing operation, it is easier to control the pressure and heating, and it also becomes easy to control the characteristics of the surface of protective particle layer 15A and the surface of ink receptive particle layer 16A after being transferred on the recording medium 8, and the gloss (surface glossiness) can be controlled more smoothly.

FIG. 16B shows a structure of the fixing device 26. In FIG. 16B, reference numeral 81 is a heat roll, 82 is a heating lamp, and 83 is a belt. As shown in FIG. 16B, it is easier to select a belt nip system capable of extending the nip area.

Figure 17:
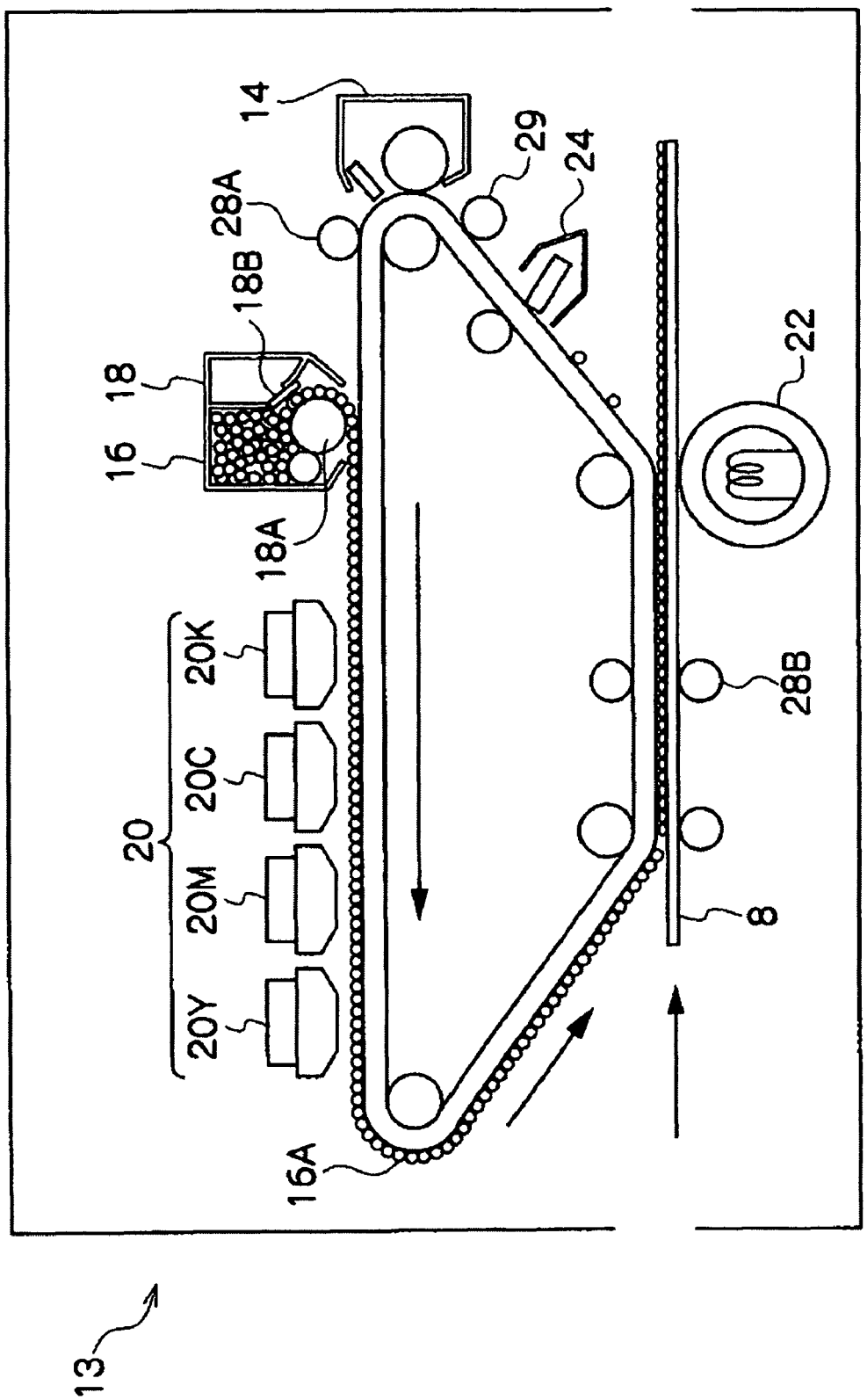
FIG. 17 is a diagram of an example of recording apparatus in a third embodiment of the invention.

FIG. 17 shows a third embodiment of a recording apparatus.

As shown in FIG. 17, the recording apparatus of the invention 13 comprises an endless belt-shaped intermediate transfer body 12, a charging device 28A for charging the surface of the intermediate transfer body 12, a particle applying device 18 for forming a particle layer by applying and adhering ink receptive particles 16 in a uniform and specified thickness in a charged region on the intermediate transfer body 12, an ink jet recording head 20 for forming an image by ejecting ink droplets onto the particle layer, a charging device 28B for charging the back side, that is, the non-image forming side of the recording medium 8, and a transfer fixing device 22 for transferring an ink receptive particle layer 16A onto the recording medium 8 by overlapping the intermediate transfer body 12 with a recording medium 8, and by applying pressure and heat.

In this embodiment, the charging device is provided at the back side of the recording medium (a side opposite to the image forming side) before the transfer and fixing process in the first embodiment.

Since non-image area of ink receptive particle layer 16A is free from ink, the fixing particles 16E are not softened by the ink solvent, and in the first embodiment, it is transferred by adding heat together with pressure, when transferring to the recording medium 8 at the transfer fixing portion 22.

The current third embodiment is characterized by transferring the ink receptive particles 16 in the non-image area, adsorbed electrostatically onto the surface of intermediate transfer body 12, before the transfer fixing process electrostatically onto the surface of recording medium 8, by applying voltage from the back side of the recording medium 8.

Since the ink receptive particles 16 of the ink image layer 16B have absorbed the ink, they are transferred and fixed onto the side of recording medium 8 when pressed. However, since the ink receptive particle layer 16A of the non-image portion is electrostatically adsorbed to the intermediate transfer body 12, it is difficult to transfer in that state. Accordingly, to transfer the ink receptive particle layer 16A in the non-image portion, the ink receptive particle layer 16A on the surface of intermediate transfer body 12 is adhered to the recording medium 8, and an electric field is formed between the recording medium 8 and particles to transfer by electrostatic force.

Specifically, by using a conductive roll 28B, an electric charge of reverse polarity of the ink receptive particles 16 is applied directly to the back side of the recording medium 8 to transfer the ink receptive particles to the recording medium 8. Or an electric charge may be applied by a corotron.

Further, the ink image layer 16B absorbs moisture in the ink, and therefore, is provided with flexibility, and by pressing the ink image layer 16B placed between the intermediate transfer body 12 and recording medium 8, it is transferred to the recording medium 8. Here, in order to transfer the particles of the ink image layer 16B, the ink receptive particles 16 may be heated to above the glass transition point by a heating device to carry out the transfer.

Herein, by applying the electrostatic transfer technology of electrophotography, transfer onto the surface of recording medium 8 can be carried out by applying a voltage of reverse polarity to the charging polarity of ink receptive particles 16 by a conductive roller (charging device 28B in the embodiment). At this time, it is possible to apply sufficient voltage for forming an electric field for peeling off the ink receptive particles 16 electrostatically adsorbed onto the surface of intermediate transfer body 12.

Since the applied voltage and other mechanical conditions are determined by the ink receptive particles or intermediate transfer body, by optimizing each condition, desired results may be obtained. By the above configuration, the transfer efficiency of ink receptive particles in the non-image portion can be enhanced.

Figure 18:
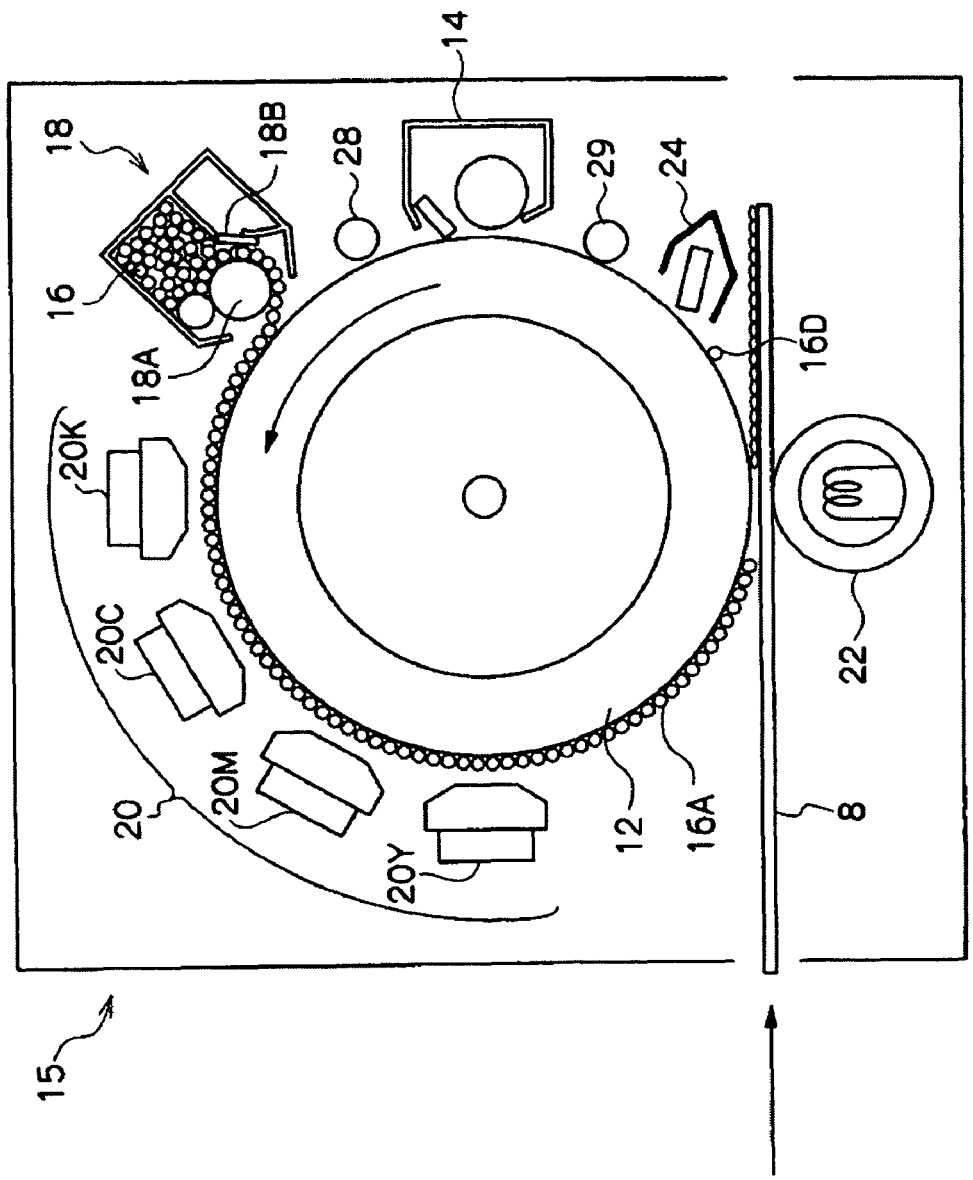
FIG. 18 is a diagram of an example of recording apparatus in a fourth embodiment of the invention.

FIG. 18 shows a recording apparatus of a fourth embodiment. In this embodiment, as shown in FIG. 18, a recording apparatus 15 of this embodiment comprises an intermediate transfer body 12 in a drum shape, a charging device 28 for charging the surface of the intermediate transfer body 12, a particle applying device 18 for forming a particle layer by applying and adhering ink receptive particles 16 in a uniform and specified thickness in a charged region on the intermediate transfer body 12, an ink jet recording head 20 for forming an image by ejecting ink droplets onto the particle layer, and a transfer fixing device 22 for transferring and fixing an ink receptive particle layer onto the recording medium 8 by overlapping the intermediate transfer body 12 with a recording medium 8, and by applying pressure and heat.

In this embodiment, the intermediate transfer body in a drum shape is used in stead of the belt shaped intermediate body 12 in the first embodiment.

In the intermediate transfer body 12 of this embodiment, a conductive substrate of aluminum or aluminum alloy having the surface treated by anodic oxidation is used. As the aluminum alloy, aluminum/magnesium alloy, aluminum/titanium alloy or the like may be used. The surface of these materials is preferably finished to a mirror smooth surface in order to form a uniform layer of anodic oxide film.

Anodic oxidation is preferably carried out under the conditions of voltage of 5 to 500 V and current density of 0.1 to 5 A/dm$^2$, in an acidic bath of chromic acid, sulfuric acid, oxalic acid, boric acid or phosphoric acid. Thickness of anodic oxide film is preferred to be about 2 to 50 μm, or more preferably about 5 to 15 μm. An anodic oxidation surface is often porous, however since a porous surface is chemically unstable, it is preferably treated by hydration sealing by using boiling water or steam.

In this embodiment, the mirror finished surface of aluminum pipe is subjected to anodic oxidation treatment in sulfuric acid at a current density of 1.5 A/dm², and an anodic oxide film of 7 µm is formed, and sealed by boiling water.

As an intermediate transfer body 12, the drum is more rigid as compared with the belt, and it is easier to keep a specified distance between the nozzle surface of the ink jet recording head 20 and the surface of intermediate transfer body 12. In the case of multipass recording specific to ink jet recording, for enhancing the image quality by dividing the recorded image at plural times, as compared with the belt, the drum is advantageous from the viewpoint of assurance of repeated recording position precision.

Figure 19:
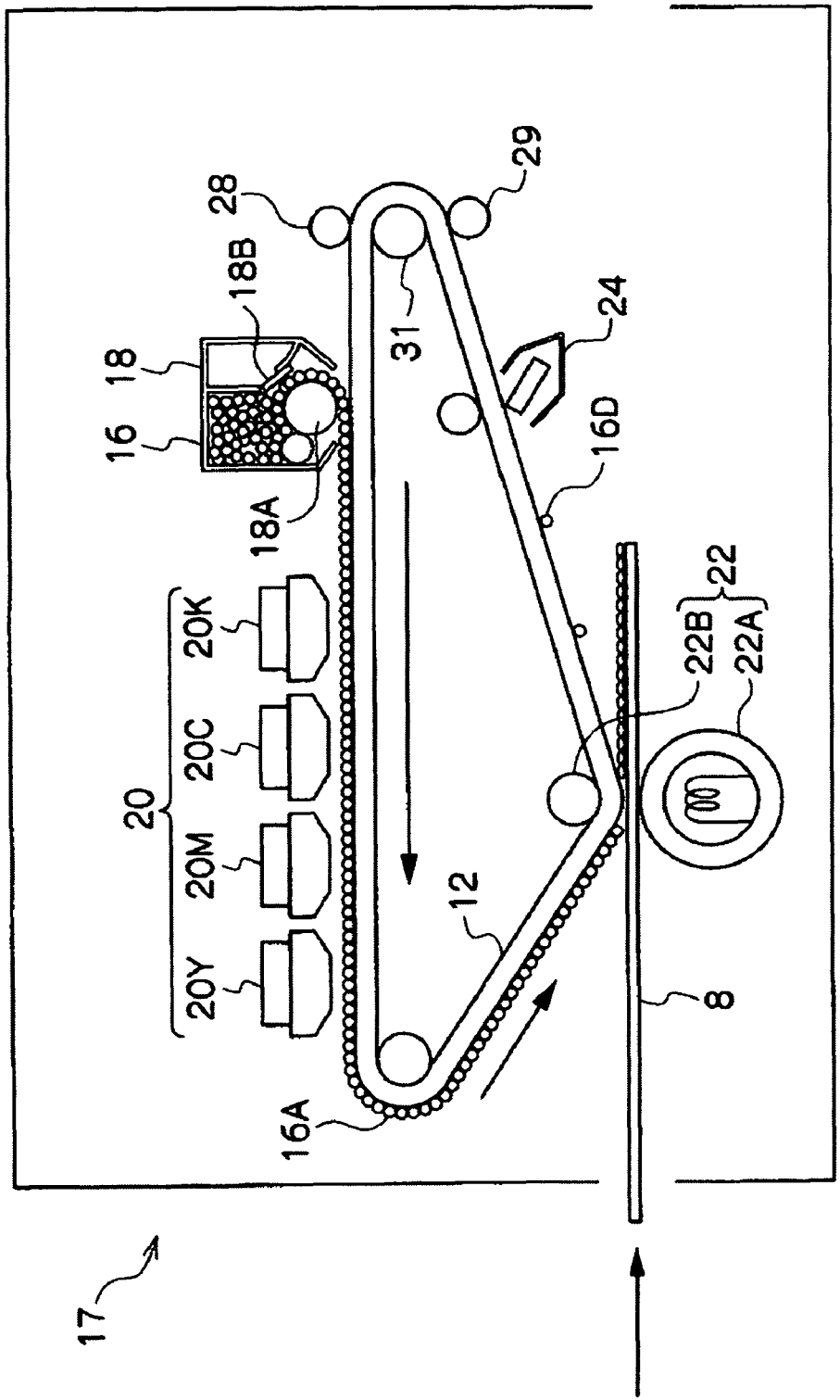
FIG. 19 is a diagram of an example of recording apparatus in a fifth embodiment of the invention.

FIG. 19 shows a recording apparatuses of fifth embodiment of the invention. As shown in FIG. 19, a recording apparatus 17 in the embodiment comprises an endless belt-shaped intermediate transfer body 12, a charging device 28 for charging the surface of the intermediate transfer body 12, a particle applying device 18 for forming a particle layer by applying and adhering ink receptive particles 16 in a uniform and specified thickness in a charged region on the intermediate transfer body 12, an ink jet recording head 20 for forming an image by ejecting ink droplets onto the particle layer, and a transfer fixing device 22 for transferring and fixing an ink receptive particle layer onto the recording medium 8 by overlapping the intermediate transfer body 12 with a recording medium 8, and by applying pressure and heat. This recording apparatuses has the configuration that the releasing agent applying device 14 is omitted from the structure of the first embodiment (FIG. 12).

In the embodiments, it is configured that the surface of intermediate transfer body 12 is formed as a releasing layer (releasing material). As the intermediate transfer body 12, a surface layer of tetrafluoroethylene-perfluoroalkyl vinyl ether copolymer of 400 µm in thickness is formed on a base layer of urethane material of 2 mm in thickness.

Since the surface layer has a releasing property from the ink receptive particles 16, when transferring and fixing, the ink receptive particle layer is transferred efficiently from the intermediate transfer body to the recording medium. Moreover, since the surface layer has a releasing property and also a water repellent property, ink solvent permeating into the ink receptive particle layer does not adhere to the surface of intermediate transfer body 12, and is held in the ink receptive particles 16, and transferred to the recording medium 8. That is, the ink solvent does not remain on the surface of intermediate transfer body 12, and there is no adverse effect on supply of ink receptive particles 16 and others. Hence it is not required to form a releasing layer by applying releasing agent, which contributes to simplification, miniaturization, and low cost.

<Constituent Elements>

Constituent elements in the respective of the first to fifth embodiments of the invention are specifically described below.

Unless otherwise specified in the embodiments, for example, the following constituent elements can be used.

<Ink Receptive Particles>

Ink receptive particles which can be used in the above described embodiments may be, for examples, as follows.

Such ink receptive particles 16 are secondary particles that are aggregated weakly porous particles 16F capable of absorbing and retaining ink droplets 20A, and resin particles 16E having weak ink absorbing and fixing property, and have gaps (voids) 16G between the porous particles 16F and resin particles.

For a method of forming a particle layer 16A by the ink receptive particles 16 is a method that the ink receptive particles 16 are charged and the charged particles are supplied onto the surface of intermediate transfer body 12 by electric field, that is, xerographic method, charging property is required in the ink receptive particles 16. Accordingly, a charging control agent for toner may be internally added to the ink receptive particles 16. Further, in order to fix (trap) a coloring material (particularly pigment) in ink on the surface of porous particles and fixing particles 16E (primary particles), pigment and water-soluble polymer are preferred to be insoluble so as to react with ink receptive particles.

Further, the ink receptive particles 16 have a function of fixing the image when transferred or after transferred on the recording medium 8. For the purpose of fixing, transfer and fixing is carried out by pressure or heat, or pressure and heat using a transfer fixing device 22. In addition, in order to obtain color formation of ink after forming an image (in order to visually recognize the image through a layer 16C formed on an image layer 16B), the ink receptive particles 16 must be transparent at least after fixing.

<Intermediate Transfer Body>

The intermediate transfer body 12 on which the ink receptive particle layer is formed may be either belt as in the first embodiment, or cylindrical (drum) as in the fourth embodiment. To supply and hold ink receptive particles on the surface of intermediate transfer body by an electrostatic force, the outer circumferential surface of the intermediate transfer body must have particle holding property of semiconductive or insulating properties. As electric characteristics for the surface of the intermediate transfer body, it is required to use a material having surface resistance of 10E10 to 14 ohms/square and volume resistivity of 10E9 to 13 ohm-cm in the case of the semiconductive property, and surface resistance of 10E14 ohms/square and volume resistivity of 10E13 ohm-cm in the case of the insulating property.

In the case of belt shape, the base material is not particularly limited as far as it is capable of rotating and driving a belt in the apparatus and has the mechanical strength needed to withstand the rotating and driving, and it has the heat resistance needed to withstand heat when heat is used in transfer/fixing. Specific examples of the substrate are polyimide, polyamide imide, aramid resin, polyethylene terephthalate, polyester, polyether sulfone, and stainless steel.

In the case of drum shape, the base material includes aluminum or stainless steel or the like.

To enhance transfer efficiency of the ink receptive particles 16 (for efficient transfer from intermediate transfer body 12 to recording medium 8), preferably, a releasing layer 14A is formed on the surface of intermediate transfer body 12. The releasing layer 14A may be formed either as surface (material) of the intermediate transfer body 12, or the releasing layer 14A may be formed on the surface of the intermediate transfer body 12 according to the manner of on-process by adding externally.

That is, when the surface of intermediate transfer body 12 is a releasing layer 14A, it is preferred to use fluorine based resins such as tetrafluoroethylene-ethylene copolymer, polyvinylidene fluoride, tetrafluoroethylene-perfluoroalkyl vinyl ether copolymer, tetrafluoroethylene-hexafluoropropylene copolymer, or the like, or elastic materials such as silicone rubber, fluorosilicone rubber, or phenyl silicone rubber.

When forming the releasing layer 14A by external addition, an aluminum of which surface is anodized is used in the case of drum shape, or the same base materials as those for the belt is used in the case of belt shape, or when an elastic material is formed (for either drum shape or belt shape), silicone rubber, fluorosilicone rubber, phenyl silicone rubber, fluororubber, chloroprene rubber, nitrile rubber, ethylene propylene rubber, styrene rubber, isoprene rubber, butadiene rubber, ethylene propylene butadiene rubber, and nitrile butadiene rubber.

In order to apply heating system by electromagnetic induction to the fixing process in the transfer fixing device (transfer fixing roll) 22, a heat generating layer may be formed on the intermediate transfer body 12, not on the transfer fixing device 22. The heat generating layer is made of a metal causing electromagnetic induction action. For example, nickel, iron, copper, aluminum or chromium may be used selectively.

<Particle Supply Process>

On the surface of the intermediate transfer body 12, an ink receptive particle layer 16A of ink receptive particles 16 is formed. At this time, as the method of forming an ink receptive particle layer 16A of the ink receptive particles 16, a general method of supplying an electrophotographic toner on a photoreceptor may be applied. That is, a charge is supplied in advance on the surface of intermediate transfer body 12 by general charging for an electrophotographic method (charging by a charging device 28 or the like). The ink receptive particles 16 are frictionally charged so as to make a counter charge to the charge on the surface of the intermediate transfer body 12 (one-component frictional charging method or two-component method).

Ink receptive particles 16 held on the supply roll 18A in FIG. 14A form an electric field together with the surface of intermediate transfer body 12, and are moved/supplied onto the intermediate transfer body 12 and held thereon by an electrostatic force. At this time, by the thickness of image layer 16B formed on the particle layer 16A of the ink receptive particles 16 (depending on an amount of the ink to be applied), the thickness of particle layer 16A of the ink receptive particles 16 can be also controlled. The charging amount of the ink receptive particles 16 is preferred to be in a range of 5 μc/g to 50 μc/g.

A particle supply process corresponding to one-component development system will be explained below.

The ink receptive particles 16 are supplied on a supply roll 18A, and charged by a charging blade 18B while the thickness of particle layer is regulated.

The charging blade 18B has a function of regulating the layer thickness of the ink receptive particles 16 on the surface of the supply roll 18A, and can change the layer thickness of the ink receptive particles 16 on the surface of the supply roll 18A by varying the pressure on the supply roll 18A. By controlling the layer thickness of the ink receptive particles 16 on the surface of the supply roll 18A to substantially one layer, the layer thickness of the ink receptive particles 16 formed on the surface of the intermediate transfer body 12 can be formed in substantially one layer. By controlling the pressing force on the charging blade 18B to be low, the layer thickness of the ink receptive particles 16 formed on the surface of the supply roll 18A can be increased, and the thickness of particle layer 16A of the ink receptive particles 16 formed on the surface of the intermediate transfer body 12 can be increased.

In other methods, when the peripheral speed of intermediate transfer body 12 and supply roll 18A forming approximately one layer of particle layers on the surface of intermediate transfer body 12 to be 1, by increasing the peripheral speed of supply roll 18A, the number of ink receptive particles 16 supplied on the intermediate transfer body 12 can be increased, and it can be controlled so as to increase the thickness of particle layer 16A on the intermediate transfer body 12. Further, the layer thickness can be regulated by combining the above methods. In this configuration, for example, the ink receptive particles 16 are charged negatively, and the surface of intermediate transfer body 12 is charged positively.

By thus controlling the layer thickness of ink receptive particle layer 16A, consumption of ink receptive particle layer 16A is suppressed, and a pattern of which the surface consistently covered with a protective layer may be formed.

As the charging roll 18 in the charging device, it is possible to use a roll of 10 to 25 mm in diameter, having an elastic layer dispersed with a conductive material on the outer surface of bar or pipe member which is made of aluminum, stainless steel or the like, and having volume resistivity adjusted to approximately 10E6 to 10E8 ohm-cm.

The elastic layer includes resin material a single layer or mixture of two or more resin materials, such as urethane resin, thermoplastic elastomer, epichlorhydrine rubber, ethylene-propylene-diene copolymer rubber, silicon system rubber, acrylonitrile-butadiene copolymer rubber, or polynorbornene rubber. These resin materials may be used alone or mixture of two or more resin materials may be used. A preferred material is a foamed urethane resin.

The foamed urethane resin is preferably a resin having closed cell structure formed by mixing and dispersing a hollow body such as hollow glass beads or microcapsules of thermal expansion type in a urethane resin. Such foamed urethane resin has a low hardness elasticity preferred for charging device, and also has a high contact stability on conveying belt, and is excellent in nip forming property.

Further, the surface of elastic layer may be coated with a water repellent skin layer of 5 to 100 μm in thickness, and it is effective for suppressing characteristic changes (changes in resistance value) due to humidity changes in the apparatus or sticking of ink mist to the charging layer surface.

A DC power source is connected to the charging device 28, and a driven roll 31 is electrically connected to the frame ground. The charging device 28 is driven while the intermediate transfer body 12 is placed between the charging device 28 and the driven roll 31. At the pressing position, since a specified potential difference is generated between the charging device 28 and the grounded driven roll 31, an electrical charge can be applied.

<Marking Process>

Ink droplets 20A are ejected from the ink jet recording head 20 based on an image signal, on the layer (particle layer 16A) of ink receptive particles 16 formed on the surface of intermediate transfer body 12 (particle layer 16A), and an image is formed. Ink droplets 20A ejected from the ink jet recording head 20 are implanted in the particle layer 16A of the ink receptive particles 16, and ink droplets 20A are quickly absorbed in the viods 16G formed in the ink receptive particles 16, and the solvent is sequentially absorbed in the voids of porous particles 16F and fixing particles 16E, and the pigment (coloring material) is trapped on the surface of primary particles (porous particles 16F, fixing particles 16E) forming the ink receptive particles 16.

In this case, preferably, it is desired to trap a plural pigments near the surface of particle layer 16A of ink receptive particles 16. This is realized when voids between the primary particles composing secondary particles have filter effects to trap the pigment near the surface of particle layer 16A, and also trap and fix on the surface of primary particles.

To trap the pigment securely near the surface of particle layer 16A and on the surface of primary particles, the ink may react with ink receptive particles 16, and hence, the pigment may be quickly made insoluble (aggregated). Specifically, this reaction may be realized by making use of reaction between ink and polyhydric metal salt, or pH reaction type.

To write an image at high speed, a line type ink jet recording head (FWA) having a width corresponding to a paper width is preferred, however by using a conventional scan type ink jet recording head, images may be formed sequentially on the particle layer formed on the intermediate transfer body. The ink ejecting unit of ink jet recording head 20 is not particularly limited as far as it is a unit capable of ejecting ink, such as piezoelectric element drive type, or heater element drive type. The ink itself may be ink using a conventional dye as a coloring material, however pigment ink is more preferable.

When the ink receptive particles 16 react with the ink, the ink receptive particles 16 are treated with an aqueous solution containing an aggregating agent such as polyvalent metal salt which has effects of aggregating the pigment by reacting with ink, and dried before use.

<Transfer Process>

The ink receptive particle layer 16A in which an image is formed by receiving ink drops 20A is transferred and fixed on a recording medium 8, and therefore, an image is formed on the recording medium 8. The transfer and fixing may be done in separate processes. However the transfer and fixing is preferably done at the same time. The fixing may be effected by any one of heating or pressing methods of the particle layer 16A, or by using both method of heating and pressing methods, or preferably by heating and pressssing at the same time.

In the method conducting the heating/pressing, for example, the heating and fixing device (fuser) for electrophotography as shown in FIG. 16A can be applied. By controlling heating/pressing, the surface properties of ink receptive particle layer 16A can be controlled, and the degree of gloss can be controlled. After heating/pressing, when peeling the recording medium 8 on which an image (the ink receptive particle layer 16A) is transferred from the intermediate transfer body 12, it may be peeled off after cooling of the ink receptive particle layer 16A. Examples of the cooling method include natural cooling and forced cooling such as air-cooling. In these processes, the intermediate transfer body 12 is preferred to be of belt shape.

The ink image is formed on the surface layer of ink receptive particles 16 formed on the intermediate transfer body 12 (the pigment is trapped near the surface of ink receptive particle layer 16A), and transferred on the recording medium 8, and therefore the ink image is formed so as to be protected by the particle layer 16C composed of ink receptive particles 16. That is, since the pigment (coloring material) is not present on the outermost layer transferred on the recording medium 8, effects of image disturbance by abrasion or the like can be prevented.

The ink solvent received/held in the layer of ink receptive particles 16 is held in the layer of ink receptive particles 16 after transfer and fixing, and removed by natural drying as the same in drying of ink solvent in ordinary water-based ink jet recording.

<Releasing Layer>

To enhance the transfer efficiency, before supplying of ink receptive particles 16, a process may be provided for forming a releasing layer 14A such as silicone oil or the like on the surface of intermediate transfer body 12.

Examples of the material for the releasing layer include silicone oil, modified silicone oil, fluorine based oil, hydrocarbon based oil, mineral oil, vegetable oil, polyalkylene glycol oil, alkyl glycol ether, alkane diol, fused wax, or the like.

Examples of material of elastic body include silicone rubber, fluororubber, and the like. When using silicone rubber, if silicone oil is used as a lubricant, the silicone rubber is swollen, and to prevent the swollen of the silicone rubber, it is preferred to provide the surface of silicone rubber with a coating layer of fluorine resin or fluorine rubber.

Examples of supply method of releasing layer 14 include a method including supplying oil into an oil application member from a built-in oil tank, and forming the releasing layer 14A by supplying oil on the surface of intermediate transfer body 12 by the application member, and a method including forming a releasing layer 14A on the surface of intermediate transfer body 12 by application member impregnated with oil.

<Cleaning Process>

To allow repetitive use by refreshing the surface of intermediate transfer body 12, a process of cleaning the surface by a cleaning device 24 is needed. The cleaning device 24 includes a cleaning part and a recovery part for conveying particles (not shown), and by the cleaning process, the ink receptive particles 16 (residual particles 16D) remaining on the surface of intermediate transfer body 12, and deposits sticking to the surface of intermediate transfer body 12 such as foreign matter (paper dust of recording medium 8 and others) other than particles can be removed. The collected residual particles 16D may be recycled.

<Neutralizing Process>

Depending on the conditions such as temperature or humidity, the surface resistance of intermediate transfer body 12 may be inappropriate value. When the surface of intermediate transfer body 12 is at high resistance, during supply of particles is carried out repeatedly, an electric charge may be accumulated on the surface of the intermediate transfer body 12 to increase the potential, and adverse effects on formation of particle layer may occur.

Before forming the releasing layer 14A, using the neutralizer 29, the surface of the intermediate transfer body 12 may be neutralized. As a result, the electric charge accumulated on the surface of the intermediate transfer body 12 is removed, and effects on formation of ink receptive particle layer 16A can be suppressed.

Other Embodiments

In embodiments, ink droplets 20A are selectively ejected from the ink jet recording heads 20 in black, yellow, magenta, and cyan colors on the basis of image data, and a full-color image is recorded on the recording medium 8. However the invention is not limited to the recording of characters or images on a recording medium. That is, the liquid droplet ejection apparatus used in the invention can be applied generally in liquid droplet ejection (jetting) apparatuses used industrially.

Hereinafter, exemplary embodiments of the invention will be described.

1. Ink receptive particles for receiving ink containing a recording material, comprising:

a trap structure for trapping at least a liquid component of the ink, and a liquid absorbing resin.

2. The ink receptive particles of exemplary embodiment 1, wherein the liquid component is an ink solvent.

3. The ink receptive particles of exemplary embodiment 1, wherein the trap structure is a structure for also trapping the recording material.

4. The ink receptive particles of exemplary embodiment 1, wherein the trap structure is a void structure.

5. The ink receptive particles of exemplary embodiment 1, wherein the trap structure is a recess structure.

6. The ink receptive particles of exemplary embodiment 1, wherein the ink receptive particles are composite particles comprising aggregated liquid absorbing resin particles.

7. The ink receptive particles of exemplary embodiment 6, wherein the composite particles further comprise inorganic particles, in addition to the liquid absorbing resin particles, which are aggregated 8. The ink receptive particles of exemplary embodiment 1, wherein the liquid absorbing resin is a resin that absorbs liquid weakly.

9. The ink receptive particles of exemplary embodiment 1, wherein the liquid absorbing resin has an acid value of 50 to 1000 as expressed by carboxylic acid groups (—COOH).

10. The ink receptive particles of exemplary embodiment 1, wherein the liquid absorbing resin comprises a crosslinking component.

11. The ink receptive particles of exemplary embodiment 10, wherein the crosslinking component is contained as a monomer component.

12. The ink receptive particles of exemplary embodiment 1, wherein the glass transition temperature (Tg) of the liquid absorbing resin is in a range of 40° C. to 90° C.

13. The ink receptive particles of exemplary embodiment 1, wherein the ink receptive particles further comprise a component for aggregating or thickening the ink component.

14. The ink receptive particles of exemplary embodiment 1, further comprising organic resin particles having a rough surface and/or voids.

15. The ink receptive particles of exemplary embodiment 14, wherein the organic resin particles having a rough surface and/or voids are organic resin porous particles.

16. The ink receptive particles of exemplary embodiment 14, wherein the ink receptive particles are composite particles in which the organic resin particles having a rough surface and/or voids are aggregated.

17. The ink receptive particles of exemplary embodiment 16, wherein the composite particles further comprise organic resin nonporous particles and/or inorganic nonporous particles, in addition to the organic resin particles having a rough surface and/or voids, which are aggregated.

18. The ink receptive particles of exemplary embodiment 16, wherein gaps between the particles of the composite particles are 0.1 to 5 μm in maximum opening size.

19. The ink receptive particles of exemplary embodiment 6, wherein the composite particles further comprise organic resin particles, which are aggregated, with a bulk density of the composite particles being 50 to 1000 kg/m³.

20. The ink receptive particles of exemplary embodiment 19, wherein the composite particles further comprise porous particles, in addition to organic resin particles, which are aggregated.

21. The ink receptive particles of exemplary embodiment 20, wherein gaps between the particles comprising the composite particles are 0.1 to 5 μm in maximum opening size.

22. The ink receptive particles of exemplary embodiment 1, comprising organic-inorganic hybrid particles including organic material and inorganic material.

23. The ink receptive particles of exemplary embodiment 22, wherein the ink receptive particles are composite particles in which at least the organic-inorganic hybrid particles are aggregated.

24. The ink receptive particles of exemplary embodiment 23, wherein the composite particles are composite particles in which at least organic resin particles and/or inorganic particles, in addition to the organic-inorganic hybrid particles, are aggregated.

25. A marking materials system comprising: an ink containing a recording material; and ink receptive particles for receiving the ink containing the recording material, wherein the ink receptive particles have a trap structure for trapping at least a liquid component of the ink, and contain a liquid absorbing resin.

26. The marking materials system of exemplary embodiment 25, wherein the concentration of the recording material is 5 to 30% by mass of the ink.

27. An ink receiving method of receiving in ink receptive particles, comprising:
trapping at least an ink liquid component in a trap structure, and
absorbing the ink liquid component trapped in the trap structure in a liquid absorbing resin,
wherein the ink receptive particles have the trap structure for trapping at least the ink liquid component, and contain the liquid absorbing resin.

28. The ink receiving method of exemplary embodiment 27, wherein in the trapping, the recording material is also trapped in the trap structure.

29. A recording method comprising:
receiving an ink containing a recording material at ink receptive particles, and
transferring the ink receptive particles having received the ink onto a recording medium,
wherein the ink receptive particles have a trap structure for trapping at least an ink liquid component, and contain a liquid absorbing resin.

30. The recording method of exemplary embodiment 29, further comprising fixing the ink receptive particles transferred onto the recording medium.

31. A recording apparatus comprising:
a discharge unit that ejects an ink containing a recording material, to be received at ink receiving particles, and
a transfer unit that transfers the ink receptive particles having received the ink onto a recording medium,
wherein the ink receptive particles have a trap structure for trapping at least a liquid component of the ink, and contain a liquid absorbing resin.

32. The recording apparatus of exemplary embodiment 31, further comprising a fixing unit for fixing the ink receptive particles transferred onto the recording medium.

33. An ink receptive particle storage cartridge that holds ink receptive particles, which is detachably disposed in a recording apparatus, wherein the ink receptive particles have a trap structure for trapping at least an ink liquid component, and contain a liquid absorbing resin.

EXAMPLES

The present invention is more specifically described below by referring to examples. These examples are not intended to limit the scope of the invention. Unless otherwise noted, the "parts" refers to "parts by mass."

(Ink Receptive Particles A-1)

Styrene/n-butyl methacrylate/acrylic acid copolymer particles (volume-average particle size 0.2 μm, acid value=240, partially neutralized by sodium hydroxide, Tg=about 60° C.): 100 parts Amorphous silica particles (1:1 mixture of AEROSIL OX50 (volume-average particle size=about 40 nm) and AEROSIL TT600 (volume-average particle size=about 40 nm)): 30 parts These particles are mixed, and a trace of aqueous solution of bactericide (PROXEL GXL(S), manufactured by Archichemicals Japan) is added thereto, and the mixture is agitated and mixed (about 30 seconds by a sample mill). The resultant mixture is intermittently treated by mechanofusion system, and composite particles are prepared. The particle size is measured in each intermittent driving condition, and particles are taken out when the particle size is about 5 μm. By granulating in this method, aggregated composite particles of average spherical equivalent diameter of 5 μm are prepared (base particles a1).

These aggregated composite particles (base particles a1) are treated by externally adding 1.0 mass % of silica particles AEROSIL R972 (manufactured by Nippon Aerosil Co., Ltd., volume-average particle size=about 16 nm) having a hydrophobic treated surface, and 0.5 mass % of untreated hydrophilic silica (AEROSIL 130, manufactured by Nippon Aerosil Co., Ltd., volume-average particle size=about 16 nm), and particles A-1 are prepared.

(Ink Receptive Particles A-2)

Aggregated composite particles (base particles a2) of average spherical equivalent diameter of 10 μm are prepared by varying the granulating condition of base particles a1. These aggregated composite particles (base particles a2) are treated by externally adding 0.6 mass % of AEROSIL R972 having a hydrophobic treated surface, and 0.4 mass % of AEROSIL 130, and particles A-2 are prepared.

(Ink Receptive Particles A-3)

Aggregated composite particles (base particles a3) of average spherical equivalent diameter of 20 μm are prepared by varying the granulating condition of base particles a1. These aggregated composite particles (base particles a3) are treated by externally adding 0.4 mass % of AEROSIL R972 having a hydrophobic treated surface, and 0.0.3 mass % of AEROSIL 130, and particles A-3 are prepared.

(Ink Receptive Particles A-4)

Aggregated composite particles (base particles a4) of average spherical equivalent diameter of 50 μm are prepared by varying the granulating condition of base particles a1. These aggregated composite particles (base particles a4) are treated by externally adding 0.3 mass % of surface hydrophobic agent AEROSIL R972 having a hydrophobic treated surface, and 0.2 mass % of AEROSIL 130, and particles A-4 are prepared.

(Ink Receptive Particles B-1)

Styrene/n-butyl methacrylate/acrylic acid copolymer particles (volume-average particle size 0.2 μm, acid value=240, partially neutralized by sodium hydroxide, Tg=about 60° C.): 100 parts Amorphous silica particles (1:1 mixture of AEROSIL OX50 (volume-average particle size=about 40 nm) and AEROSIL TT600 (volume-average particle size=about 40 nm)): 10 parts These particles are mixed, and a trace of aqueous solution of bactericide (PROXEL GXL(S), manufactured by Archichemicals Japan) is added thereto, together with a trace of alkaline aqueous solution of polyacrylic acid, and the mixture is agitated and mixed (about 30 seconds by a sample mill). The resultant mixture is intermittently treated by mechanofusion system, and composite particles are prepared. Particle size is measured in each intermittent driving condition, and particles are taken out when the particle size is about 5 μm. By granulating in this method, aggregated composite particles of average spherical equivalent diameter of 5 μm are prepared (base particles b1).

These aggregated composite particles (base particles b1) are treated by externally adding 1.0 mass % of silica particles AEROSIL R972 (manufactured by Nippon Aerosil Co., Ltd., volume-average particle size=about 16 nm) having a hydrophobic treated surface, and 0.5 mass % of untreated hydrophilic silica (AEROSIL 130, manufactured by Nippon Aerosil Co., Ltd., volume-average particle size=about 16 nm), and particles B-1 are prepared.

(Ink Receptive Particles B-2)

Aggregated composite particles (base particles b2) of average spherical equivalent diameter of 0.5 μm are prepared by varying the granulating condition of base particles b1. These aggregated composite particles (base particles b2) are treated by externally adding 1.5 mass % of AEROSIL R972 having a hydrophobic treated surface, and 0.5 mass % of AEROSIL 130, and particles B-2 are prepared.

(Ink Receptive Particles C-1)

Branched polyester particles (volume-average particle size 2 μm, acid value=170, partially neutralized by sodium hydroxide, Tg=about 65° C.): 100 parts Amorphous silica particles (1:1 mixture of AEROSIL OX50 (volume-average particle size=about 40 nm) and AEROSIL TT600 (volume-average particle size=about 40 nm)): 15 parts Alumina particles (volume-average particle size 0.1 to 1 μm: a trace of polyvinyl alcohol is added to alumina of volume-average particle size 10 to 20 nm, followed by aggregating and granulating): 15 parts These particles are mixed, and a trace of aqueous solution of bactericide (PROXEL GXL(S), manufactured by Archichemicals Japan) is added thereto, together with a trace of alkaline aqueous solution of polyacrylic acid, and the mixture is agitated and mixed (about 30 seconds by a sample mill). The mixture is intermittently treated by mechanofusion system, and composite particles are prepared. Particle size is measured in each intermittent driving condition, and particles are taken out when the particle size is about 5 μm. By granulating in this method, aggregated composite particles of average spherical equivalent diameter of 5 μm are prepared (base particles c1).

These aggregated composite particles (base particles c1) are treated by externally adding 1.0 mass % of silica particles AEROSIL R972 (manufactured by Nippon Aerosil Co., Ltd., volume-average particle size=about 16 nm) having a hydrophobic treated surface, and 0.5 mass % of untreated hydrophilic silica (AEROSIL 130, manufactured by Nippon Aerosil Co., Ltd., volume-average particle size=about 16 μm), and particles C-1 are prepared.

(Ink Receptive Particles D-1)

Ethylene vinyl acetate copolymer/carboxylic modified polyethylene wax mixed particles (volume-average particle size 2 μm): 50 parts Methyl methacrylate/lauryl methacrylate/acrylic acid copolymer (volume-average particle size 0.2 μm, acid value=150, partially neutralized by sodium hydroxide, Tg=50° C.): 50 parts Amorphous silica particles (1:1 mixture of AEROSIL OX50 (volume-average particle size=about 40 μm) and AEROSIL TT600 (volume-average particle size=about 40 nm)): 20 parts These particles are mixed, and a trace of aqueous solution of bactericide (PROXEL GXL(S), manufactured by Archichemicals Japan) is added thereto, together with a trace of alkaline aqueous solution of polyacrylic acid, and the mixture is agitated and mixed (about 30 seconds by a sample mill). The resultant mixture is intermittently treated by mechanofusion system, and composite particles are prepared. Particle size is measured in each intermittent driving condition, and particles are taken out when the particle size is about 5 μm. By granulating in this method, aggregated composite particles of average spherical equivalent diameter of 5 μm are prepared (base particles d1).

These aggregated composite particles (base particles d1) are treated by externally adding 0.5 mass % of amorphous silica having the surface treated by amino silane (volume-average particle size of 10 to 20 μm), and 1.0 mass % of titanium oxide particles T805 having hydrophobic treated surface (volume-average particle size of 20 nm), and particles D-1 are prepared.

(Ink Receptive Particles E-1)

Particles E-1 are prepared by obtaining aggregated composite particles of average spherical equivalent diameter of 5 μm, in the same manner as in A-1, except that internally added amorphous silica particles of ink receptive particles A-1 are replaced by tin oxide particles (volume-average particle size of about 10 to 30 nm), and that externally added amorphous silica particles are replaced by tin oxide particles (volume-average particle size of about 10 to 30 nm).

(Ink Receptive Particles F-1)

Betaine compound of dimethyl amino ethyl methacrylate/n-butyl methacrylate/styrene copolymer particles (volume-average particle size 0.2 μm): 30 parts Styrene/n-butyl methacrylate/acrylic acid copolymer particles (volume-average particle size 0.2 μm, acid value=240, partially neutralized by sodium hydroxide, Tg=about 60° C.): 70 parts Amorphous silica particles (1:1 mixture of AEROSIL OX50 (volume-average particle size=about 40 nm) and AEROSIL TT600 (volume-average particle size=about 40 nm)): 30 parts These particles are mixed, and a trace of aqueous solution of bactericide (PROXEL GXL(S), manufactured by Archichemicals Japan) is added thereto, together with a trace of alkaline aqueous solution of polyacrylic acid, and the mixture is agitated and mixed (about 30 seconds by a sample mill). The resultant mixture is intermittently treated by mechanofusion system, and composite particles are prepared. Particle size is measured in each intermittent driving condition, and particles are taken out when the particle size is about 5 μm. By granulating in this method, aggregated composite particles of average spherical equivalent diameter of 5 μm are prepared (base particles f1).

These aggregated composite particles (base particles f1) are treated by externally adding 1.5 mass % of AEROSIL 130 having the surface treated with amino silane, and particles F-1 are prepared.

(Ink Receptive Particles R-1)

Styrene/methyl methacrylate/butyl methacrylate copolymer particles (volume-average particle size 0.2 μm, acid value 0, partially neutralized by sodium hydroxide, Tg=50° C.): 100 parts Amorphous silica particles (1:1 mixture of AEROSIL OX50 (volume-average particle size=about 40=n) and AEROSIL TT600 (volume-average particle size=about 40 nm)): 10 parts These particles are mixed, and a trace of aqueous solution of bactericide (PROXEL GXL(S), manufactured by Archichemicals Japan) is added thereto, and the mixture is agitated and mixed (about 30 seconds by a sample mill). The resultant mixture is intermittently treated by mechanofusion system, and composite particles are prepared. Particle size is measured in each intermittent driving condition, and particles are taken out when the particle size is about 5 μm. By granulating in this method, aggregated composite particles of average spherical equivalent diameter of 5 μm are prepared (base particles r1).

These aggregated composite particles (base particles r1) are treated by externally adding 1.0 mass % of amorphous silica (volume-average particle size 10 to 20 nm), and particles R-1 are prepared.

(Ink Receptive Particles R-2)

Crosslinked polyacrylic acid particles (particle size 25 μm) are prepared as particles R-2.

(Ink Receptive Particles R-3)

Porous cellulose particles (particle size=about 10 μm): 100 parts

Polyacrylic acid particles (particle size=about 2 μm): 2 parts

Amorphous silica particles (1:1 mixture of AEROSIL OX50 (volume-average particle size=about 40 nm) and AEROSIL TT600 (volume-average particle size=about 40 nm)): 1 part These particles are mixed, and composite particles of particle size of about 20 μm are prepared as particles R-3.

(Ink Receptive Particles R-4)

Ink receptive particles A-1 are further heated to about 80° C., and are continuously mixed to progress granulation. Particle R-4 are prepared in the same manner as in A-1, except for this process. By SEM observation, composite particle structures (see FIG. 2) are no longer obvious in these particles, and round shapes (particle structures) free from undulations are recognized. After external addition of silica, the powder fluidity is better than in A-1.

(Ink A)

The following ink components are mixed, and agitated, and filtered by membrane filter of pore size of 5 μm, and the ink is prepared.

—Ink Components—

Cyan pigment (Pig. Blue 15-3) (volume-average particle size 80 nm)/dispersant resin (2 parts of polymeric dispersant of acid value 200 containing styrene/acrylic acid): 12 parts Butyl carbitol: 5 parts Diethylene glycol: 10 parts Glycerol: 25 parts Nonionic surfactant (acetylene glycol derivative): 1 part pH regulator, bactericide (PROXEL GXL(S), manufactured by Archichemicals Japan): traces Purified water: 60 parts Obtained ink has surface tension of 33 mN/m, viscosity of 9.1 mPa·s, and pH of 7.8.

(Ink B)

Ink B is prepared in the same manner as ink A, except that 10 parts of self-dispersion cyan pigment (CABOJET 250 of Cabot, volume-average particle size=about 40 nm) is added, instead of pigment/dispersant resin. Obtained ink has surface tension of 33 mN/m, viscosity of 7.8 mPa·s, and pH of 7.5

(Ink C)

Ink C is prepared in the same manner as ink A, except that 3 parts of cyan dye (Direct Blue 199) is added, instead of pigment, while increasing the purified water to 69 parts and decreasing the diethylene glycol (DEG) to 5 parts. Obtained ink has surface tension of 31 mN/m, viscosity of 3.8 mPa·s, and pH of 8.3.

<Evaluation 1>

The ink receptive particles and ink A are evaluated, and results are shown in Table 1.

—Structure of Ink Receptive Particles—

Ink receptive particles are observed as follows. Ink receptive particles are observed by scanning electron microscope, and whether the particles have a composite particle structure or not is confirmed (see FIG. 1 and FIG. 2).

—Liquid Absorbing Properties of Ink Receptive Particles—

On a PET film of 100 μm in thickness, silicone oil is applied as a releasing agent, and ink receptive particles are applied, and a particle layer is formed. By an experimental piezo IJ head, ink is ejected (drop amount=6 to 8 pl; solid printing at 600×1200 dpi), the ink is received in the ink receptive particle layer. At this time, the liquid absorbing speed of particle layer, liquid absorbing amount, and liquid retaining property are observed. Using microsyringe or capillary tube, ink is dropped by several units of ul to several units of ml, and same properties are observed. Criterion of evaluation is as follows:

A: ink absorption is completed in 0.3 s or less, and liquid retaining is stable.

B: ink absorption is completed in 0.3 s to 2 s, and liquid retaining is fairly stable.

C: ink absorption is completed in 2 s or more.

—Coloring Matter Trapping Performance of Ink Receptive Particles—

In the liquid absorbing properties, the state of pigment on particle layer is observed by naked eye and microscopically, and uneven distribution or aggregation of coloring matter, unevenness and turbidity of color are observed. If difficult to judge, ink receptive particles are put into a beaker in a thickness of about 1 cm, and ink is dropped, and permeation of coloring matter and vehicle component in particle layer is observed at the same time. Criterion of observation is as follows:

A: smooth and uniform colored state by pigment (it is estimated that the pigment is uniformly trapped including inside of particles).

B: slightly uneven colored state by pigment (it is estimated that the pigment is trapped fairly sufficiently including inside of particles, but not enough).

C: uneven distribution or aggregation of pigment and unevenness is remarkable (it is estimated that the pigment is not trapped inside of particles).

—Fixing Property 1—

On a PET film of 100 μm in thickness, silicone oil is applied as releasing agent, and ink receptive particles are applied, and a particle layer is formed in a thickness of about 10 to 60 μm. By an experimental piezo IJ head, ink is ejected (drop amount=6 to 8 pl; solid printing at 600×1200 dpi), the ink is received in ink receptive particle layer. This particle layer and plain paper (C2 paper of FXOS) are overlaid, and pressed by a pressurizing roll at linear pressure of about 10 kg/cm, and the particle layer is transferred and fixed on the plain paper. In the fixed image area, same paper is pressed and rubbed by a force of index finger, and sensory evaluation of image strength is conducted. Criterion of evaluation is as follows:

A: same level as laser printer.

B: between A and C.

C: fixed image (pigment) drops or soils the surrounding area like newspaper printing.

—Fixing Property 2—

On a PET film of 100 μm in thickness, silicone oil is applied as releasing agent, and ink receptive particles are applied, and a particle layer is formed in a thickness of about 10 to 60 μm. By an experimental piezo IJ head, ink is ejected (drop amount=6 to 8 pl; solid printing at 600×1200 dpi), the ink is received in ink receptive particle layer. This particle layer and art paper (OK KINFUJI of Manufactured by Oji Paper Co., Ltd.) are overlaid, and pressed by a heat roll having a silicone rubber surface at linear pressure of about 10 kg/cm, and the particle layer is transferred and fixed on the art paper. In the fixed image area, same paper is pressed and rubbed to observe the coloring and gloss of image, and the sensory evaluation of image strength is conducted. Criterion of evaluation is as follows:

A: same level of coloring, gloss and image strength as laser printer.

B: between A and C.

C: pigment image portion drops or soils the surrounding area like newspaper printing, or coloring is low or gloss is low.

<Evaluation 2>

Particles A-1 and E-1 are press-molded, and bulk resistance is measured and conductivity is evaluated. Resistance is $10^{12}$ Ωm or more in particles A-1, and about $10^7$ Ωm in particles E-1.

TABLE 1

| Particle | Remarks (others) | Remarks (structure) Particle shape by SEM observation | High speed fitness (liquid absorbing property) | Coloring matter drop fitness | Fixing property 1 (fixing on plain paper) | Fixing property 2 (fixing on art paper) |
|---|---|---|---|---|---|---|
| A-1 (Example) | Conductivity: $10^{12}$ Ωm | Similar to FIG. 2 (composite particles having liquid trap structure) | A | A | A | A |
| A-2 (Example) | | Similar to FIG. 2 (composite particles having liquid trap structure) | A | A | A | A |
| A-3 (Example) | | Similar to FIG. 2 (composite particles having liquid trap structure) | A-B | A-B | A-B | B |
| A-4 (Example) | | Similar to FIG. 2 (composite particles having liquid trap structure) | B | B-C | B | B-C |
| B-1 (Example) | | Similar to FIG. 2 (composite particles having liquid trap structure) | B | B | A | A |
| B-2 (Example) | Poor particle handling (poor layer thickness) | Similar to FIG. 2 (composite particles having liquid trap structure) | B | B | B | A |
| C-1 (Example) | | Similar to FIG. 2 (composite particles having liquid trap structure) | A | A | A | A |
| D-1 (Example) | | Similar to FIG. 2 (composite particles having liquid trap structure) | A | A-B | A | A |
| E-1 (Example) | Conductivity: $10^7$ Ωm | Similar to FIG. 2 (composite particles having liquid trap structure) | A | A | A | A |
| F-1 (Example) | | Similar to FIG. 2 (composite particles having liquid trap structure) | A | A-B | A | A |
| R-1 (Comparative Example) | | Similar to FIG. 2 (composite particles) | C | C | C | B |

TABLE 1-continued

| Particle | Remarks (others) | Remarks (structure) Particle shape by SEM observation | High speed fitness (liquid absorbing property) | Coloring matter drop fitness | Fixing property 1 (fixing on plain paper) | Fixing property 2 (fixing on art paper) |
|---|---|---|---|---|---|---|
| R-2(Comparative Example) | | Particle structure not similar to FIG. 2 (single particle structure) | B-C | C | C | C |
| R-3(Comparative Example) | | Particle structure not similar to FIG. 2 (single porous particle structure) | A-B | B-C | C | C |
| R-4(Comparative Example) | | Particle structure not similar to FIG. 2 (round particle structure without undulation) | B-C | B-C | B-C | B-C |

As shown in Table 1, ink receptive particles of Examples absorb ink liquid component quickly by void structures (trap structures), and further absorb liquid by liquid absorbing resin, and therefore the liquid absorbing speed is fast, the liquid absorbing amount is sufficient, and the retention stability is high. The ink pigment is trapped (retained and fixed) in void structures (trap structures), and the image quality is high. Whether in plain paper or in art paper, the fixing performance is excellent. Regardless of types of ink, it is found that recording is possible in various recording media at high speed and at high image quality.

When using ink receptive particles F-1, spreading of ink image on ink receptive particles slightly decreases, and the liquid absorption tends to be slow. This is estimated because the ink receptive particles are cationic and the ink is anionic, and the image tends to be clear (less bleeding (feathering)) due to interaction of two materials.

Similar effects are obtained by using inks B and C, instead of ink A. Hence, regardless of pigment and coloring matter, it is found that the ink receptive particles of the Examples trap by the trap structures, and retain uniformly, and are hence excellent in image quality.

Ink Receptive Particles of Embodiment A

Example A1

Embodiment A

—Preparation of Particles A—

Several types of polymer different in degree of polymerization are prepared, mixed, and adjusted so that properties after mixing may be as specified (see below), and styrene/n-butyl acrylate polymer/acrylic acid copolymer (acid value 320 mg KOH/g, weight-average molecular weight 100,000, number-average molecular weight 7,000, Tg=55° C., liquid absorbing property: liquid absorbing) is obtained.

To styrene/n-butyl acrylate polymer/acrylic acid copolymer, 2,2-azobis isobutylonitrile is added by 2.5% by mass, and fused and mixed by extruder. The obtained powder is crushed by jet mill, and sorted by ultrasonic vibration sieve, and particles A of volume-average diameter 8 μm are obtained (porous styrene/n-butyl methacrylate particles, maximum opening size 330 nm/BET specific area ($N_2$) 240 $m^2/g$).

Example A2

Embodiment A

—Preparation of Particles B—

To branched polyester polymer (acid value 25 mg KOH/g, weight-average molecular weight 60,000, number-average molecular weight 2,500, Tg=75° C., liquid absorbing property: weak liquid absorbing), 2,2-azobis isobutylonitrile is added by 2.5% by mass, and fused and mixed by extruder. The obtained powder is crushed by jet mill, and sorted by ultrasonic vibration sieve, and particles B of volume-average diameter 5 μm are obtained (porous polyester polymer particles, maximum opening size 580 nm/BET specific area ($N_2$) 320 $m^2/g$).

Example A3

Embodiment A

—Preparation of Particles D—

Particles A: 100 parts by mass

Alumina (A33F, manufactured by Japan Light Metals, volume-average particle size 0.7 μm, nonporous): 15 parts by mass The materials are mixed by the above specified ratio, and a trace of aqueous solution of bactericide (PROXEL GXL(S), manufactured by Archichemicals Japan) is added thereto, and the mixture is agitated and mixed (about 30 seconds by a sample mill), The resultant mixture is intermittently treated by mechanofusion system, and particle size is measured in each intermittent driving condition, and particles are taken out when the average spherical equivalent diameter is about 10 μm, and composite particles are prepared. As a result, base particles of average spherical equivalent diameter of 10 μm are obtained.

In succession, in 100 parts by mass of the base particles, polypropylene wax (PELLESTAT 300, manufactured by Sanyo Chemical Industries, Ltd.): 1 part by mass, zinc stearate: 0.2 part by mass, and alumina (A33F, manufactured by Japan Light Metals, volume-average particle size 0.7 μm, nonporous): 1 part by mass are added and agitated and mixed, and particles D of average spherical equivalent diameter of 10 μm are obtained.

Example A4

Embodiment A

—Preparation of Particles E—

Particles B: 100 parts by mass

Styrene/n-butyl acrylate polymer/acrylic acid copolymer (nonporous particles, volume-average particle size 0.2 μm, acid value 240 mg KOH/g, Tg 60° C., weight-average molecular weight 15,000, number-average molecular weight 6,000, liquid absorbing property: weak liquid absorbing): 30 parts by mass Polyvinyl alcohol: 0.5 part by mass The materials are mixed by the above specified ratio, and a trace of aqueous solution of bactericide (PROXEL GXL(S), manufactured by Archichemicals Japan) is added thereto, and the mixture is agitated and mixed (about 30 seconds by a sample mill). The resultant mixture is intermittently treated by mechanofusion system, and particle size is measured in each intermittent driving condition, and particles are taken out when the average spherical equivalent diameter is about 8 μm, and composite particles are prepared. As a result, base particles of average spherical equivalent diameter of 8 μm are obtained.

In succession, in 100 parts by mass of the base particles,
paraffin wax (OX-3215, manufactured by Japan Seiro Co., Ltd.): 1 part by mass, and
stearyl alcohol: 0.15 part by mass
are added and agitated and mixed, and particles E of average spherical equivalent diameter of 8 μm are obtained.

Example A5

Embodiment A

—Preparation of Particles C—

Butyl acrylate, 30 parts by mass, diethylene glycol dimethacryalte, 10 parts by mass, and benzoyl peroxide, 0.4 parts by mass, are added in n-hexane/ethyl acetate mixed solution, and solution A is obtained. In ion exchange water, polyvinyl alcohol, 10 parts by mass, and sodium lauryl sulfate, 0.04 parts by mass, are dissolved, and solution B is obtained.

Solution A and solution B are poured in a homogenizing mixer, and dispersed. The obtained solution is heated and agitated. The obtained product is filtered. The obtained particles are dried by freeze dryer, and particles C of volume-average diameter of 7 μm are obtained (porous acrylic ester particles, maximum opening size 800 nm/BET specific area ($N_2$) 60 m$^2$/g).

—Preparation of Particles F—

Particles C: 100 parts by mass n-butyl methacrylate/acrylic acid copolymer (nonporous particles, volume-average particle size 0.5 μm, acid value 120 mg KOH/g, Tg 70° C., weight-average molecular weight 25,000, number-average molecular weight 8,500, liquid absorbing property: weak liquid absorbing): 25 parts by mass Amorphous silica (AEROSIL 130, manufactured by Degussa, volume-average particle size 16 μm, nonporous): 15 parts by mass Polyvinyl alcohol: 0.5 part by mass The materials are mixed by the above specified ratio, and a trace of aqueous solution of bactericide (PROXEL GXL(S), manufactured by Archichemicals Japan) is added thereto, and the mixture is agitated and mixed (about 30 seconds by a sample mill). The resultant mixture is intermittently treated by mechanofusion system, and particle size is measured in each intermittent driving condition, and particles are taken out when the average spherical equivalent diameter is about 8 μm, and composite particles are prepared. As a result, base particles of average spherical equivalent diameter of 8 μm are obtained.

In succession, in 100 parts by mass of the base particles,
amorphous silica (AEROSIL 130, manufactured by Degussa, volume-average particle size 16 nm, nonporous): 1 part by mass is added and the mixture is agitated and mixed, and particles F of average spherical equivalent diameter of 8 μm are obtained.

Comparative Example A1

—Preparation of Particles H—

Amorphous silica (AEROSIL OX50, manufactured by Degussa, volume-average particle size 40 nm, nonporous) is obtained as particles H.

(Evaluation)

Particles of Example A-1 to A-5, and particles of Comparative example A-1, and the above described ink A are used and evaluated as follows. Results are shown in Table 2.

—Drying Time—

Using OK KINFUJI (Manufactured by Oji Paper Co., Ltd.) as recording medium, 100% coverage pattern is prepared, and after a specified time, another OK KINFUJI paper is pressed on the print pattern at a load of $1.9 \times 10^4$ N/m$^2$. At this time, the time until the liquid is not transferred to the pressed OK KINFUJI paper side is measured and obtained as drying time. Criterion of evaluation is as follows.

A: drying time is less than 0.5 sec.
B: drying time is less than 1 sec.
C: drying time is 1 sec. or more and less than 3 sec.
D: drying time is 3 sec or more.

—Optical Density—

Using OK KINFUJI (Manufactured by Oji Paper Co., Ltd.) as recording medium, 100% coverage pattern is prepared, and the optical density of print portion is measured by using EX-LIGHT 404 (manufactured by Ex-Light). Criterion of evaluation is as follows.

A: optical density is 1.6 or more.
B: optical density is 1.5 or more.
C: optical density is 1.3 or more and less than 1.5.
D: optical density is less than 1.3.

—Fixing Property—

Using OK KINFUJI (Manufactured by Oji Paper Co., Ltd.) as recording medium, 100% coverage pattern is prepared, and then, is allowed to stand in general environment for 24 hours. After that, another OK KINFUJI paper is pressed on print surface at a load of $4.9 \times 10^4$ N/m$^2$, and rubbed, and the sensory evaluation of the degree of soiling of the rubbed paper is conducted by comparing with the boundary sample. Criterion of evaluation is as follows.

A: no soiling.
B: almost no soiling.
C: soiling within allowable level.
D: extreme soiling out of allowable level.

TABLE 2

|  | Particles | | | | |
| --- | --- | --- | --- | --- | --- |
|  | Type | Presence or absence of composite particles | Presence or absence of organic particles having voids and/or rough surface | Drying time | Optical density | Fixing property |
| Example A-1 | A | absence | presence | B | B | B |
| Example A-2 | B | absence | presence | B | B | C |
| Example A-3 | D | presence | presence | A | B | B |

TABLE 2-continued

| | | Particles | | | | |
|---|---|---|---|---|---|---|
| | Type | Presence or absence of composite particles | Presence or absence of organic particles having voids and/or rough surface | Drying time | Optical density | Fixing property |
| Example A-4 | E | presence | presence | B | B | A |
| Example A-5 | F | presence | presence | A | B | B |
| Comparative Example A-1 | G | absence | absence | D | B | B |
| Comparative Example A-2 | H | absence | absence | D | B | D |
| Comparative Example A-3 | I | absence | absence | C | C | C |

As shown in the results, it is found that since the ink receptive particles of Examples of embodiment A (Examples A-1 to A-5) are composite particles at least containing organic resin particles having voids and/or a rough surface (porous particles), liquid is absorbed not only in gaps between particles, but also in voids of organic resin particles, and hence as compared with Comparative examples, the liquid absorbing speed is high and the drying time is short.

By using the ink receptive particles of Examples of Embodiment A (Examples A-1 to A-5), various characteristics are also enhanced, such as optical density, fixing property, and coloring property.

Ink Receptive Particles of Embodiment B

Example B-1

Embodiment B

—Preparation of Ink Receptive Particles—

Porous silica particles (inorganic porous particles: volume-average particle size 30 nm, BET specific surface area ($N_2$) 280 $m^2/g$): 40 parts by mass Polyacrylic acid (partially crosslinked) resin particles (organic resin particles: volume-average particle size 400 µm, liquid absorbing resin, acid value 120 mg KOH/g, Tg=40° C.): 60 parts by mass Polyvinyl alcohol: 2.5 parts by mass Polyallylamine: 2.5 parts by mass This composition is agitated and mixed (about 30 seconds by sample mill), and a trace of aqueous solution of sodium hydroxide is added, and the mixture is intermittently treated by mechanofusion system, and composite particles are prepared. Particle size is measured in each intermittent driving condition, and particles are taken out when the particle size is about 2.2 µm.

Further in sample mill, in 100 parts by mass of the particles, 1 part by mass of silica, 1 part by mass of paraffin wax (OX-3215, manufactured by Japan Seiro Co., Ltd.), and 0.15 part by mass of stearyl alcohol are added, and heated, and agitated and mixed, and composite particles of average spherical equivalent diameter of 2.2 µm are prepared. Thus, ink receptive particles are obtained. Characteristics are shown in Table 3.

Example B-2

Embodiment B

—Preparation of Ink Receptive Particles—

Porous silica particles (inorganic porous particles: volume-average particle size 40 nm, BET specific surface area ($N_2$) 150 $m^2/g$): 50 parts by mass Polyacrylic acid (partially crosslinked) resin particles (organic resin particles: volume-average particle size 600 nm, liquid absorbing resin, acid value 80 mg KOH/g, Tg=55° C.): 50 parts by mass Polyvinyl alcohol: 2.5 parts by mass Polyallylamine: 2.5 parts by mass This composition is agitated and mixed (about 30 seconds by sample mill), and a trace of aqueous solution of sodium hydroxide is added, and the mixture is intermittently treated by mechanofusion system, and composite particles are prepared. Particle size is measured in each intermittent driving condition, and particles are taken out when the particle size is about 3 µm.

Further in sample mill, in 100 parts by mass of the particles, 1 part by mass of silica, 1 part by mass of paraffin wax (OX-3215, manufactured by Japan Seiro Co., Ltd.), and 0.15 part by mass of stearyl alcohol are added, and heated, and agitated and mixed, and composite particles of average spherical equivalent diameter of 3 µm are prepared. Thus, ink receptive particles are obtained. Characteristics are shown in Table 3.

Example B-3

Embodiment B

—Preparation of Ink Receptive Particles—

Porous alumina particles (inorganic porous particles: volume-average particle size 30 nm, BET specific surface area ($N_2$) 280 $m^2/g$): 66 parts by mass Styrene acrylic acid resin particles (organic resin particles: volume-average particle size 250 nm, liquid absorbing resin, acid value 240 mg KOH/g, Tg=60° C.): 33 parts by mass Polyvinyl alcohol: 2.5 parts by mass Polyallylamine: 2.5 parts by mass This composition is agitated and mixed (about 30 seconds by sample mill), and a trace of aqueous solution of sodium hydroxide is added, and the mixture is intermittently treated by mechanofusion system, and composite particles are prepared. Particle size is measured in each intermittent driving condition, and particles are taken out when the particle size is about 0.6 µm.

Further in sample mill, in 100 parts by mass of the particles, 1 part by mass of silica, 1 part by mass of paraffin wax (OX-3215, manufactured by Japan Seiro Co., Ltd.), and 0.15 part by mass of stearyl alcohol are added, and heated, and agitated and mixed, and composite particles of average spherical equivalent diameter of 0.6 µm are prepared. Thus, ink receptive particles are obtained. Characteristics are shown in Table 3.

Example B-4

Embodiment B

—Preparation of Ink Receptive Particles—
Porous polystyrene beads (organic porous particles: volume-average particle size 500 mm, BET specific surface area ($N_2$) 420 $m^2/g$): 75 parts by mass
n-butyl acrylate methacrylic acid resin particles (organic resin particles: volume-average particle size 800 nm, liquid absorbing resin, acid value 150 mg KOH/g, Tg=60° C.): 25 parts by mass
Polyvinyl alcohol: 2.5 parts by mass
Polyallylamine: 2.5 parts by mass This composition is agitated and mixed (about 30 seconds by sample mill), and a trace of aqueous solution of sodium hydroxide is added, and the mixture is intermittently treated by mechanofusion system, and composite particles are prepared. Particle size is measured in each intermittent driving condition, and particles are taken out when the particle size is about 2.1 μm.

Further in sample mill, in 100 parts by mass of the particles, 1 part by mass of silica, 1 part by mass of paraffin wax (OX-3215, manufactured by Japan Seiro Co., Ltd.), and 0.15 part by mass of stearyl alcohol are added, and heated, and agitated and mixed, and composite particles of average spherical equivalent diameter of 2.1 μm are prepared. Thus, ink receptive particles are obtained. Characteristics are shown in Table 3.

Example B-5

Embodiment B

—Preparation of Ink Receptive Particles—
Porous alumina particles (inorganic porous particles: volume-average particle size 30 nm, BET specific surface area ($N_2$) 280 $m^2/g$): 20 parts by mass
Styrene maleic acid resin particles (organic resin particles: volume-average particle size 600 nm, liquid absorbing resin, acid value 300 mg KOH/g, Tg=45° C.): 80 parts by mass
Polyvinyl alcohol: 2.5 parts by mass
Polyallylamine: 2.5 parts by mass This composition is agitated and mixed (about 30 seconds by sample mill), and a trace of aqueous solution of sodium hydroxide is added, and the mixture is intermittently treated by mechanofusion system, and composite particles are prepared. Particle size is measured in each intermittent driving condition, and particles are taken out when the particle size is about 47 μm.

Further in sample mill, in 100 parts by mass of the particles, 1 part by mass of silica, 1 part by mass of paraffin wax (OX-3215, manufactured by Japan Seiro Co., Ltd.), and 0.15 part by mass of stearyl alcohol are added, and heated, and agitated and mixed, and composite particles of average spherical equivalent diameter of 47 μm are prepared. Thus, ink receptive particles are obtained. Characteristics are shown in Table 3.

Comparative Example B-1

—Preparation of Ink Receptive Particles—
Polyacrylic acid particles (organic resin particles: volume-average particle size 9.8 μm, liquid absorbing resin) are obtained as ink receptive particles. Characteristics are shown in Table 4.

Comparative Example B-2

Porous silica particles (inorganic porous particles: volume-average particle size 5.5 μm, BET specific surface area ($N_2$) 280 $m^2/g$) are obtained as ink receptive particles. Characteristics are shown in Table 4.

Comparative Example B-3

Styrene maleic acid particles (organic resin particles: volume-average particle size 15 μm, liquid absorbing resin, acid value 120 mg KOH/g, Tg=45° C.)) are obtained as ink receptive particles. Characteristics are shown in Table 4.

(Evaluation)

Ink receptive particles of Examples B-1 to B-5, and ink receptive particles of Comparative examples B-1 to B-3, and the above described ink A are used and evaluated as follows. Results are shown in Table 5.

—Drying Time—

Using OK KINFUJI (Manufactured by Oji Paper Co., Ltd.) as recording medium, 100% coverage pattern is prepared, and after a specified time, another OK KINFUJI paper is pressed on the print pattern at a load of $1.9 \times 10^4$ $N/m^2$. At this time, the time until the liquid is not transferred to the pressed OK KINFUJI paper side is measured and obtained as drying time. Criterion of evaluation is as follows.

A: drying time is less than 1 sec.
B: drying time is 1 sec. or more and less than 3 sec.
F: drying time is 3 sec. or more.

—Optical Density—

Using OK KINFUJI (Manufactured by Oji Paper Co., Ltd.) as recording medium, 100% coverage pattern is prepared, and the optical density of print portion is measured by using EX-LIGHT 404 (manufactured by Ex-Light). Criterion of evaluation is as follows.

A: optical density is 1.5 or more.
B: optical density is 1.3 or more and less than 1.5.
C: optical density is less than 1.3.

—Fixing Property—

Using OK KINFUJI (Manufactured by Oji Paper Co., Ltd.) as recording medium, 100% coverage pattern is prepared, and then, is allowed to stand in general environment for 24 hours. After that, another OK KINFUJI paper is pressed on print surface at a load of $4.9 \times 10^4$ $N/m^2$, and rubbed, and the sensory evaluation of the degree of soiling of the rubbed paper is conducted by comparing with the boundary sample. Criterion of evaluation is as follows.

A: almost no soiling.
B: soiling within allowable level.
C: extreme soiling out of allowable level.

—Bleeding—

Using OK KINFUJI (Manufactured by Oji Paper Co., Ltd.) as recording medium, fine line pattern is printed, and the sensory evaluation of bleeding of print area is conducted by comparing with the boundary sample. Criterion of evaluation is as follows.

A: almost no bleeding.
B: bleeding within allowable level.
C: extreme bleeding out of allowable level.

TABLE 3

|  | Example B-1 | Example B-2 | Example B-3 | Example B-4 | Example B-5 |
| --- | --- | --- | --- | --- | --- |
| Composition of ink receptive particles | Porous silica particles, 40 parts by mass | Porous silica particles, 50 parts by mass | Porous alumina particles, 66 parts by mass | Porous polystyrene beads, 75 parts by mass | Porous alumina particles, 20 parts by mass |
|  | Polyacrylic acid particles, 60 parts by mass | Polyacrylic acid particles, 50 parts by mass | St-AA particles, 33 parts by mass | nBMA-MAA particles, 25 parts by mass | St-MA particles, 80 parts by mass |
|  | — | — | — | — | — |
|  | PAA, 2.5 parts by mass PVA, 2.5 parts by mass | PAA, 2.5 parts by mass PVA, 2.5 parts by mass | PAA, 2.5 parts by mass PVA, 2.5 parts by mass | PAA, 2.5 parts by mass PVA, 2.5 parts by mass | PAA, 2.5 parts by mass PVA, 2.5 parts by mass |
| Presence or absence of gaps between particles | Presence | Presence | Presence | Presence | Presence |
| Presence or absence of organic resin particles | Presence | Presence | Presence | Presence | Presence |
| Bulk specific gravity kg/m³ | 120 | 210 | 58 | 560 | 760 |
| Average spherical equivalent diameter μm | 2.2 | 3 | 0.6 | 2.1 | 47 |
| BET specific surface area(N₂) m²/g | 350 | 208 | 530 | 120 | 58 |
| Gaps between particles μm | 0.52 | 0.81 | 0.25 | 0.52 | 4.8 |

St-AA: styrene acrylic acid
nBMA-MAA: n-butyl acrylate-methacrylic acid
St-MA: styrene maleic acid
PAA: polyallylamine
PVA: polyvinyl alcohol
St-MAA: styrene methacrylic acid

TABLE 4

|  | Comparative Example B-1 | Comparative Example B-2 | Comparative Example B-3 |
| --- | --- | --- | --- |
| Composition of ink receptive particles | Polyacrylic acid particles (primary particles) | Porous silica particles (primary particles) | St-MAA particles (primary particles) |
| Presence or absence of gaps between particles | absence | absence | absence |
| Presence or absence of organic resin particles | presence | absence | presence |
| Bulk specific gravity kg/m³ | 450 | 75 | 320 |
| Average spherical equivalent diameter μm | 9.8 (volume-average particle size) | 5.5 (volume-average particle size) | 15 (volume-average particle size) |
| BET specific surface area (N₂) m²/g | 350 | 175 | 530 |
| Gaps between particles μm | — | — | — |

St-MA: styrene maleic acid
PAA: polyallylamine
PVA: polyvinyl alcohol

TABLE 5

|  | Drying time | Optical density | Fixing property | Bleeding |
| --- | --- | --- | --- | --- |
| Example B-1 | A | A | A | A |
| Example B-2 | A | A | A | A |
| Example B-3 | B | A | A | A |
| Example B-4 | A | A | A | A |
| Example B-5 | A | A | B | B |
| Comparative Example B-1 | C | A | A | A |
| Comparative Example B-2 | A | C | C | A |
| Comparative Example B-3 | C | B | B | A |

As shown in the results, it is found that since ink receptive particles of Examples of embodiment B (Examples B-1 to B-5) are composite particles having specified bulk specific gravity, and containing at least organic resin particles, liquid absorbing speed by gaps between particles is high and drying time is short. In addition, when porous particles are contained in the composite particles, it is found that the drying speed is much faster.

It is also found that by using the ink receptive particles of Examples of embodiment B (Examples B-1 to B-5), various characteristics are also enhanced, such as optical density, fixing property, coloring property, and bleeding prevention.

Ink Receptive Particles of Embodiment C
—Preparation of Organic-Inorganic Hybrid Particles B—
Organic-inorganic hybrid particles B containing:
amorphous polyester resin (acid value 5 mg KOH/g, weight-average molecular weight 75,000, number-average molecular weight 22,000, Tg=55° C., non-liquid absorbing resin): 33 mass %, and
amorphous silica (AEROSIL MOX80, manufactured by Degussa, volume-average particle size 30 nm, nonporous): 67 mass %,
are prepared in the following procedure.

Amorphous polyester resin is added to ion exchange water, and applied to a homogenizer while being heated, and dispersion A is obtained. On the other hand, amorphous silica is added to ion exchange water, and a trace of anionic surfactant (styrene-acrylic acid copolymer) is added as dispersant, and applied to a homogenizer, and dispersion B is obtained.

Dispersion A and dispersion B are added by specified ratio, and 0.5 mass % of calcium chloride is added as an aggregating agent. Adjusting the pH of this solution to be acidic, it is agitated and dispersed by homogenizer. It is agitated continuously for 3 hours in heated state of 90° C.

The obtained dispersion is cooled to room temperature, and sprayed and dried by spray dryer, and organic-inorganic hybrid particles B of average spherical equivalent diameter of 10 μm are obtained.

—Preparation of Organic-Inorganic Hybrid Particles C—
Organic-inorganic hybrid particles C containing:
amorphous polyester resin (acid value 5 mg KOH/g, weight-average molecular weight 20,000, number-average molecular weight 8,000, Tg=55° C., non-liquid absorbing resin): 78 mass %,
amorphous silica (AEROSIL OX50, manufactured by Degussa, volume-average particle size 40 μm, nonporous): 20 mass %, and
amorphous silica (AEROSIL R972, manufactured by Degussa, volume-average particle size 16 nm, nonporous): 2 mass %,
are prepared in the following procedure.

Amorphous polyester resin and two types of amorphous silica are mixed, and the mixture is mixed and agitated in a HENSCHEL mixer, and kneading material is obtained. The mixture is put into extruder, and fused and kneaded. The obtained mixture is cooled, and crushed by using jet mill. It is applied to an ultrasonic sieve, and organic-inorganic hybrid particles C of average spherical equivalent diameter of 5 μm are obtained.

Example C-1

Embodiment C

—Preparation of Ink Receptive Particles F—
Organic-inorganic hybrid particles B: 100 parts by mass
Styrene/n-butyl methacrylate/acrylic acid copolymer particles (nonporous particles, volume-average particle size 0.2 μm, acid value 240 mg KOH/g, weight-average molecular weight 13,000, number-average molecular weight 4,000, Tg=about 60° C., weak liquid absorbing resin): 0.5 part by mass,
Polyvinyl alcohol: 0.5 part by mass This composition is mixed at specified ratio, and a trace of aqueous solution of bactericide (PROXEL GXL(S), manufactured by Archichemicals Japan) is added, and agitated and mixed (about 30 seconds by sample mill), and the mixture is intermittently treated by mechanofusion system, and particle size is measured in each intermittent driving condition, and particles are taken out when the average spherical equivalent diameter is about 8 μm, and composite particles are prepared. As a result, base particles of average spherical equivalent diameter of 8 μm are obtained.

In succession, in 100 parts by mass of the base particles,
paraffin wax (OX-3215, manufactured by Japan Seiro Co., Ltd.): 1 part by mass,
stearyl alcohol: 0.15 part by mass, and
calcium carbonate (NEOLITE GP-20, manufactured by Takehara Chemicals, volume-average particle size 30 nm, nonporous): 1 part by mass
are added, agitated and mixed, and ink receptive particles of average spherical equivalent diameter of 8 μm are prepared.

Example C-2

Embodiment C

—Preparation of Ink Receptive Particles G—
Organic-inorganic hybrid particles C: 100 parts by mass
n-butyl methacrylate/acrylic acid copolymer particles (nonporous particles, volume-average particle size 0.5 μm, acid value 320 mg KOH/g, weight-average molecular weight 25,000, number-average molecular weight 8,000, Tg=about 70° C., weak liquid absorbing resin): 15 parts by mass
Alumina (A33F, Japan Light Metals, volume-average particle size 0.7 μm, nonporous): 15 parts by mass
Polyvinyl alcohol: 0.5 part by mass This composition is mixed at specified ratio, and a trace of aqueous solution of bactericide (PROXEL GXL(S), manufactured by Archichemicals Japan) is added, and agitated and mixed (about 30 seconds by sample mill), and the mixture is intermittently treated by mechanofusion system, and particle size is measured in each intermittent driving condition, and particles are taken out when the average spherical equivalent diameter is about 15 μm, and composite particles are prepared. As a result, base particles of average spherical equivalent diameter of 15 μm are obtained.

Comparative Example C-1

—Preparation of Ink Receptive Particles H—
Acrylic acid/alkyl methacrylate copolymer (nonporous particles: CARBOPOL ETD2020, manufactured by Nikko Chemicals): 80 mass %
Carboxyvinyl polymer (nonporous particles: CARBOPOL ETD2050, manufactured by Nikko Chemicals): 20 mass %

The acrylic acid/alkyl methacrylate copolymer and carboxyvinyl polymer are poured into jet mill, and crushed. Obtained particles are applied in air stream sorter, and particles of average spherical equivalent diameter of 5 μm are obtained. The particles are mixed by the above ratio, and particles H are obtained.

Comparative Example C-2

—Preparation of Ink Receptive Particles I—
Amorphous silica (AEROSIL OX50, manufactured by Degussa, volume-average particle size 40 nm, nonporous) are obtained as ink receptive particles I.

Comparative Example C-3

—Preparation of Ink Receptive Particles J—
Amorphous polyester resin (nonporous particles, volume-average particle size 12 μm, acid value 5 mg KOH/g, weight-average molecular weight 40,000, number-average molecular weight 12,000, Tg=50° C., non-liquid absorbing resin): 90 mass %

Amorphous silica (AEROSIL OX50, manufactured by Degussa, volume-average particle size 40 nm, nonporous): 10 mass %

The materials are mixed by the above ratio, and ink receptive particles J are obtained.

(Evaluation)

Ink receptive particles of Examples C-1 and C-2 and Comparative examples C-1 to C-3, and ink A described above are used and evaluated as follows. Results are shown in Table 6.

—Drying Time—

Using OK KINFUJI (Manufactured by Oji Paper Co., Ltd.) as recording medium, 100% coverage pattern is prepared, and after a specified time, another OK KINFUJI paper is pressed on the print pattern at a load of $1.9 \times 10^4$ N/m$^2$. At this time, the time until the liquid is not transferred to the pressed OK KINFUJI paper side is measured and obtained as drying time. Criterion of evaluation is as follows.

A: drying time is less than 0.5 sec.
B: drying time is 0.5 sec. or more and less than 1 sec.
C: drying time is 1 sec. or more and less than 3 sec.
D: drying time is 3 sec or more.

—Optical Density—

Using OK KINFUJI (Manufactured by Oji Paper Co., Ltd.) as recording medium, 100% coverage pattern is prepared, and the optical density of print portion is measured by using EX-LIGHT 404 (manufactured by Ex-Light). Criterion of evaluation is as follows.

A: optical density is 1.6 or more.
B: optical density is 1.5 or more and less than 1.6.
C: optical density is 1.3 or more and less than 1.5.
D: optical density is less than 1.3.

—Fixing Property—

Using OK KINFUJI (Manufactured by Oji Paper Co., Ltd.) as recording medium, 100% coverage pattern is prepared, and then, is allowed to stand in general environment for 24 hours. After that, another OK KINFUJI paper is pressed on print surface at a load of $4.9 \times 10^4$ N/m$^2$, and rubbed, and the sensory evaluation of the degree of soiling is conducted by comparing with the boundary sample. Criterion of evaluation is as follows.

A: no soiling.
B: almost no soiling.
C: slight soiling within allowable level.
D: extreme soiling out of allowable level.

As shown in the results, it is found that, as in ink receptive particles of Examples of embodiment C (Examples C-1 and C-2), since the liquid is absorbed in organic-inorganic hybrid particles (gaps at the interface of organic material and inorganic material of the particles), as compared with the Comparative examples, the liquid absorbing speed is fast, and the drying time is short.

It is also found that, as in ink receptive particles of Examples of embodiment C (Examples C-1 and C-2), since ink receptive particles are composite particles containing at least organic-inorganic hybrid particles, and in addition to gaps between particles, the liquid is absorbed also in organic-inorganic hybrid particles (gaps at the interface of organic material and inorganic material of the particles), as compared with Comparative examples, the liquid absorbing speed is fast, and the drying time is short.

By using the ink receptive particles of Examples of embodiment C (Examples C-1 to C-2), various characteristics are also enhanced, such as optical density, fixing property, and coloring property.

According to an aspect of the invention, ink receptive particles capable of recording on various recording media at high speed and high image quality even when using various types of ink can be provided. The invention also provides marking materials system, an ink receiving method, a recording method, a recording apparatus, and an ink receptive particle storage cartridge, which use these ink receptive particles.

What is claimed is:

1. Ink receptive particles for receiving ink containing a recording material, comprising:

a trap structure for trapping at least a liquid component of the ink, and a liquid absorbing resin, wherein the ink receptive particles are composite particles in a semi-sintered state in which some of the granule shape remains and which have voids, and particles composing the composite particles are at least partly dissociated when the ink liquid component is trapped in the trap structure, wherein the liquid absorbing resin has an acid value of 50 to 1000 mg KOH/g as expressed by carboxylic acid groups (—COOH).

TABLE 6

| | | Ink receptive particles | | | | |
|---|---|---|---|---|---|---|
| | Type | Presence or absence of gaps between particles | Presence or absence of organic-inorganic hybrid particles | Drying time | Optical density | Fixing property |
| Example C-1 | F | presence | presence | B | A | A |
| Example C-2 | G | presence | presence | A | B | B |
| Comparative Example C-1 | H | absence | absence | D | B | B |
| Comparative Example C-2 | I | absence | absence | D | C | D |
| Comparative Example C-3 | J | absence | absence | C | C | C |

2. The ink receptive particles of claim 1, wherein the liquid component is an ink solvent.

3. The ink receptive particles of claim 1, wherein the trap structure is a structure for also trapping the recording material.

4. The ink receptive particles of claim 1, wherein the trap structure is a void structure.

5. The ink receptive particles of claim 1, wherein the trap structure is a recess structure.

6. The ink receptive particles of claim 1, wherein the ink receptive particles are composite particles comprising aggregated liquid absorbing resin particles.

7. The ink receptive particles of claim 6, wherein the composite particles further comprise inorganic particles, in addition to the liquid absorbing resin particles, which are aggregated.

8. The ink receptive particles of claim 1, wherein the liquid absorbing resin is a resin that absorbs liquid weakly, wherein a weak liquid absorbing resin is a hydrophilic resin capable of absorbing from approximately 5 percent to approximately 500 percent by mass of water relative to the resin.

9. The ink receptive particles of claim 1, wherein the liquid absorbing resin comprises a crosslinking component that crosslinks the liquid absorbing resin.

10. The ink receptive particles of claim 9, wherein the crosslinking component is contained as a monomer component.

11. Ink receptive particles for receiving ink containing a recording material, comprising:
a trap structure for trapping at least a liquid component of the ink, and
a liquid absorbing resin,
wherein the ink receptive particles are composite particles in a semi-sintered state in which some of the granule shape remains and which have voids, and particles composing the composite particles are at least partly dissociated when the ink liquid component is trapped in the trap structure, and the glass transition temperature (Tg) of the liquid absorbing resin is in a range of 40° C. to 90° C.

12. The ink receptive particles of claim 1, further comprising organic resin particles having a rough surface and/or voids.

13. The ink receptive particles of claim 12, wherein the organic resin particles having a rough surface and/or voids are organic resin porous particles.

14. The ink receptive particles of claim 12, wherein the ink receptive particles are composite particles in which the organic resin particles having a rough surface and/or voids are aggregated.

15. The ink receptive particles of claim 14, wherein the composite particles further comprise organic resin nonporous particles and/or inorganic nonporous particles, in addition to the organic resin particles having a rough surface and/or voids, which are aggregated.

16. The ink receptive particles of claim 14, wherein gaps between the particles of the composite particles are 0.1 to 5 μm in maximum opening size.

17. The ink receptive particles of claim 1, comprising organic-inorganic hybrid particles including organic material and inorganic material.

18. Ink receptive particles for receiving ink containing a recording material, comprising:
a trap structure for trapping at least a liquid component of the ink,
a liquid absorbing resin, and
organic-inorganic hybrid particles including organic material and inorganic material,
wherein the ink receptive particles are composite particles in a semi-sintered state in which some of the granule shape remains and which have voids, and particles composing the composite particles are at least partly dissociated when the ink liquid component is trapped in the trap structure, and the ink receptive particles are composite particles in which at least organic-inorganic hybrid particles are aggregated.

19. The ink receptive particles of claim 18, wherein the composite particles are composite particles in which at least organic resin particles and/or inorganic particles, in addition to the organic-inorganic hybrid particles, are aggregated.

20. A marking materials system comprising: an ink containing a recording material; and ink receptive particles for receiving the ink containing the recording material, wherein the ink receptive particles have a trap structure for trapping at least a liquid component of the ink, contain a liquid absorbing resin, and are composite particles in a semi-sintered state in which some of the granule shape remains and which have voids, and particles composing the composite particles are at least partly dissociated when the ink liquid component is trapped in the trap structure, wherein the liquid absorbing resin has an acid value of 50 to 1000 mg KOH/g as expressed by carboxylic acid groups (—COOH).

21. The marking materials system of claim 20, wherein the concentration of the recording material is 5 to 30% by mass of the ink.

22. An ink receiving method of receiving in ink receptive particles, comprising:
trapping at least an ink liquid component in a trap structure, and
absorbing the ink liquid component trapped in the trap structure in a liquid absorbing resin,
wherein the ink receptive particles have the trap structure for trapping at least the ink liquid component, contain the liquid absorbing resin, and are composite particles in a semi-sintered state in which some of the granule shape remains and which have voids, and particles composing the composite particles are at least partly dissociated when the ink liquid component is trapped in the trap structure, wherein the liquid absorbing resin has an acid value of 50 to 1000 mg KOH/g as expressed by carboxylic acid groups (—COOH).

23. The ink receiving method of claim 22, wherein in the trapping, the recording material is also trapped in the trap structure.

24. A recording method comprising:
receiving an ink containing a recording material at ink receptive particles, and
transferring the ink receptive particles having received the ink onto a recording medium,
wherein the ink receptive particles have a trap structure for trapping at least an ink liquid component, contain a liquid absorbing resin, and are composite particles in a semi-sintered state in which some of the granule shape remains and which have voids, and particles composing the composite particles are at least partly dissociated when the ink liquid component is trapped in the trap structure, wherein the liquid absorbing resin has an acid value of 50 to 1000 mg KOH/g as expressed by carboxylic acid groups (—COOH).

25. The recording method of claim 24, further comprising fixing the ink receptive particles transferred onto the recording medium.

26. A recording apparatus comprising:
a discharge unit that ejects an ink containing a recording material, to be received at ink receiving particles, and
a transfer unit that transfers the ink receptive particles having received the ink onto a recording medium,
wherein the ink receptive particles have a trap structure for trapping at least a liquid component of the ink, contain a liquid absorbing resin, and are composite particles in a semi-sintered state in which some of the granule shape remains and which have voids, and particles composing the composite particles are at least partly dissociated when the ink liquid component is trapped in the trap structure, wherein the liquid absorbing resin has an acid value of 50 to 1000 mg KOH/g as expressed by carboxylic acid groups (—COOH).

27. The recording apparatus of claim 26, further comprising a fixing unit for fixing the ink receptive particles transferred onto the recording medium.

28. An ink receptive particle storage cartridge that holds ink receptive particles, which is detachably disposed in a recording apparatus, wherein the ink receptive particles have a trap structure for trapping at least an ink liquid component, contain a liquid absorbing resin, and are composite particles in a semi-sintered state in which some of the granule shape remains and which have voids, and particles composing the composite particles are at least partly dissociated when the ink liquid component is trapped in the trap structure, wherein the liquid absorbing resin has an acid value of 50 to 1000 mg KOH/g as expressed by carboxylic acid groups (—COOH).

* * * * *